(12) United States Patent
Kim et al.

(10) Patent No.: US 10,133,394 B2
(45) Date of Patent: Nov. 20, 2018

(54) MOBILE TERMINAL AND CONTROL METHOD THEREOF

(71) Applicant: LG ELECTRONICS INC., Seoul (KR)

(72) Inventors: Jong Hwan Kim, Seoul (KR); Seok Jeong Hong, Seoul (KR); Min Kyeong Kim, Seoul (KR); Nam Yong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/909,624

(22) PCT Filed: Jul. 3, 2014

(86) PCT No.: PCT/KR2014/005961
§ 371 (c)(1),
(2) Date: Feb. 2, 2016

(87) PCT Pub. No.: WO2015/199270
PCT Pub. Date: Dec. 30, 2015

(65) Prior Publication Data
US 2017/0097715 A1    Apr. 6, 2017

(30) Foreign Application Priority Data

Jun. 24, 2014  (KR) .................. 10-2014-0076972

(51) Int. Cl.
*H04M 1/02* (2006.01)
*G06F 3/041* (2006.01)
(Continued)

(52) U.S. Cl.
CPC .......... *G06F 3/0416* (2013.01); *G06F 1/1626* (2013.01); *G06F 1/1652* (2013.01);
(Continued)

(58) Field of Classification Search
CPC .... G06F 1/1626; G06F 1/1652; G06F 1/1694; G06F 3/0412; G06F 3/0416;
(Continued)

(56) References Cited

U.S. PATENT DOCUMENTS

2005/0012723 A1* 1/2005 Pallakoff ............... G06F 1/1616
                                                              345/173
2008/0045279 A1* 2/2008 Ohki .................... H04M 1/0247
                                                              455/575.1
(Continued)

FOREIGN PATENT DOCUMENTS

KR    10-2010-0042833 A    4/2010
KR    10-2014-0046344 A    4/2014

*Primary Examiner* — Michael J Eurice
(74) *Attorney, Agent, or Firm* — Birch, Stewart, Kolasch & Birch, LLP

(57) ABSTRACT

Disclosed is a mobile terminal. The mobile terminal includes at least one display unit disposed on a front surface and lateral surface of a terminal body, and a controller for, upon receiving a preset touch input through a first display region disposed on the front surface of the terminal body in a sleep mode, enabling a predetermined second display region according to a position of the received touch input and controlling the display unit to display a preset operation image on the enabled second display region.

20 Claims, 33 Drawing Sheets

(51) Int. Cl.
  *H04M 1/725* (2006.01)
  *G06F 1/16* (2006.01)
  *G06F 3/0483* (2013.01)
  *G06F 3/0488* (2013.01)
  *G06F 3/0481* (2013.01)

(52) U.S. Cl.
  CPC .......... *G06F 1/1694* (2013.01); *G06F 3/0412* (2013.01); *G06F 3/0483* (2013.01); *G06F 3/0488* (2013.01); *G06F 3/04817* (2013.01); *G06F 3/04883* (2013.01); *G06F 3/04886* (2013.01); *H04M 1/0266* (2013.01); *H04M 1/72583* (2013.01); *G06F 2200/1614* (2013.01); *G06F 2203/0339* (2013.01); *G06F 2203/04101* (2013.01); *G06F 2203/04102* (2013.01); *H04M 1/0268* (2013.01); *H04M 2250/22* (2013.01)

(58) Field of Classification Search
  CPC .. G06F 3/04817; G06F 3/0483; G06F 3/0488; G06F 3/04883; G06F 3/04886; G06F 2200/1614; G06F 2203/0339; G06F 2203/04101; G06F 2203/04102; H04M 1/0266; H04M 1/0268; H04M 1/72583; H04M 2250/22
  See application file for complete search history.

(56) References Cited

U.S. PATENT DOCUMENTS

| | | | |
|---|---|---|---|
| 2008/0056485 A1* | 3/2008 | Masuda | H04M 1/0212 379/433.13 |
| 2008/0146285 A1* | 6/2008 | Lee | H04M 1/0266 455/566 |
| 2009/0295731 A1* | 12/2009 | Kim | G06F 1/1616 345/168 |
| 2009/0295943 A1* | 12/2009 | Kim | H04N 5/217 348/231.99 |
| 2009/0298546 A1* | 12/2009 | Kim | G06F 1/1616 455/566 |
| 2009/0298547 A1* | 12/2009 | Kim | G06F 1/162 455/566 |
| 2009/0298548 A1* | 12/2009 | Kim | H04M 1/72544 455/566 |
| 2009/0298554 A1* | 12/2009 | Kim | H01M 10/465 455/574 |
| 2010/0060548 A1* | 3/2010 | Choi | G06F 3/0414 345/1.3 |
| 2010/0117975 A1* | 5/2010 | Cho | G06F 1/1626 345/173 |
| 2010/0141605 A1* | 6/2010 | Kang | G06F 1/1626 345/174 |
| 2010/0216514 A1* | 8/2010 | Smoyer | G06F 1/1647 455/566 |
| 2010/0222110 A1* | 9/2010 | Kim | G06F 1/1616 455/566 |
| 2010/0241985 A1* | 9/2010 | Kim | G06F 3/04886 715/773 |
| 2011/0151935 A1* | 6/2011 | Oksman | G06F 1/1624 455/566 |
| 2011/0239142 A1* | 9/2011 | Steeves | G06F 3/14 715/764 |
| 2012/0176353 A1* | 7/2012 | Ishii | G06F 1/1616 345/204 |
| 2012/0242599 A1* | 9/2012 | Seo | G06F 1/1641 345/173 |
| 2012/0253485 A1* | 10/2012 | Weast | G06F 1/163 700/91 |
| 2012/0306782 A1* | 12/2012 | Seo | G06F 1/1616 345/173 |
| 2013/0032414 A1* | 2/2013 | Yilmaz | G06F 1/169 178/18.06 |
| 2013/0033434 A1* | 2/2013 | Richardson | G06F 3/0488 345/173 |
| 2013/0076649 A1* | 3/2013 | Myers | H04M 1/0268 345/173 |
| 2013/0079062 A1* | 3/2013 | Sirpal | G06F 3/1438 455/566 |
| 2013/0120302 A1* | 5/2013 | Kang | G06F 3/041 345/173 |
| 2013/0120398 A1* | 5/2013 | Smyth | H04M 1/67 345/473 |
| 2013/0145311 A1* | 6/2013 | Joo | G06F 3/04886 715/788 |
| 2013/0222207 A1* | 8/2013 | Baek | G06F 5/00 345/1.1 |
| 2013/0300697 A1 | 11/2013 | Kim et al. | |
| 2014/0098188 A1* | 4/2014 | Kwak | H04N 5/23238 348/38 |
| 2014/0115489 A1* | 4/2014 | Park | G06F 3/0488 715/741 |
| 2014/0132481 A1* | 5/2014 | Bell | H05K 5/0017 345/1.3 |
| 2014/0197049 A1* | 7/2014 | Napolitano | A45F 5/02 206/45.24 |
| 2014/0298268 A1* | 10/2014 | Kang | G06F 3/04847 715/841 |
| 2014/0372896 A1* | 12/2014 | Raman | G06F 3/0488 715/741 |
| 2015/0026623 A1* | 1/2015 | Horne | G06F 3/04847 715/771 |
| 2015/0040024 A1* | 2/2015 | Higashibeppu | G06F 3/04883 715/741 |
| 2015/0045000 A1* | 2/2015 | Kim | G06F 3/0488 455/411 |
| 2015/0045001 A1* | 2/2015 | Song | G06F 3/017 455/411 |
| 2015/0116218 A1* | 4/2015 | Yang | G06F 21/31 345/158 |
| 2015/0138046 A1* | 5/2015 | Moon | G06F 3/0416 345/7 |
| 2015/0249729 A1* | 9/2015 | Kim | H04M 1/0268 455/566 |
| 2015/0261376 A1* | 9/2015 | Kim | G06F 3/0487 345/173 |
| 2015/0301738 A1* | 10/2015 | Nishigaki | H04M 1/67 715/716 |
| 2016/0026381 A1* | 1/2016 | Kim | G06F 3/04817 715/761 |
| 2016/0042166 A1* | 2/2016 | Kang | G06F 21/32 726/7 |
| 2016/0109973 A1* | 4/2016 | Kim | G06F 3/041 345/173 |
| 2017/0223159 A1* | 8/2017 | Park | H04M 1/0254 |

* cited by examiner

[FIG. 1A]
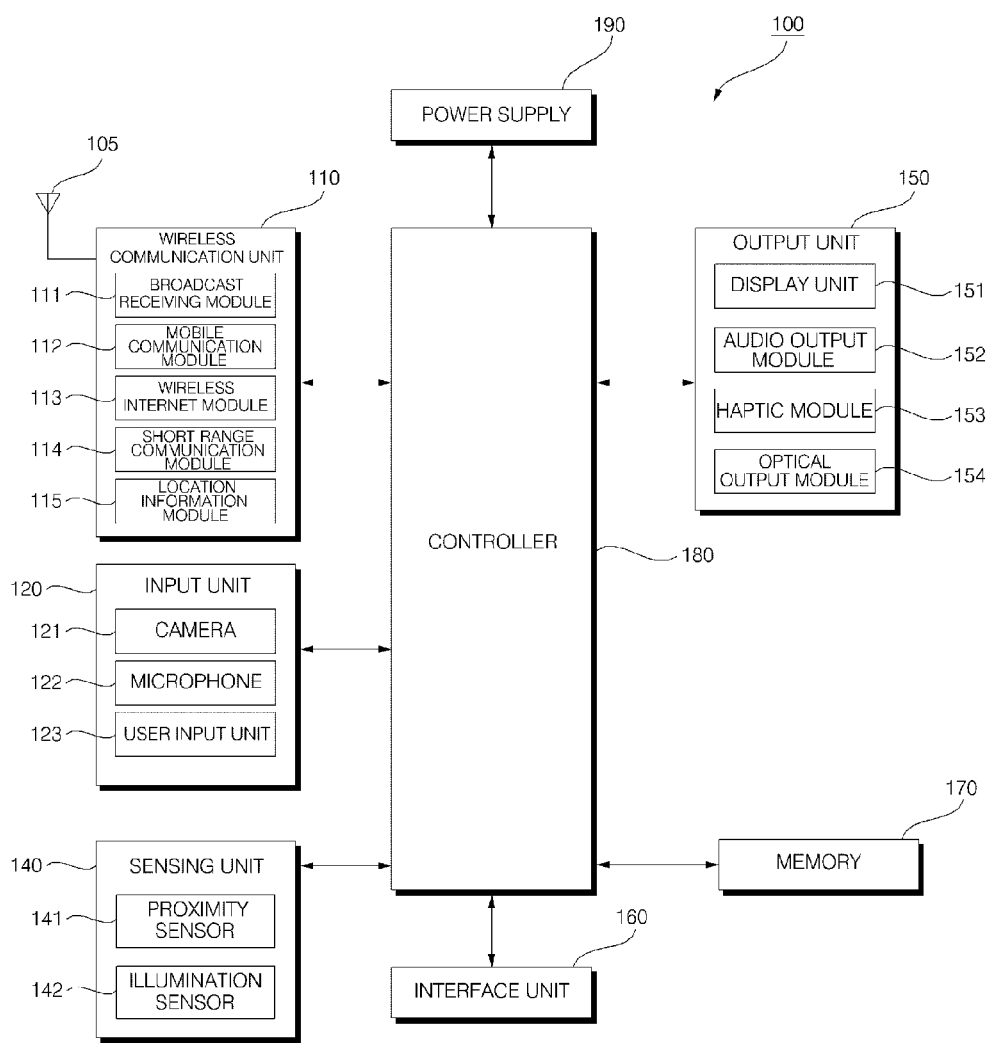

【FIG. 1B】
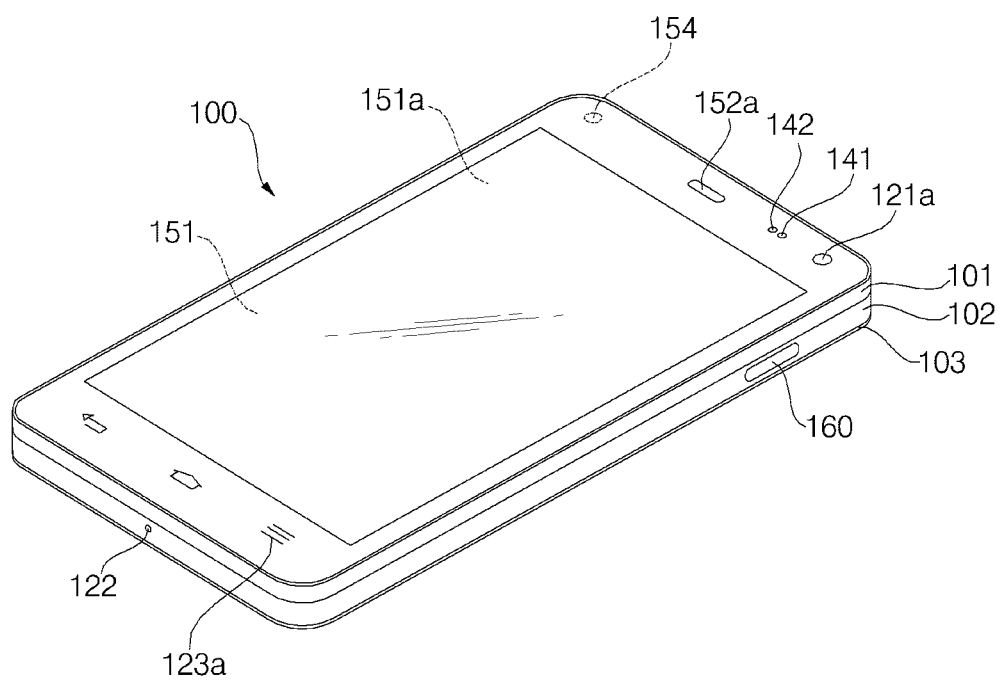

[FIG. 1C]
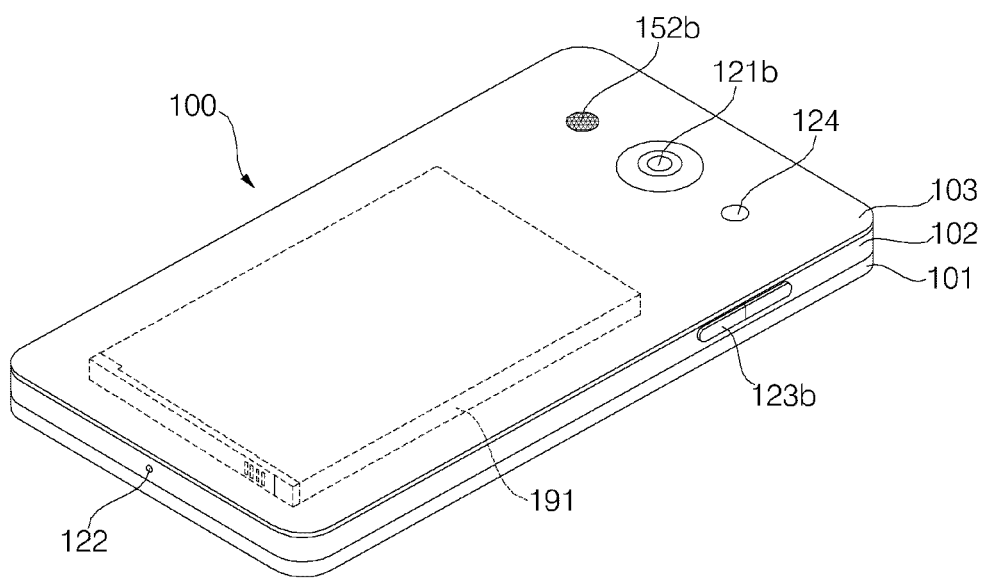

[FIG. 2A]
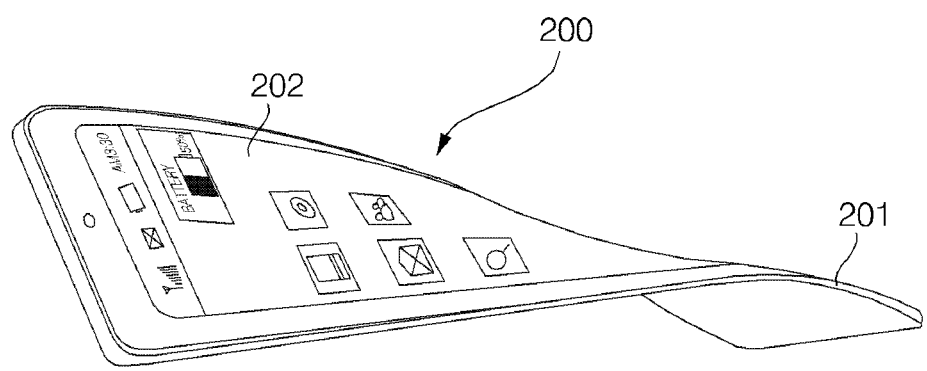

[FIG. 2B]
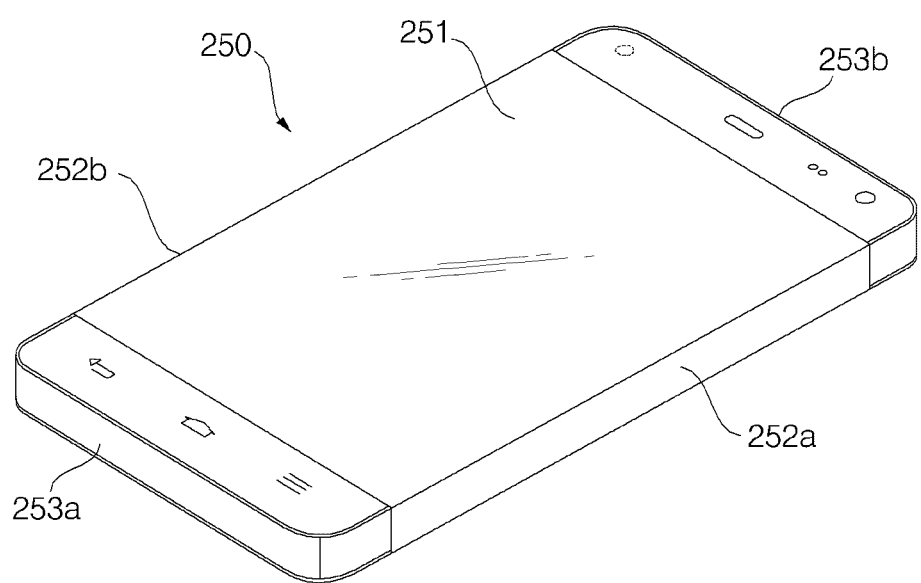

[FIG. 2C]
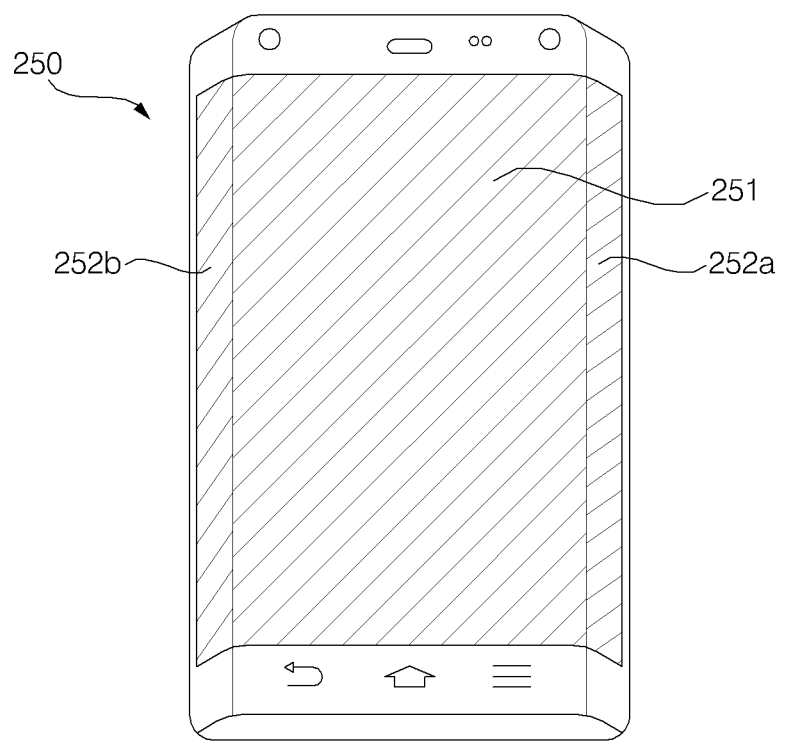

[FIG. 2D]
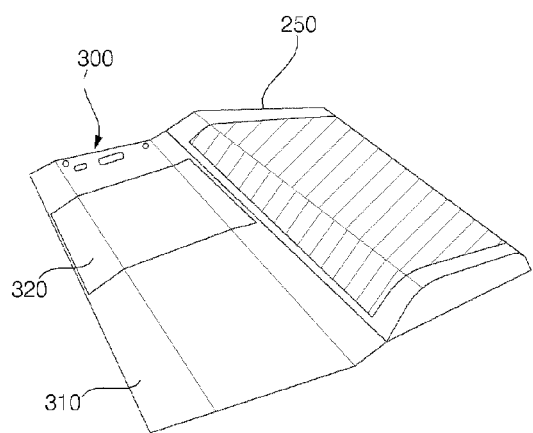
(a)
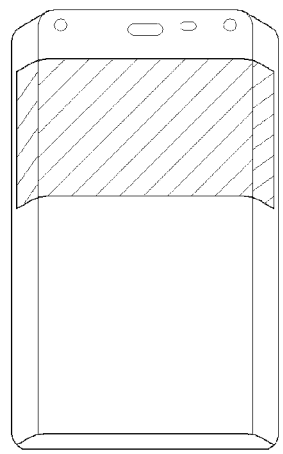
(b)

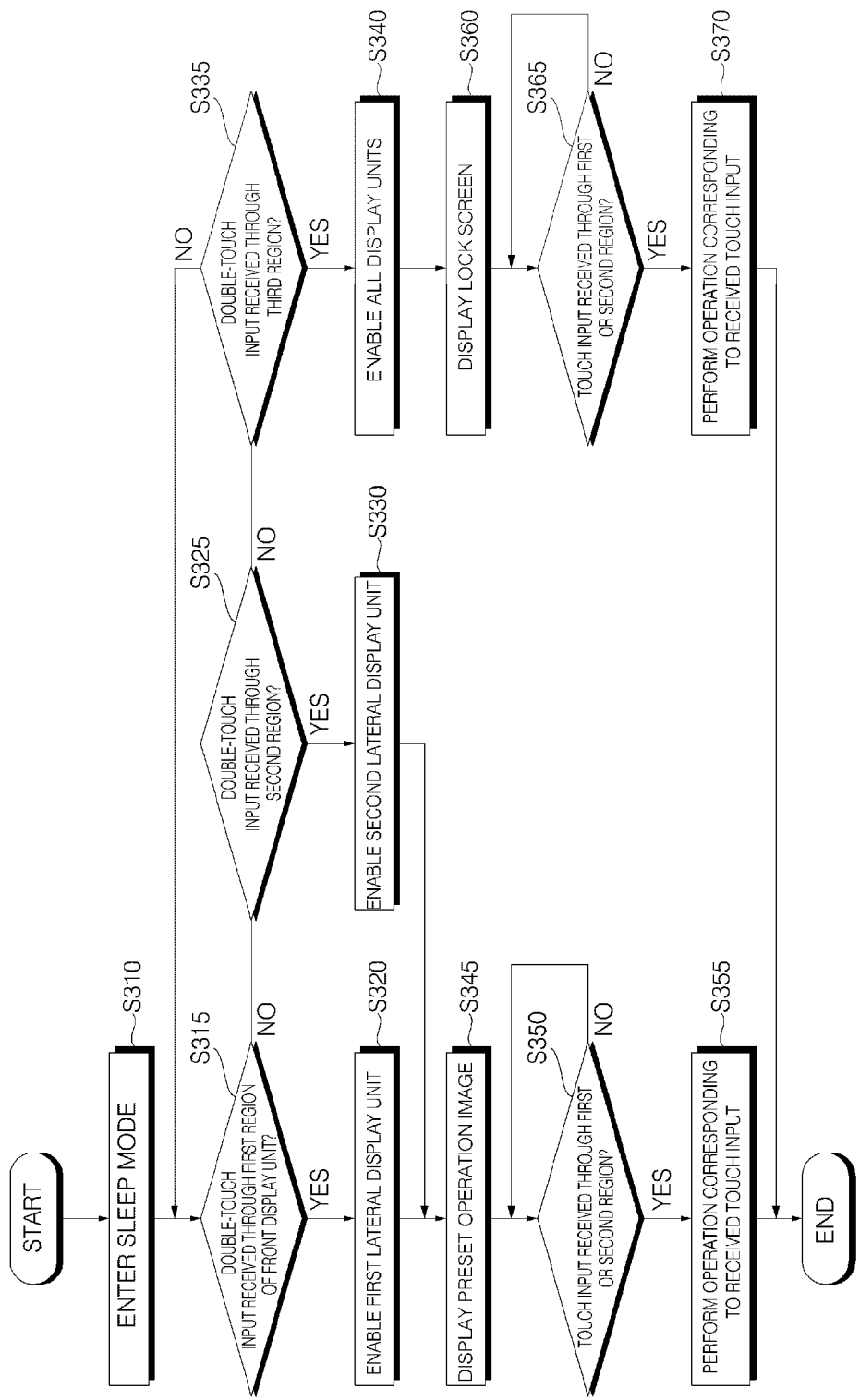

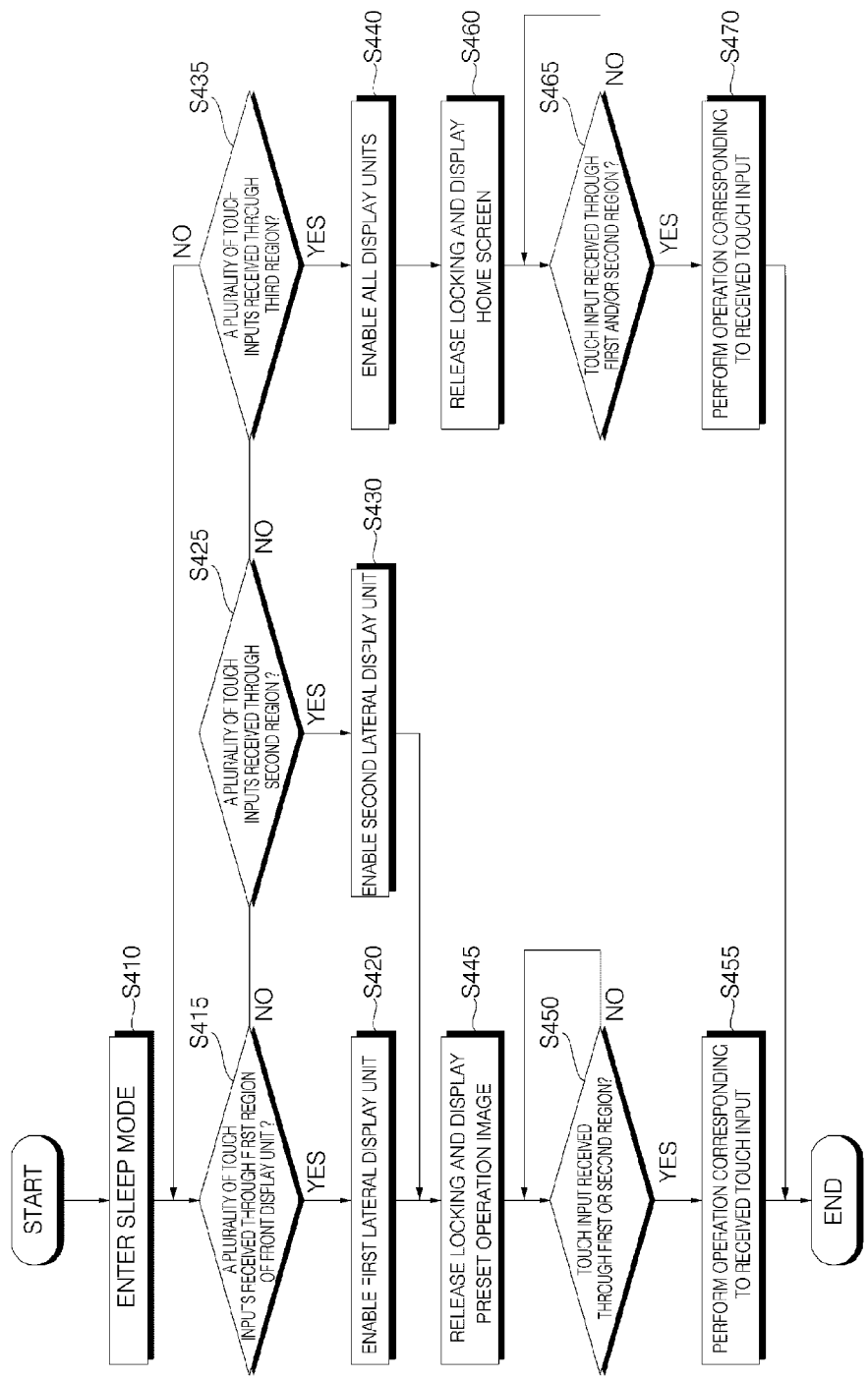

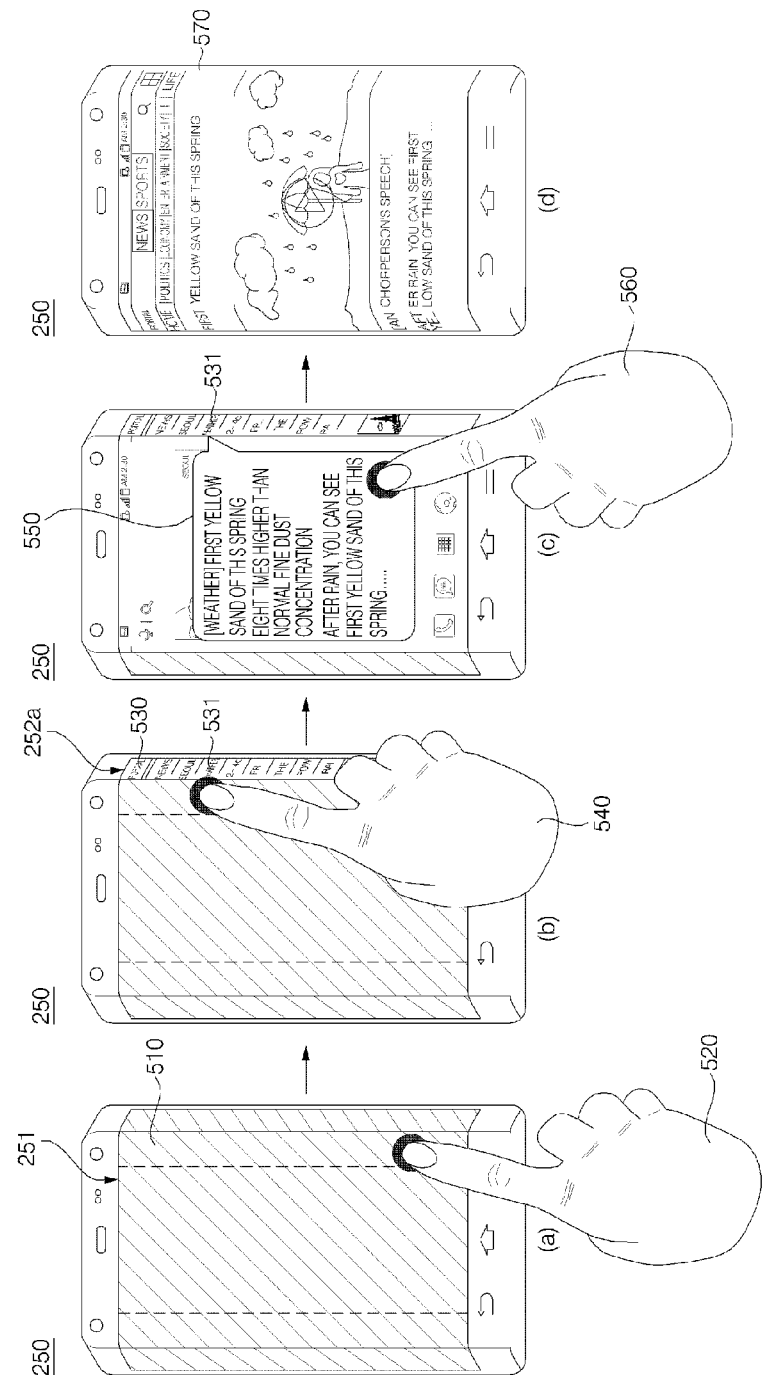

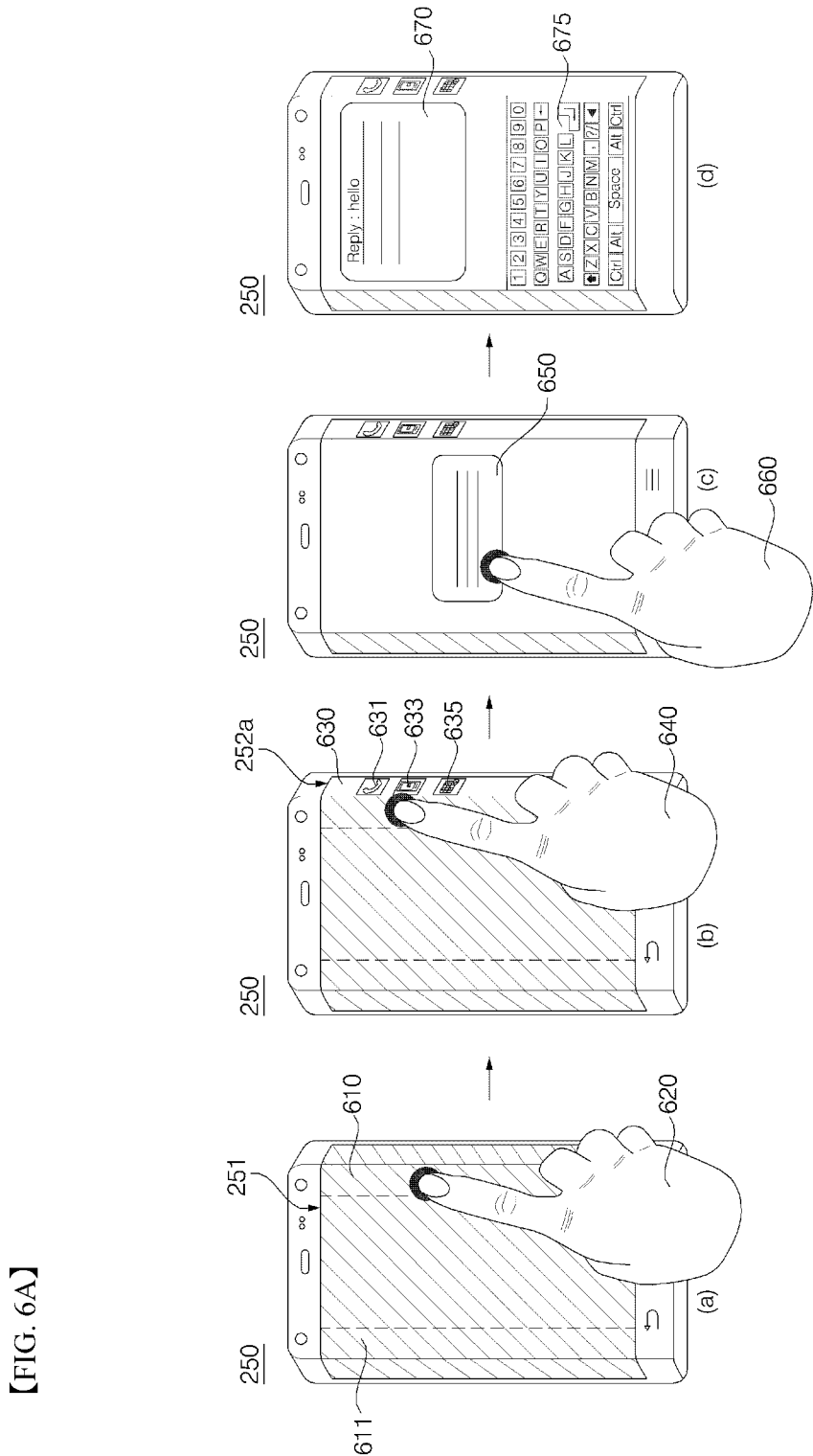
[FIG. 6A]

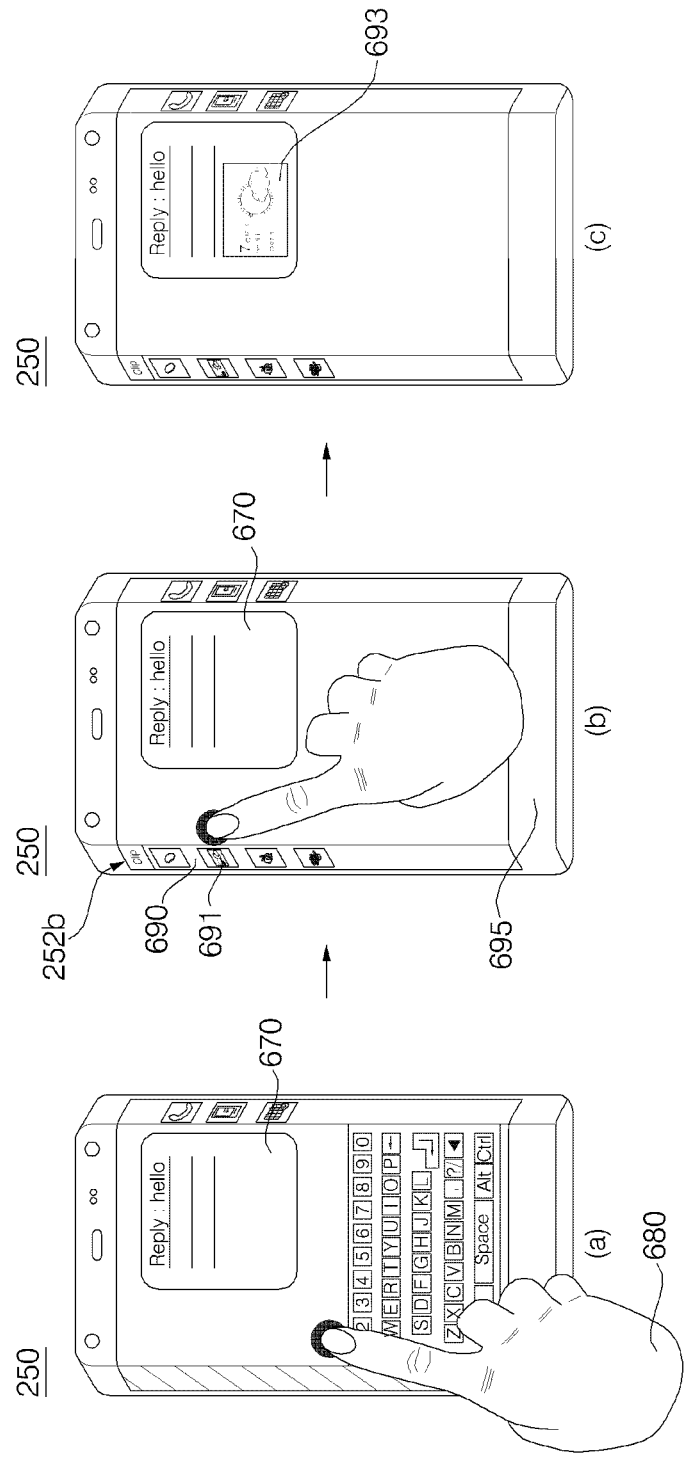
[FIG. 6B]

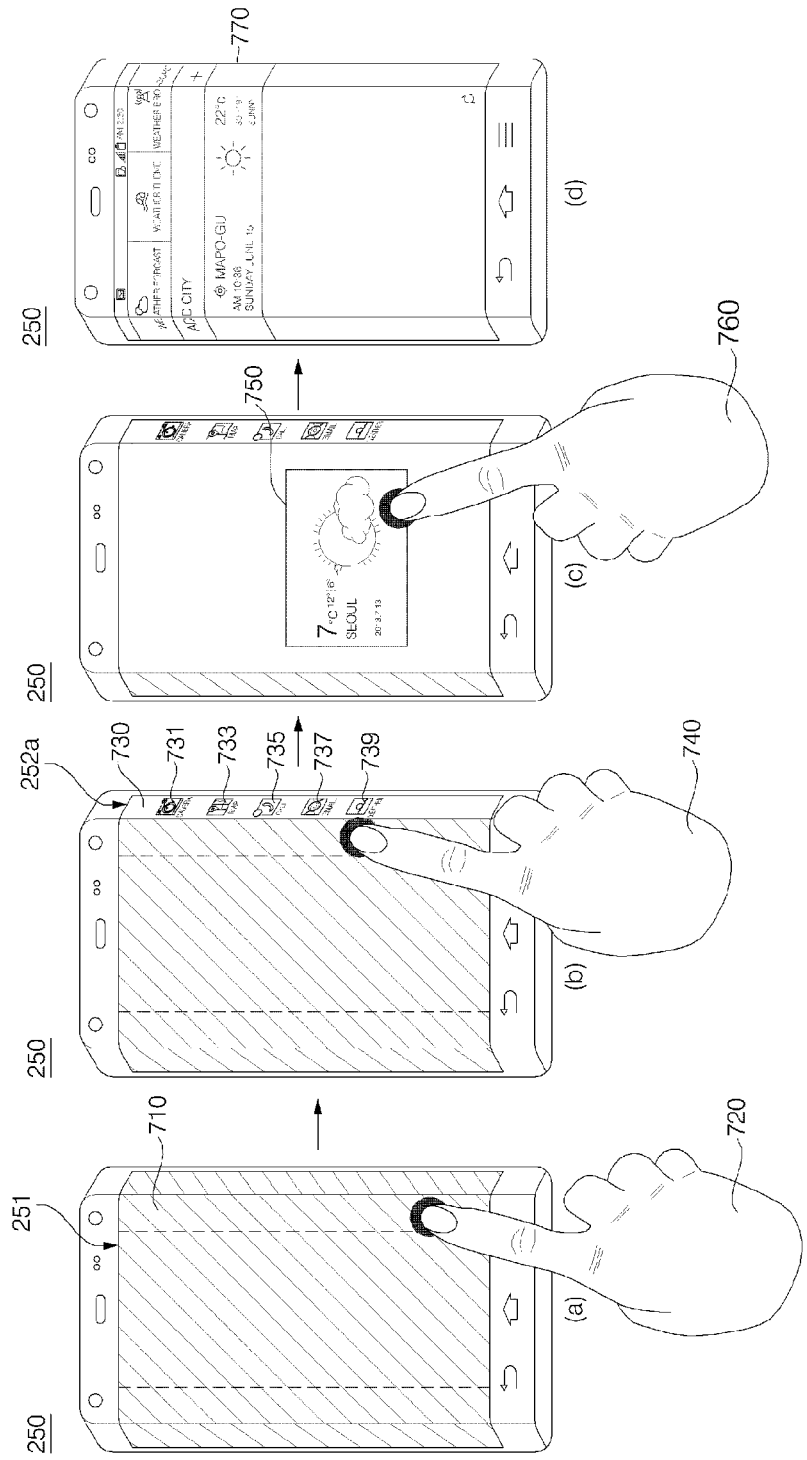

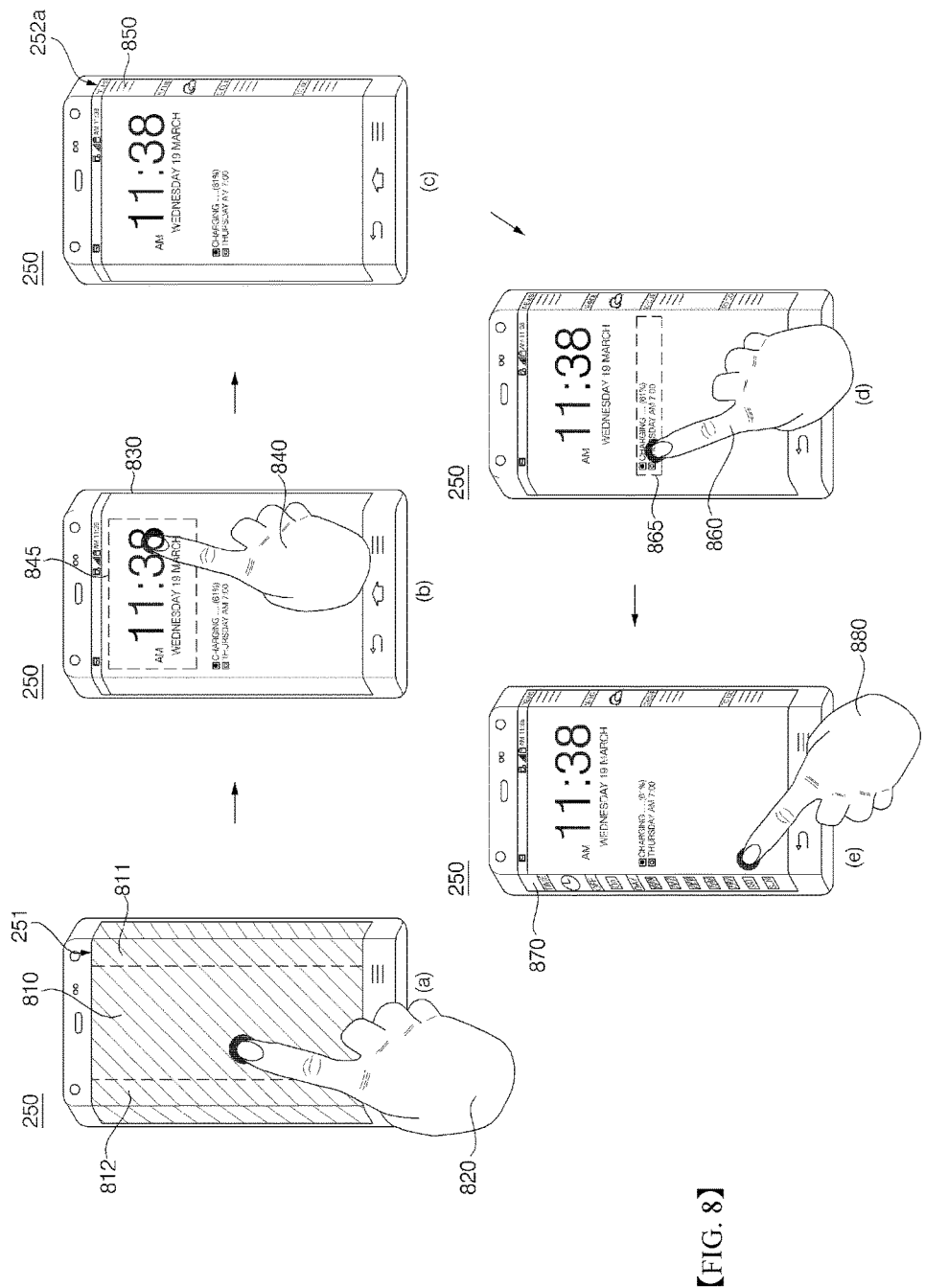
[FIG. 8]

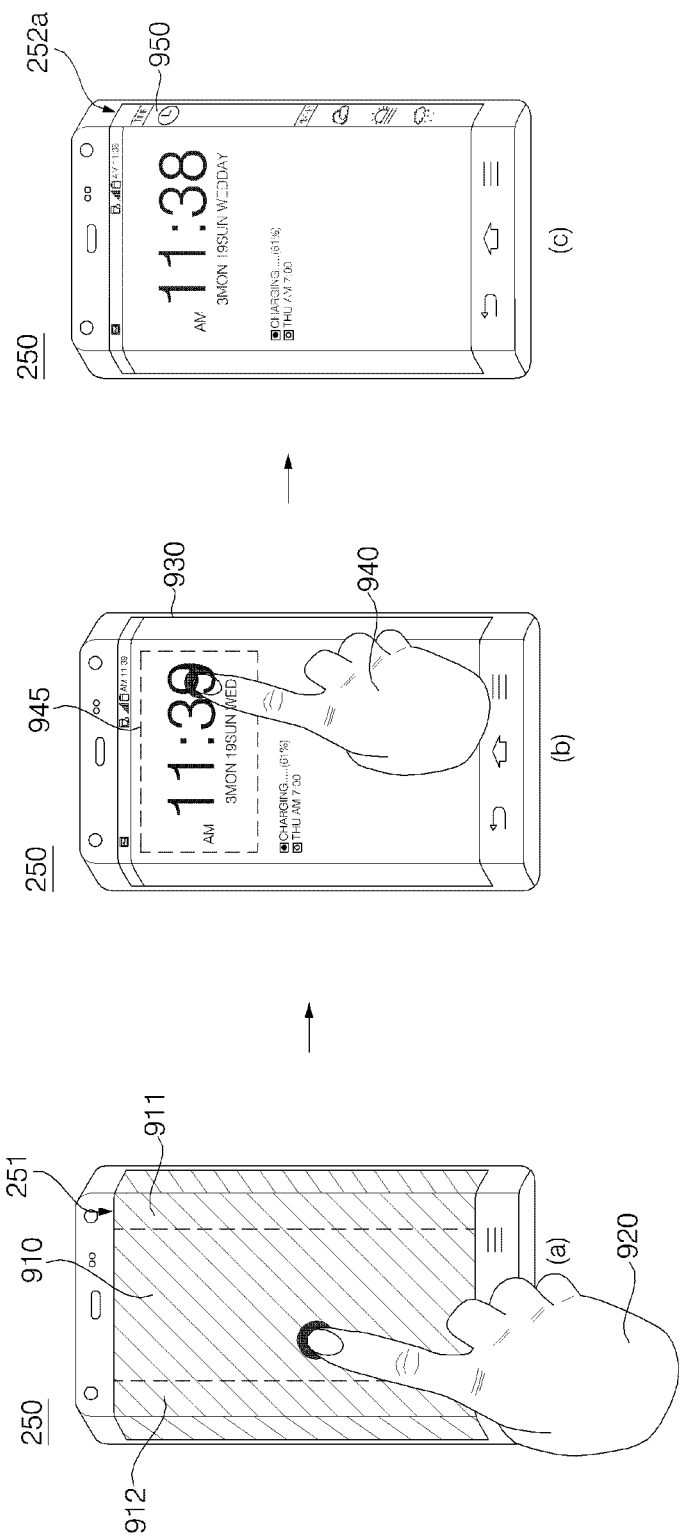
[FIG. 9]

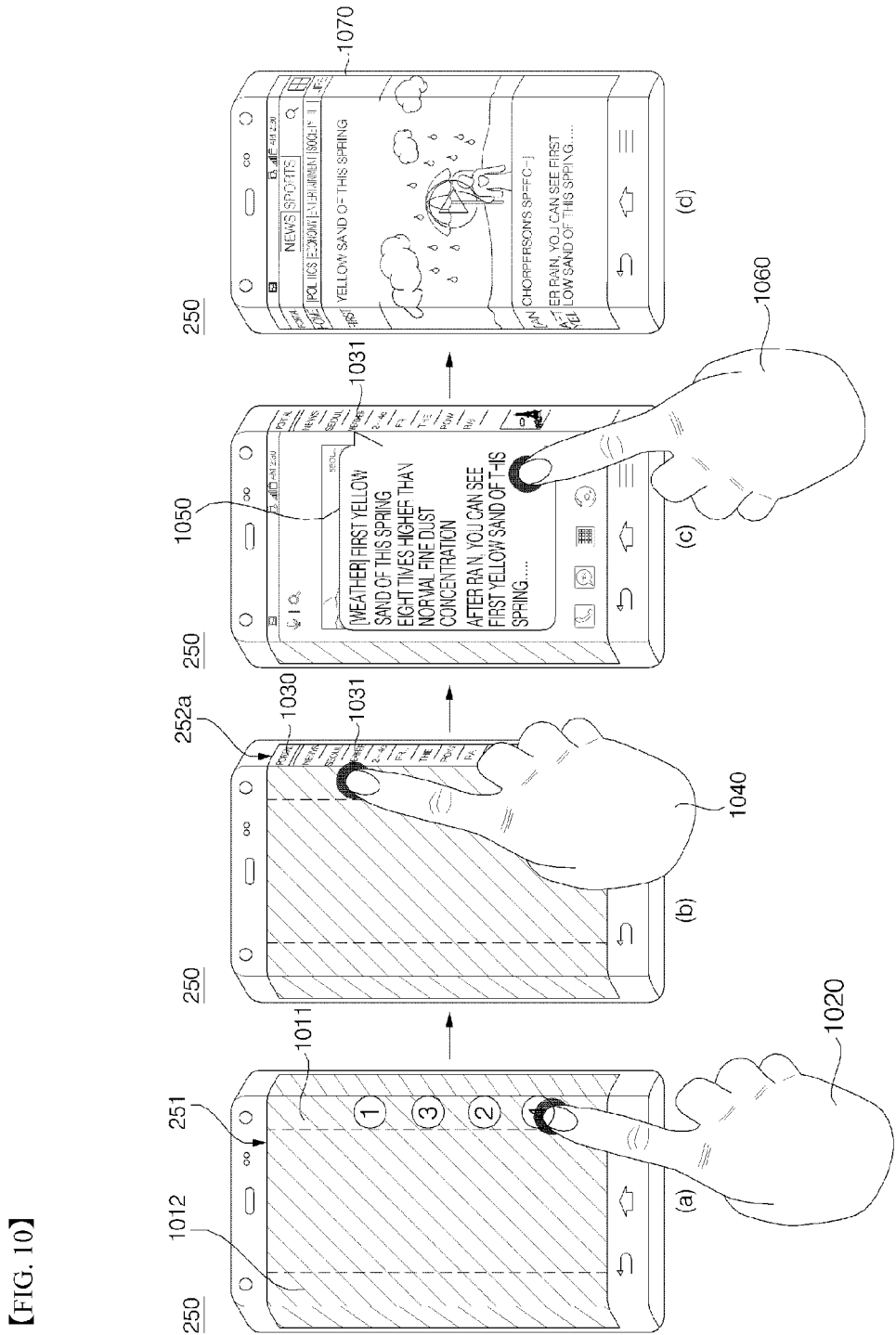
[FIG. 10]

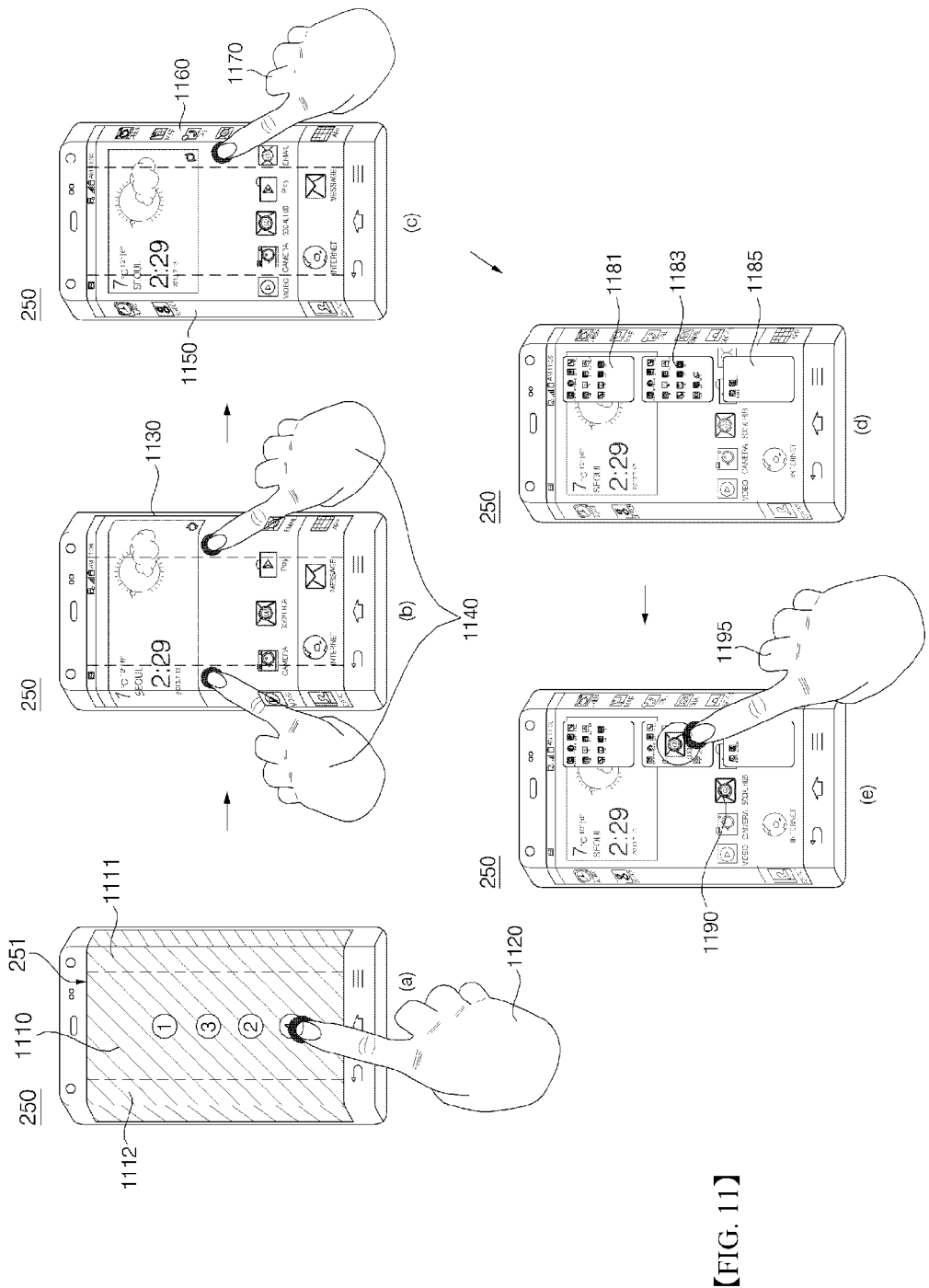
[FIG. 11]

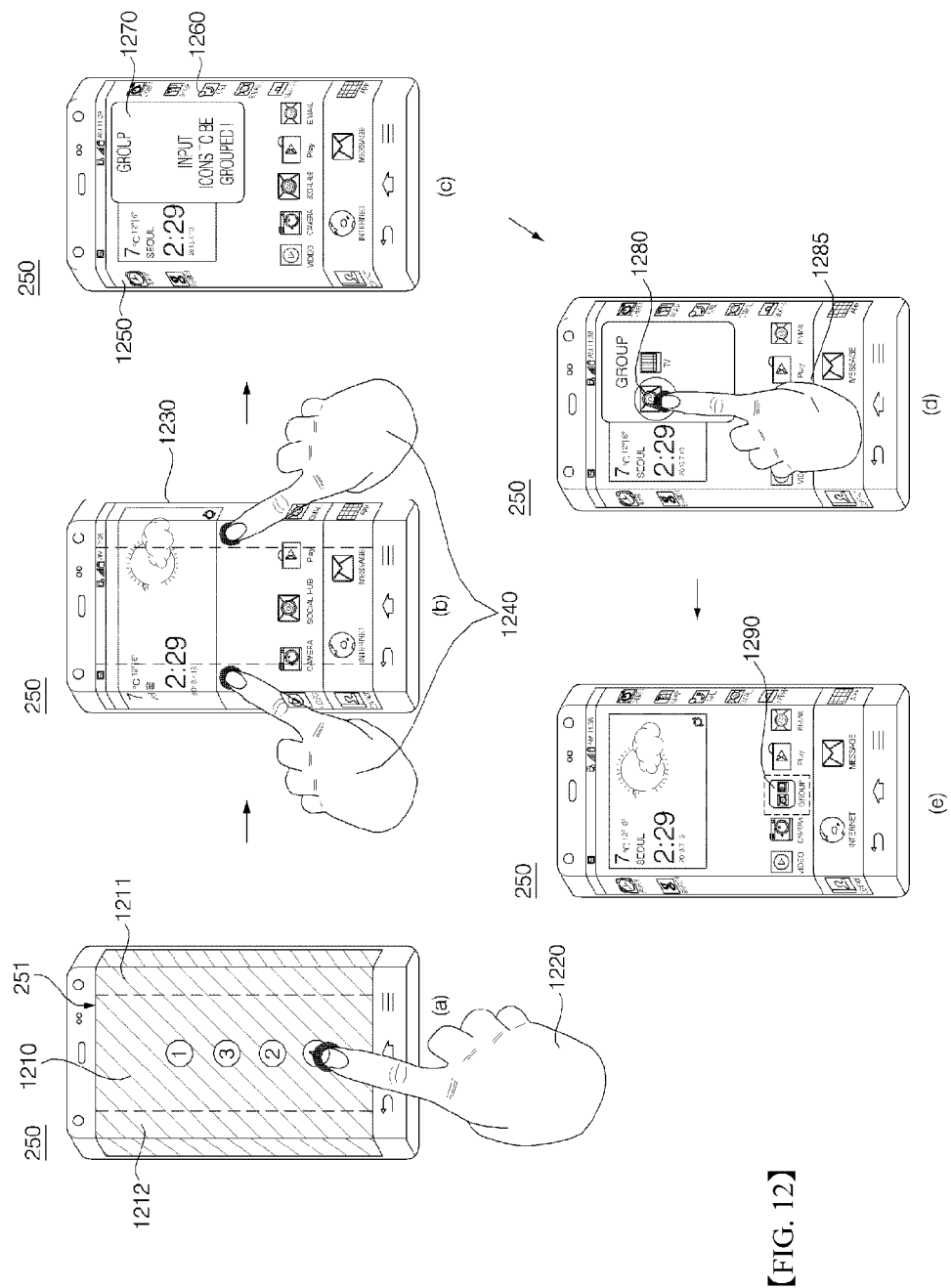
[FIG. 12]

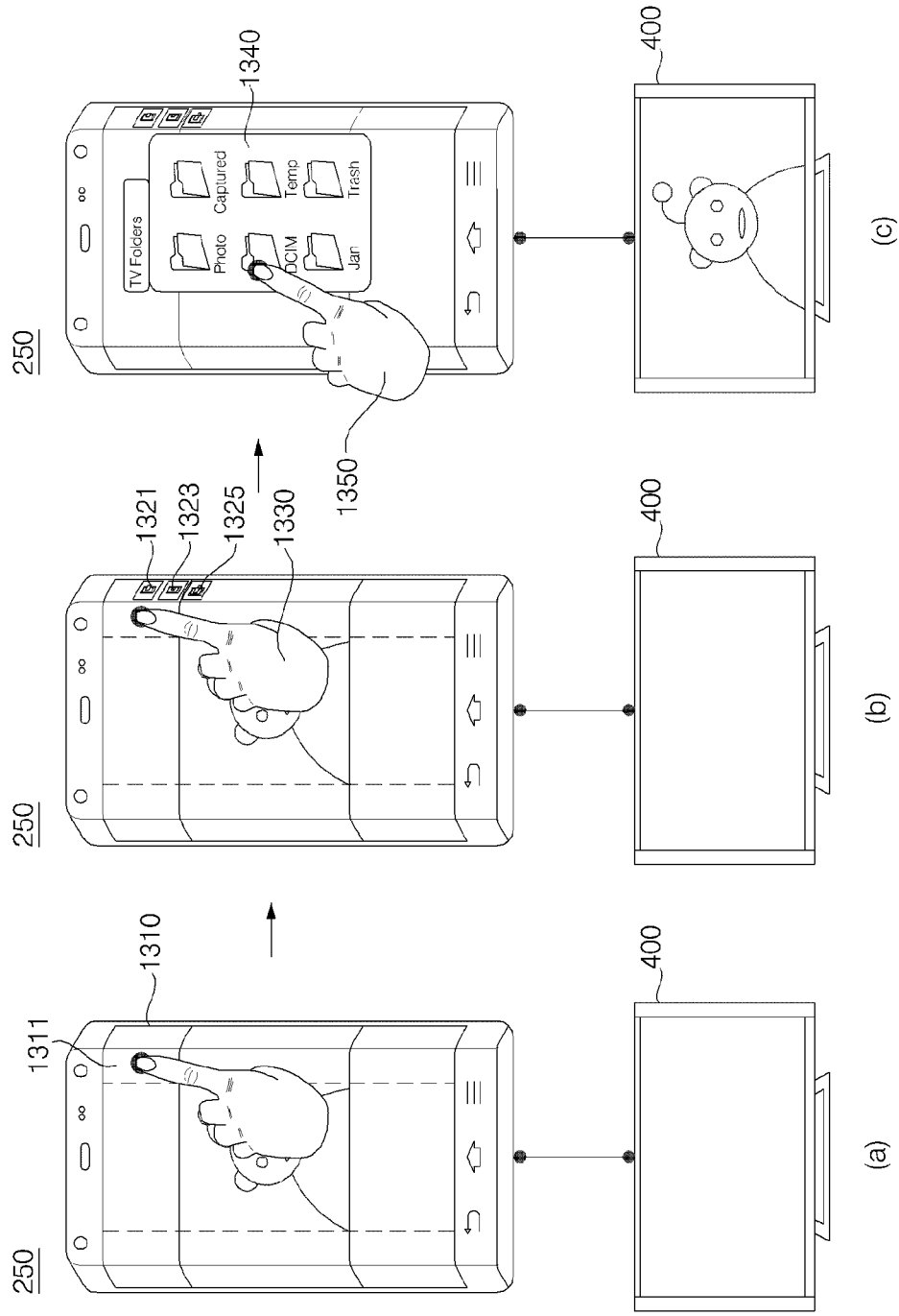
[FIG. 13]

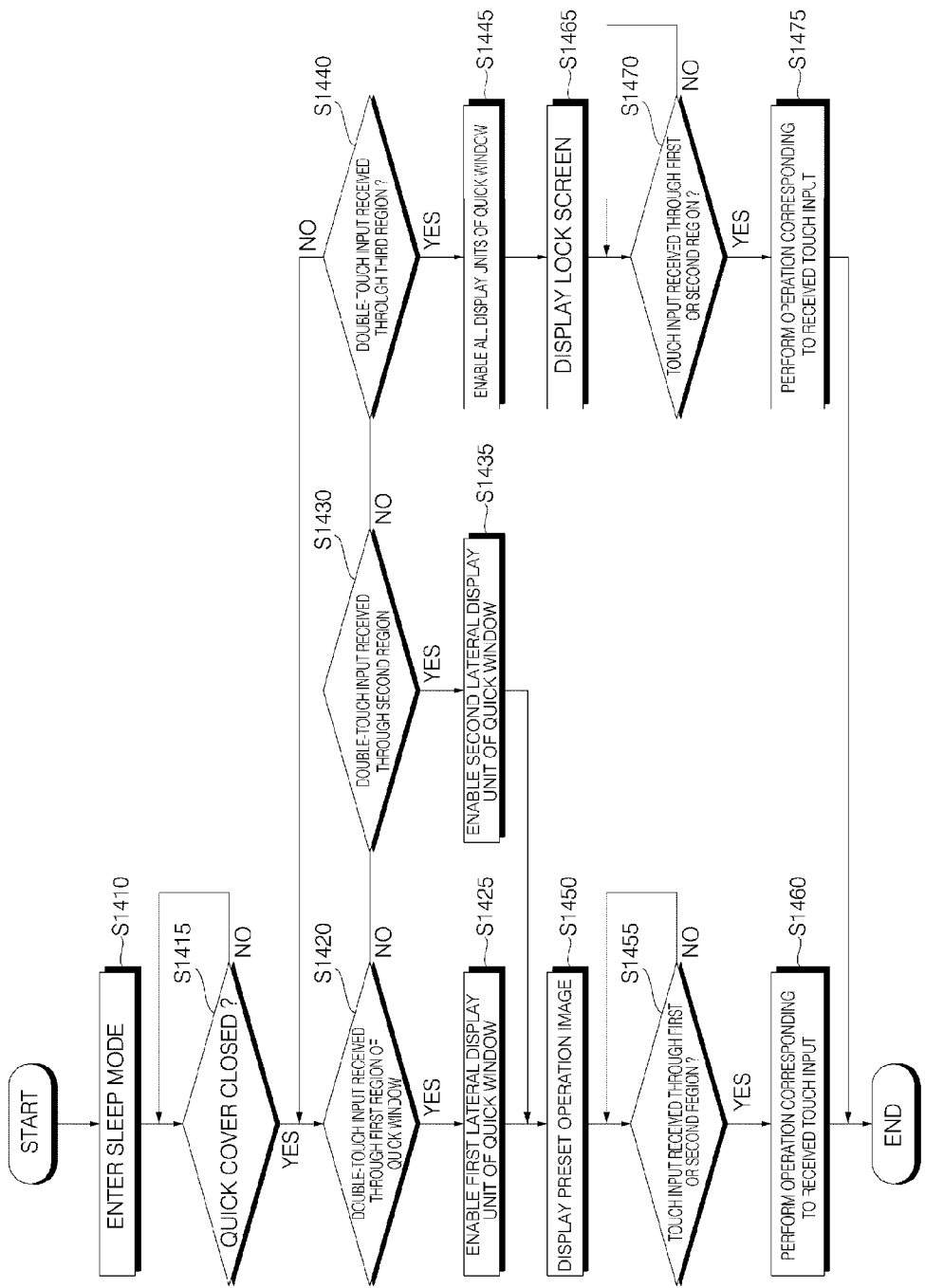
[FIG. 14]

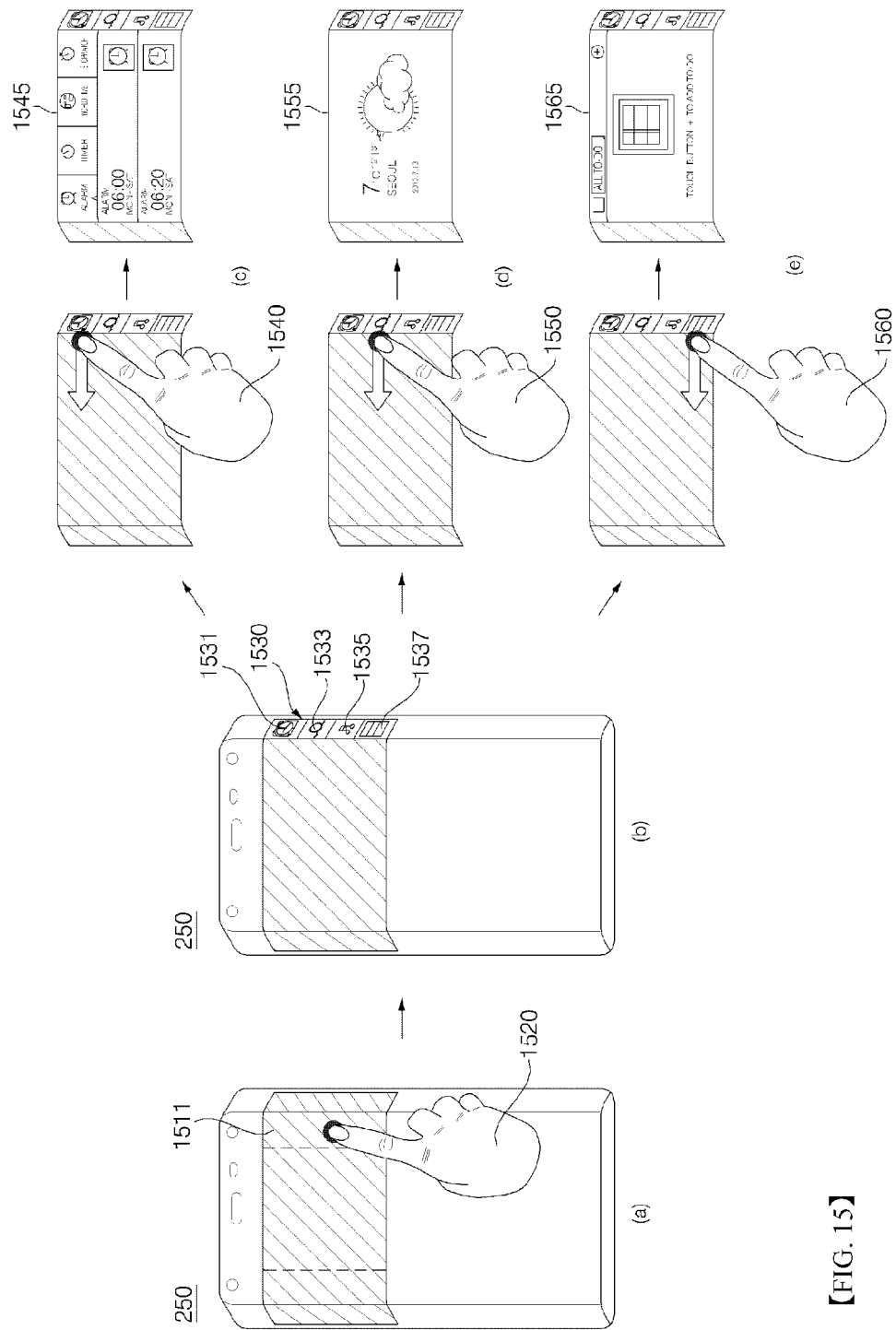
[FIG. 15]

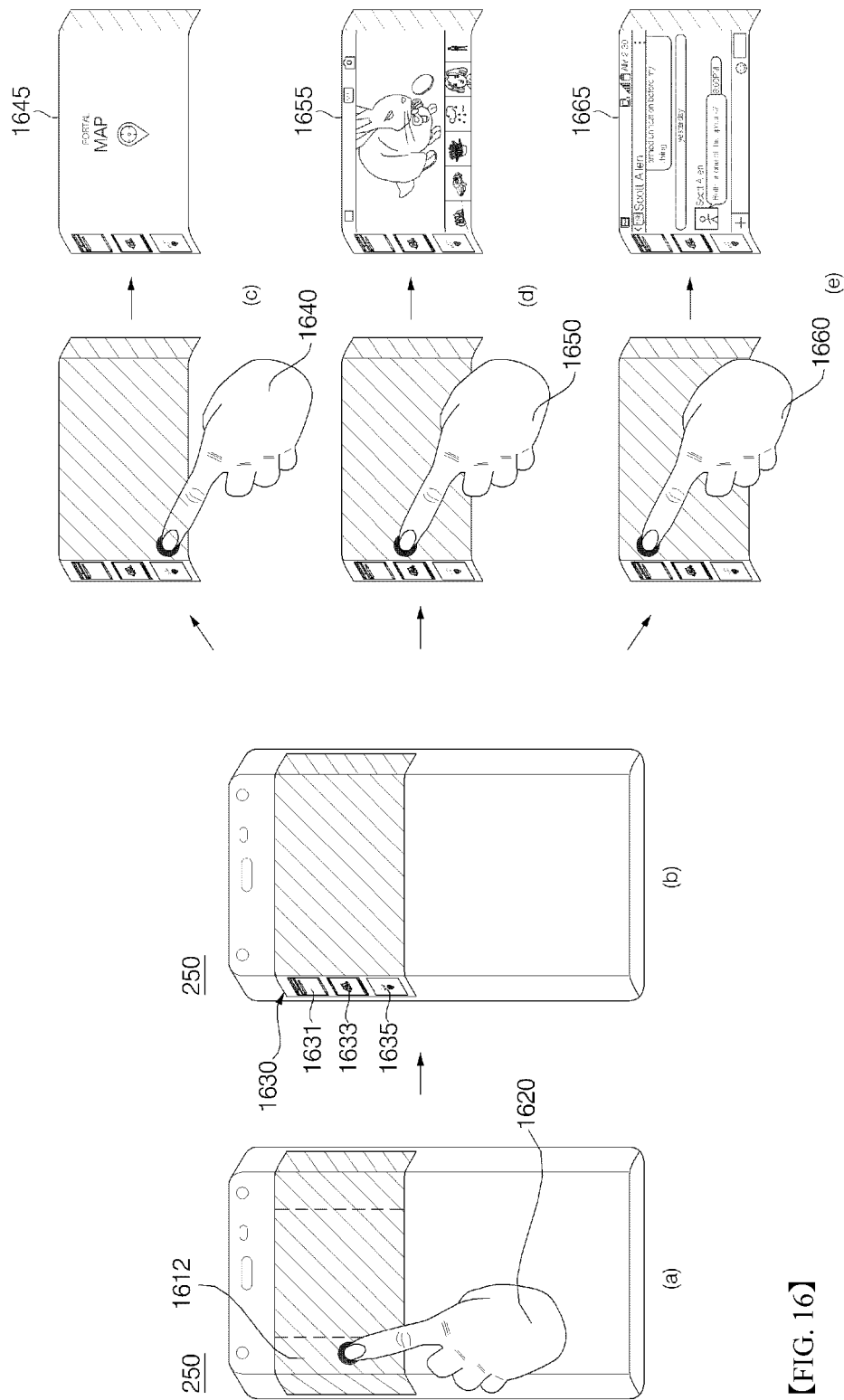
[FIG. 16]

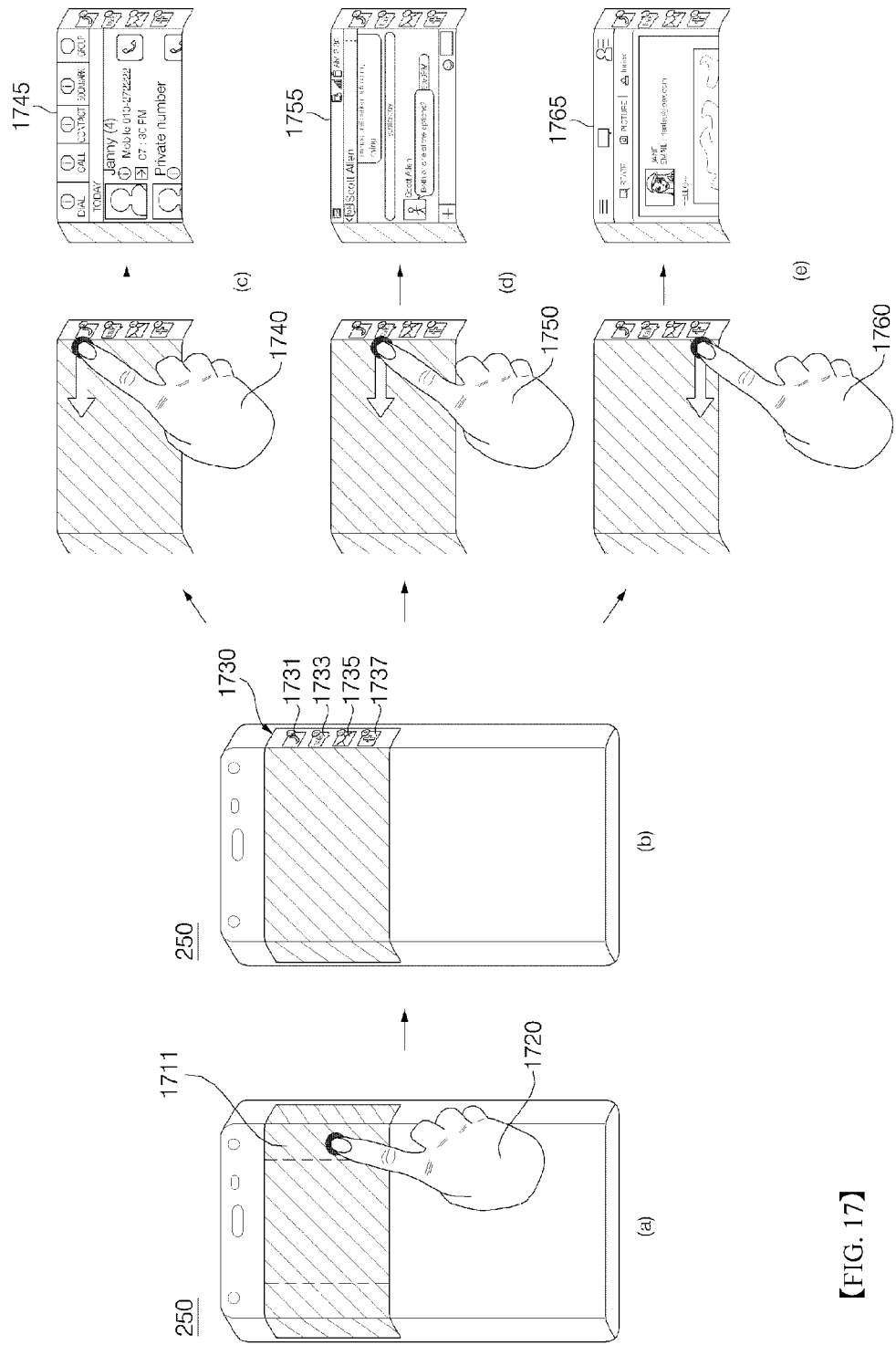
[FIG. 17]

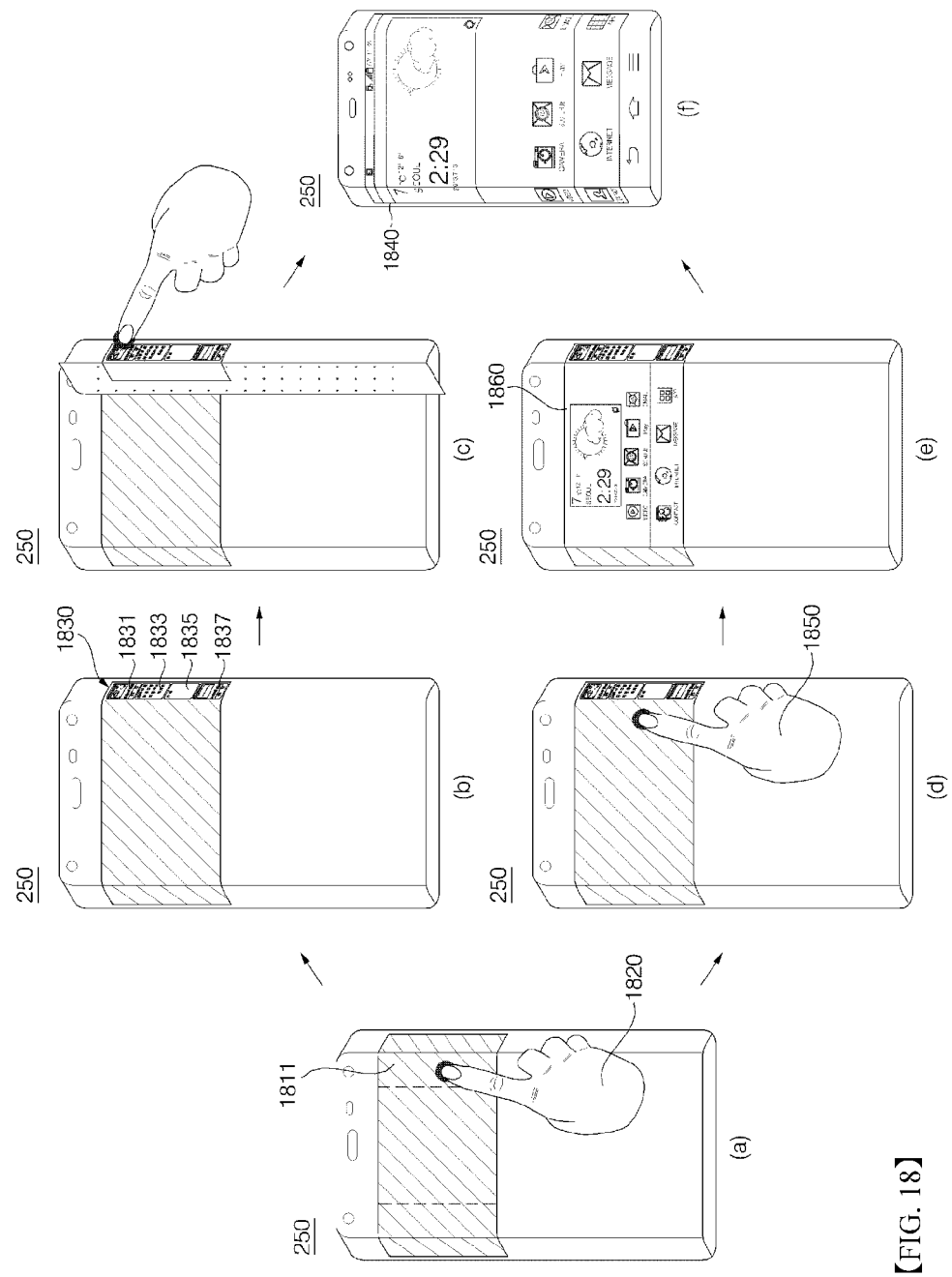
[FIG. 18]

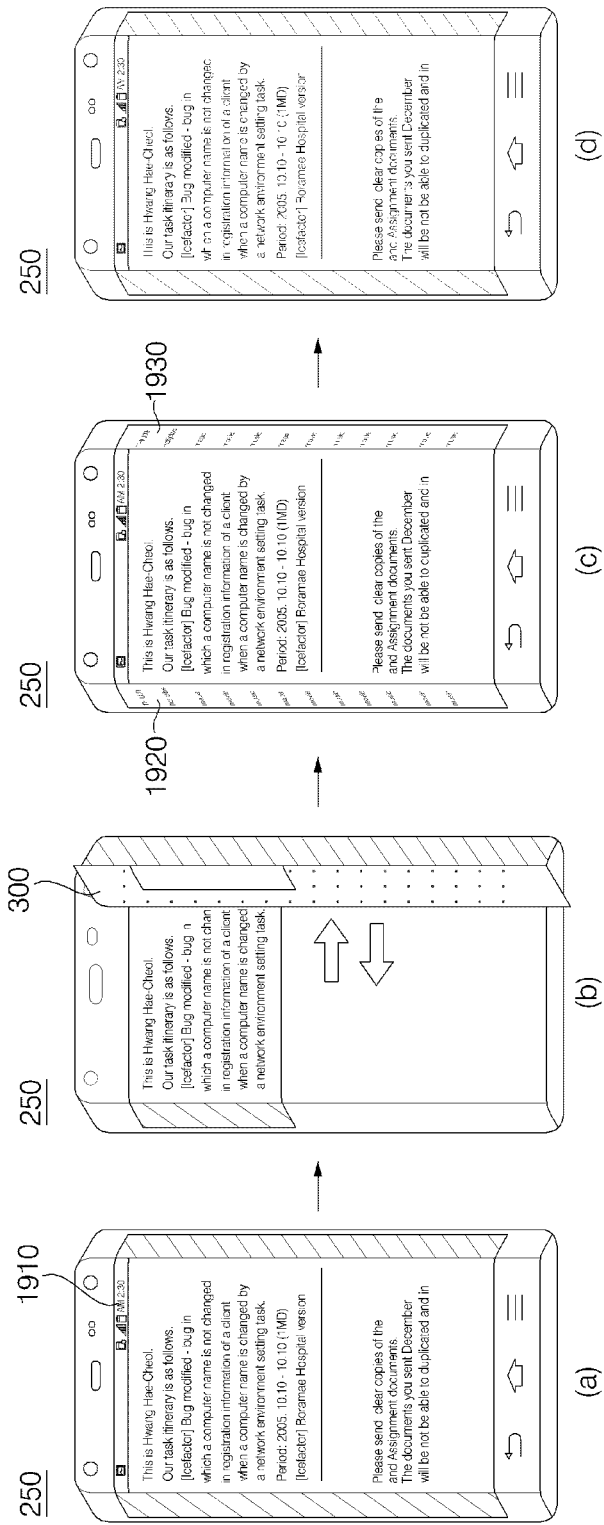
[FIG. 19]

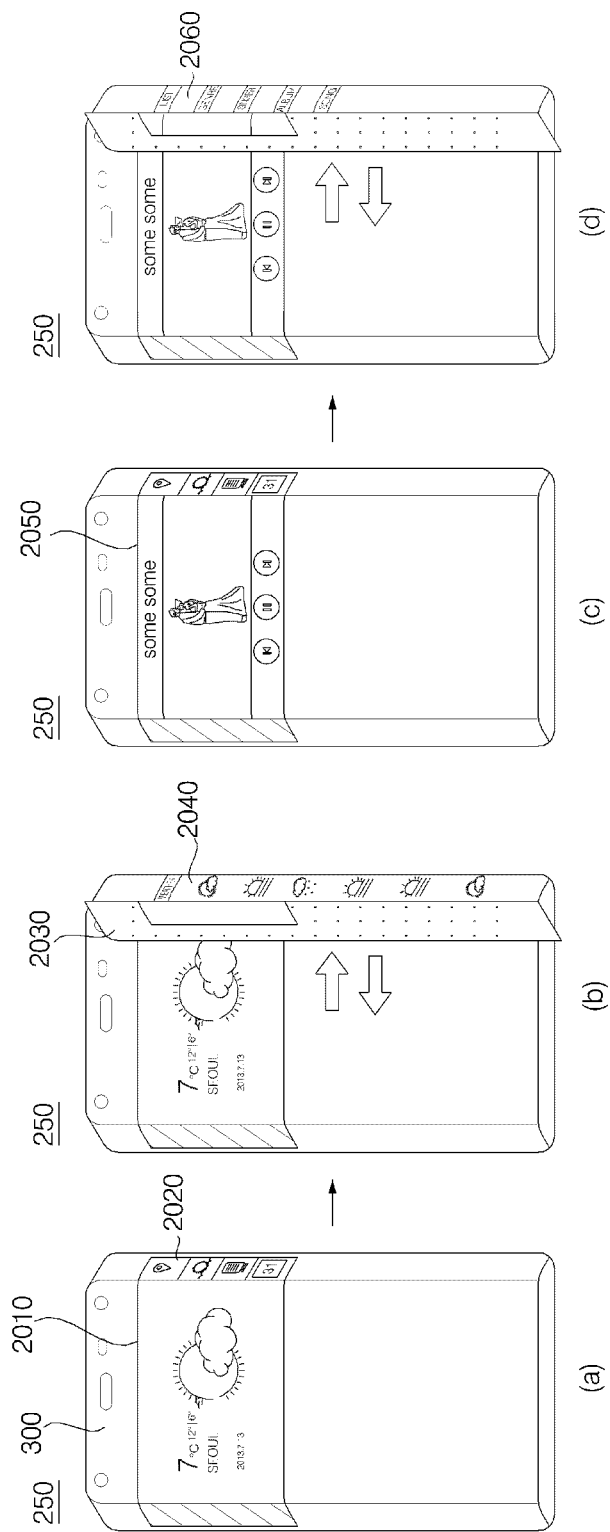
[FIG. 20]

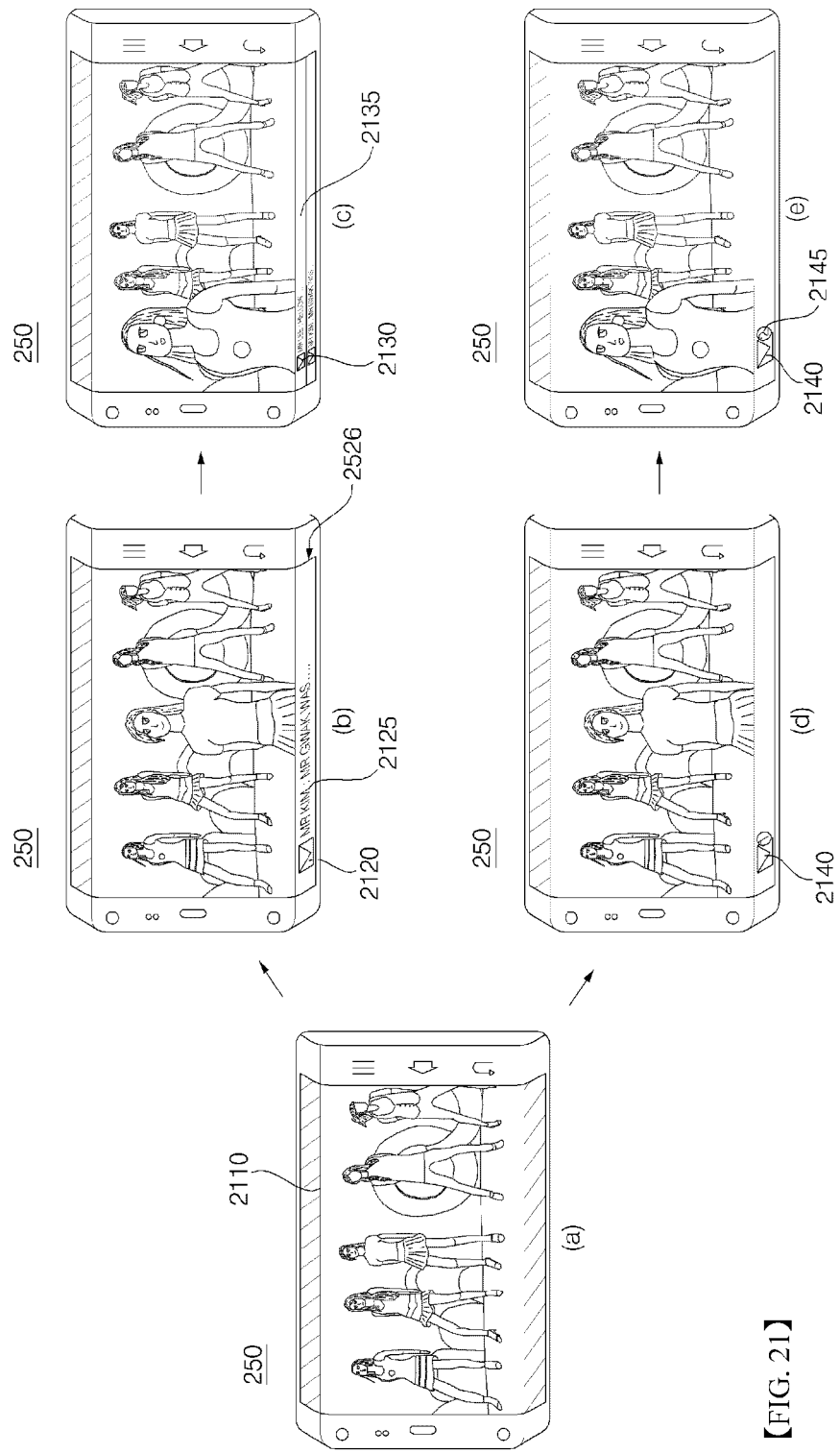
[FIG. 21]

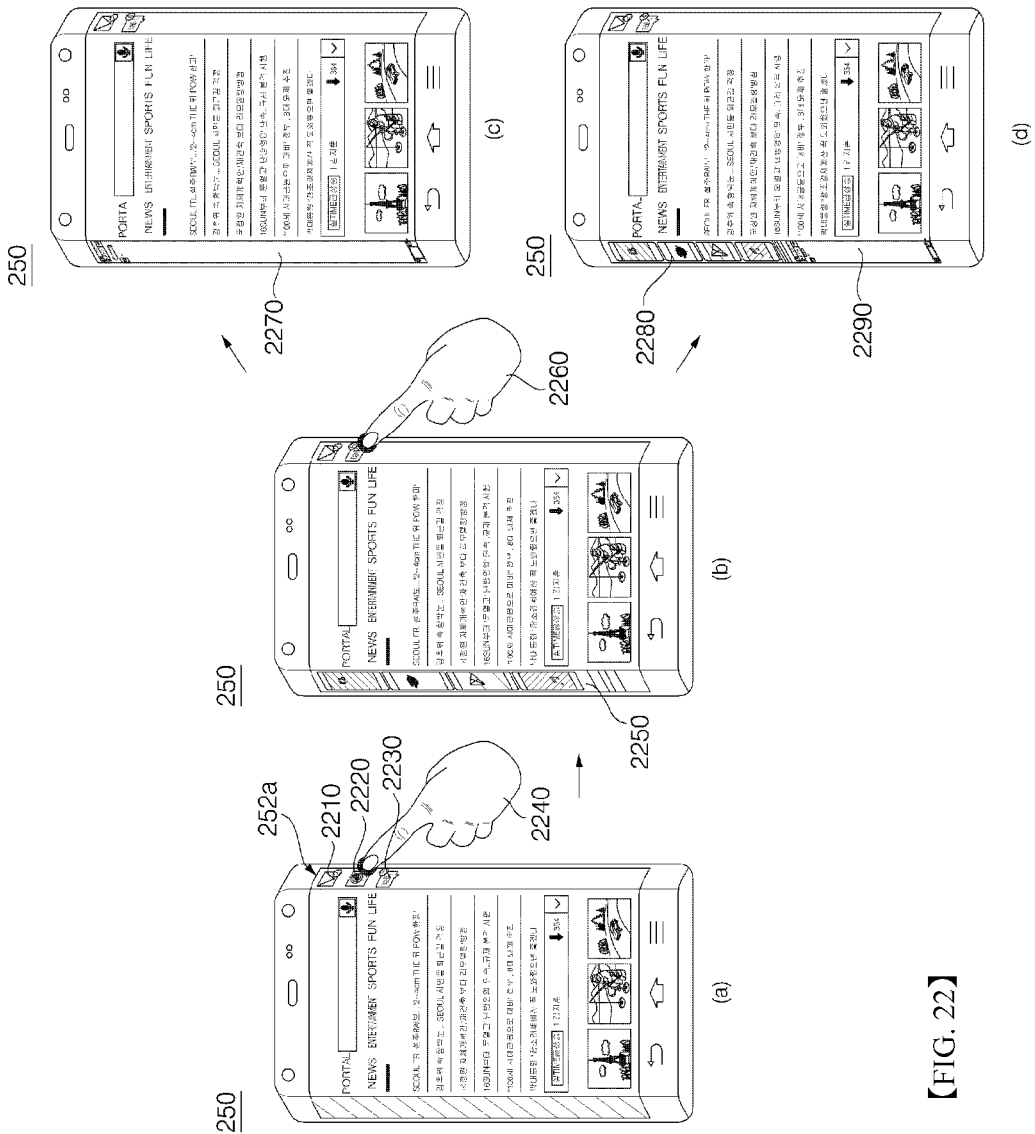
[FIG. 22]

[FIG. 23]
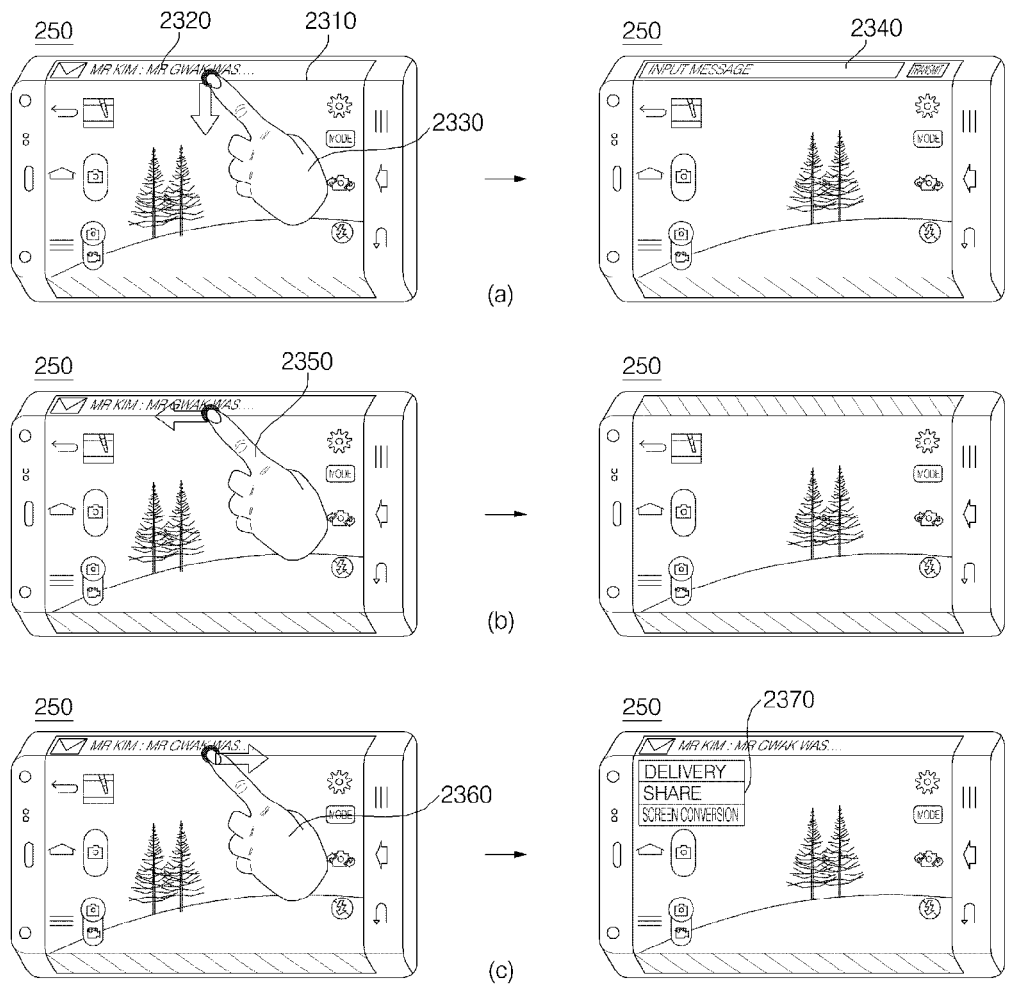

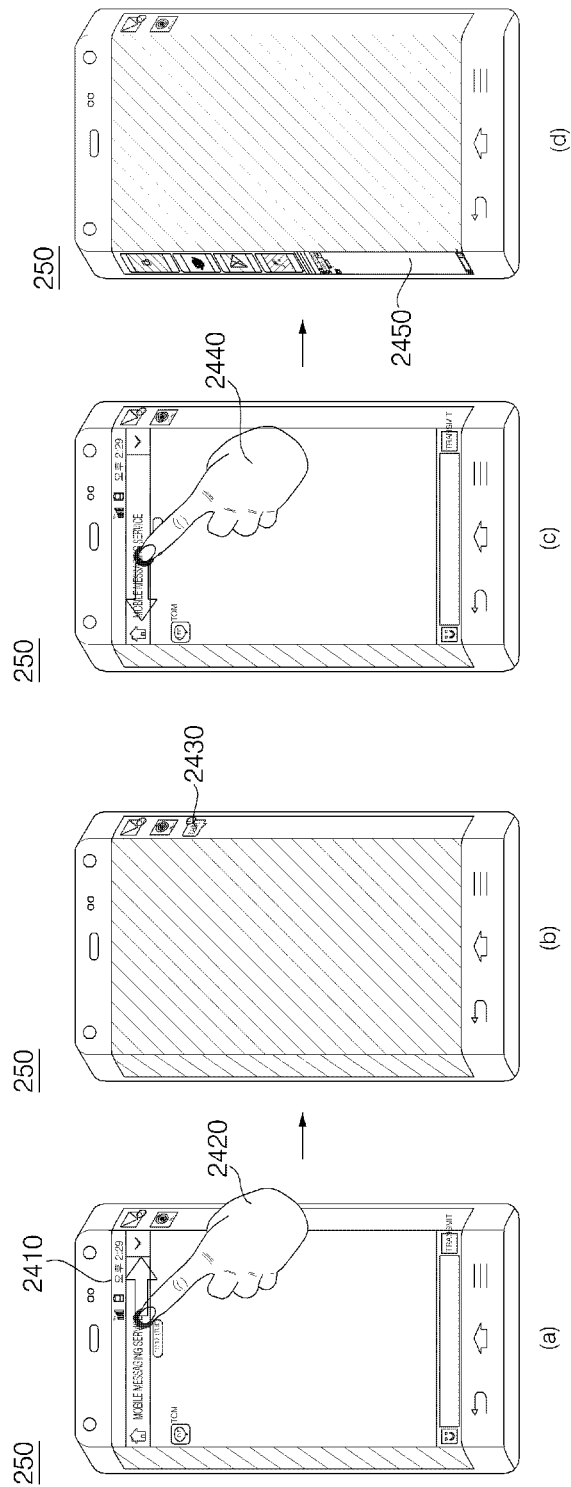
[FIG. 24]

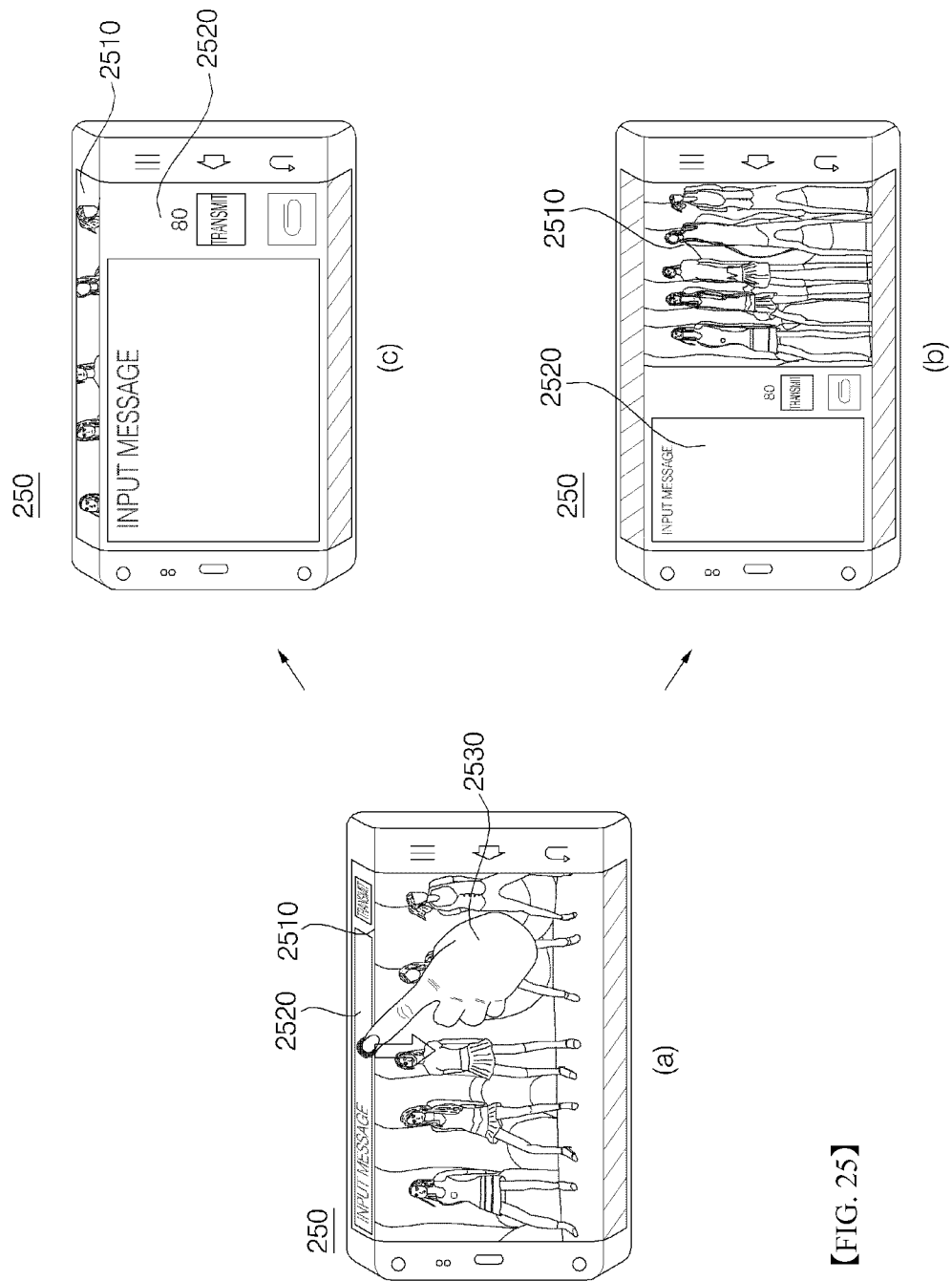
[FIG. 25]

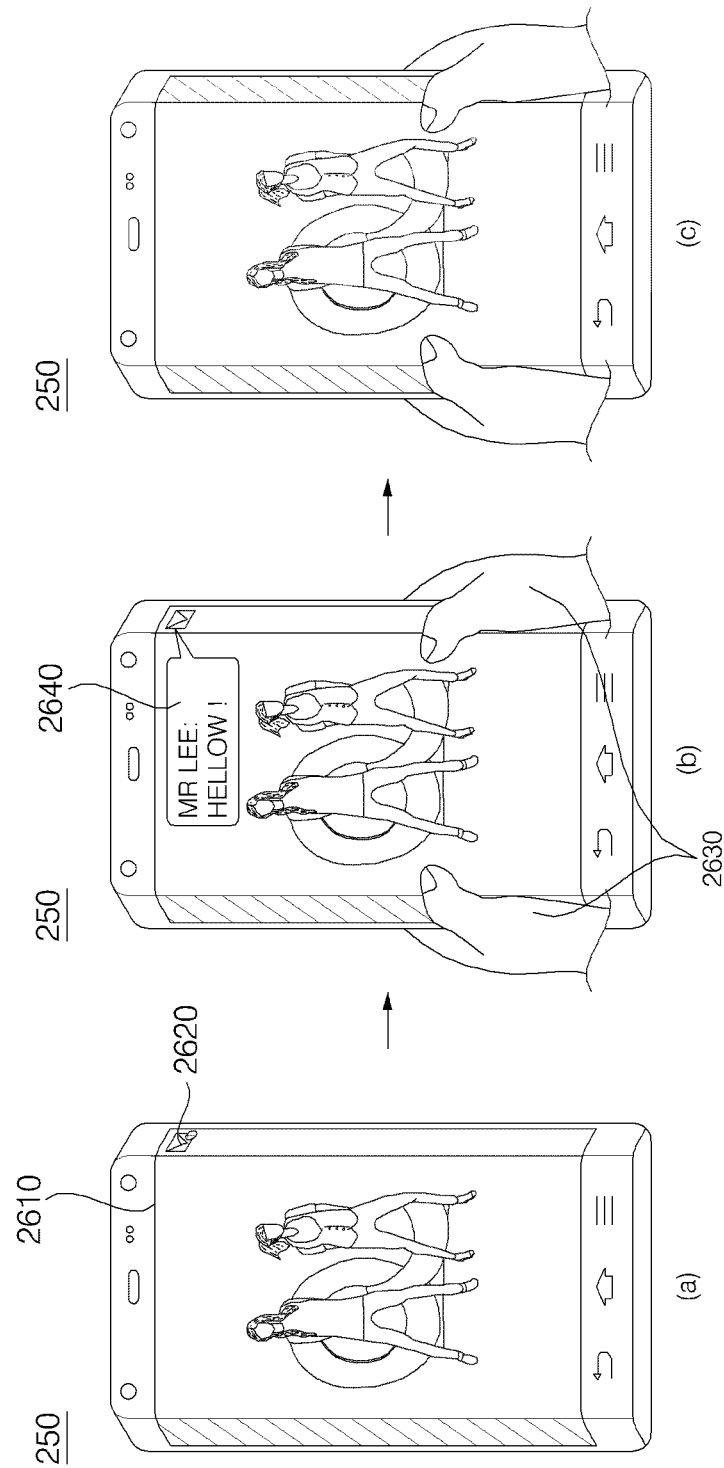
[FIG. 26]

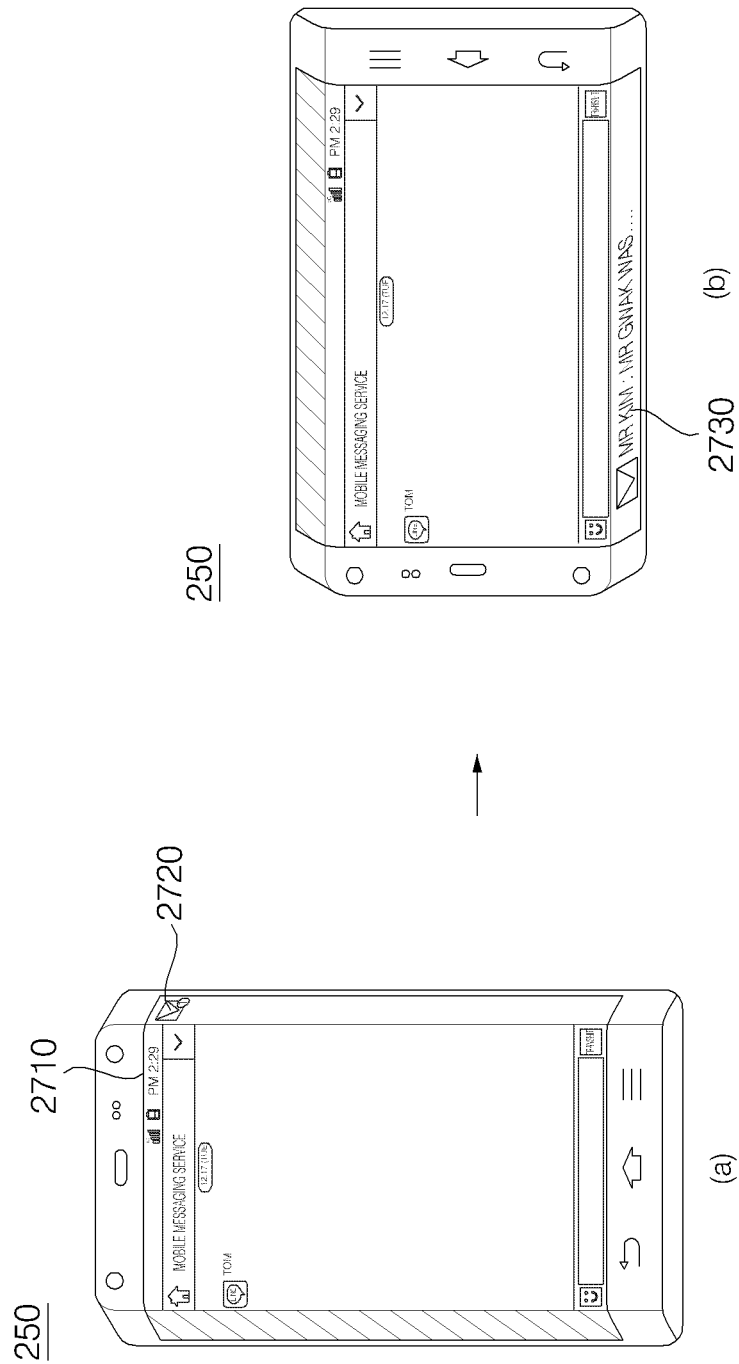

MOBILE TERMINAL AND CONTROL METHOD THEREOF

CROSS REFERENCE TO RELATED APPLICATIONS

This application is the National Phase of PCT International Application No. PCT/KR2014/005961, filed on Jul. 3, 2014, which claims priority under 35 U.S.C. 119(a) to Patent Application No. 10-2014-0076972, filed in Republic of Korea on Jun. 24, 2014, all of which are hereby expressly incorporated by reference into the present application.

TECHNICAL FIELD

The present invention relates to a mobile terminal and a control method thereof, and more particularly, to a mobile terminal and a control method thereof, for performing various operations using an expanded lateral display region.

BACKGROUND ART

A terminal may be classified into a mobile/portable terminal and a stationary terminal according to whether the terminal is movable. The mobile/portable terminal may be re-classified into a handheld terminal and a vehicle mounted terminal according to whether the terminal is directly portable by a user.

A function of a mobile terminal has been diversified. For example, the mobile terminal has functions of data and voice communication, photography of a still image and video through a camera, voice recording, reproduction of a music file through a speaker system, and output of an image or a video on a display unit. Some terminals further include an electronic game function or a multimedia player function. In particular, a recent mobile terminal may receive a multicast signal for providing broadcast or visual content such as a video or a television (TV) program.

As the terminal is diversified in function, the terminal is configured in the form of a multimedia player with multiple functions including photography of a still image and video, reproduction of a music file or a video file, gaming, and broadcast reception. Various new attempts to realize multiple functions of the mobile terminal embodied as a multimedia device have been applied in various ways in terms of hardware or software.

Examples of the multiple functions include a user interface environment for easy and convenient search or selection of a function by a user. In addition, as a mobile terminal has been considered as a personal belonging for expression of user's individuality, there has been a need for a design change for various forms such as a double-sided liquid crystal display (LCD) through which an image is viewed in opposite directions, a front touch screen, a flexible display, and so on.

However, it is necessary to consider the mobility or portability of a mobile terminal, and thus there is a limit in allocating a space for a user interface such as a display. Accordingly, in order to effectively use various functions provided by a mobile terminal, it is necessary to expand a space for a user interface to a lateral region of a terminal body using a flexible display and there is a need for a user interface using a new method for maximizing space usability.

DISCLOSURE

Technical Problem

An object of the present invention devised to solve the above and other problems lies in a mobile terminal and a control method thereof. It is another aspect of the present invention to provide a mobile terminal and a control method thereof, for selecting a lateral display unit with an image to be enabled based on touch input received through a front display unit and controlling an operation image displayed on the enabled lateral display unit.

It is another aspect of the present invention to provide a mobile terminal and a control method thereof, for selecting a lateral display unit with an image to be enabled based on touch input received through a front display unit corresponding to a quick window and controlling an operation image displayed on the enabled lateral display unit while a protective cover is mounted on the mobile terminal.

It is another aspect of the present invention to provide a mobile terminal and a control method thereof, for displaying notification information of an event on a lateral display unit and controlling the notification information when the event is received during use of a front display unit.

Technical Solution

In accordance with one aspect of the present invention, a mobile terminal includes at least one display unit disposed on a front surface and lateral surface of a terminal body, and a controller for, upon receiving a preset touch input through a first display region disposed on the front surface of the terminal body in a sleep mode, enabling a predetermined second display region according to a position of the received touch input and controlling the display unit to display a preset operation image on the enabled second display region.

In accordance with another aspect of the present invention, a method for controlling a mobile terminal including at least one display unit disposed on a front surface and lateral surface of a terminal body includes entering a sleep mode, receiving a preset touch input through a first display region disposed on the front surface of the terminal body, enabling a predetermined second display region according to a position of the received touch, and displaying a preset operation image on the enabled second display region.

Advantageous Effects

A mobile terminal and a control method thereof according to embodiments of the present invention have the following effects.

According to at least one of embodiments of the present invention, a lateral display region with an image to be enabled may advantageously be selected based on a position of a preset touch input received through a front display region and a preset operation image may be provided to the enabled lateral display region.

According to at least one of embodiments of the present invention, it is advantageous in that, when a lateral display region is narrow and thus it is difficult to touch the corresponding region or a touch sensor is not installed in the lateral display region and thus the corresponding region is not capable of being touched, the operation image displayed on the lateral display region may be easily controlled using the front display region.

Other effects will be directly or suggestively described in conjunction with the following embodiments of the present invention.

DESCRIPTION OF DRAWINGS

FIG. 1A is a block diagram for explanation of a mobile terminal 100 associated with embodiments of the present invention.

FIGS. 1B and 1C are diagrams for explanation of a concept of a mobile terminal viewed from different directions, associated with embodiments of the present invention.

FIG. 2A is a diagram for explanation of a concept of another example of a mobile terminal that is modifiable according to an embodiment of the present invention.

FIGS. 2B and 2C are diagrams illustrating the concept of another example of a mobile terminal that is modifiable according to an embodiment of the present invention.

FIG. 2D is a diagram for explanation of an example of a mobile terminal including a protective cover installed thereon.

FIG. 3 is a flowchart for explanation of an operation of a mobile terminal according to a first embodiment of the present invention.

FIG. 4 is a flowchart for explanation of an operation of a mobile terminal according to a second embodiment of the present invention.

FIG. 5 is a diagram for explanation of an operation for displaying a last execution image on a lateral display unit in response to touch input received through a front display unit in a mobile terminal according to a first embodiment of the present invention.

FIGS. 6A and 6B are diagrams for explanation of an operation for displaying unchecked event information items on a lateral display unit in response to touch input received through a front display unit in a mobile terminal according to a first embodiment of the present invention.

FIG. 7 is a diagram for explanation of an operation for displaying preset app icons and/or widgets on a lateral display unit in response to touch input received through a front display unit in a mobile terminal according to a first embodiment of the present invention.

FIGS. 8 and 9 are diagrams for explanation of an operation for performing a function associated with a lock screen in response to touch input received through a front display unit in a mobile terminal according to a first embodiment of the present invention.

FIG. 10 is a diagram for explanation of an operation for displaying a last execution image on a lateral display unit in response to touch input received through a front display unit in a mobile terminal according to a second embodiment of the present invention.

FIGS. 11 and 12 are diagrams for explanation of an operation for performing a function associated with a home screen in response to touch input received through a front display unit in a mobile terminal according to a second embodiment of the present invention.

FIG. 13 is a diagram for explanation of an operation of controlling another electronic apparatus that is connected to a mobile terminal by wire or wirelessly in response to touch input received through a front display unit in a mobile terminal according to an embodiment of the present invention.

FIG. 14 is a flowchart for explanation of an operation of a mobile terminal according to a third embodiment of the present invention.

FIG. 15 is a diagram for explanation of an operation of displaying preset app icon and/or widgets on a lateral display unit in response to touch input received through a quick window in a mobile terminal according to a third embodiment of the present invention.

FIG. 16 is a diagram for explanation of an operation for displaying a list of currently multitasked images on a lateral display unit in response to touch input received through a quick window in a mobile according to a third embodiment of the present invention.

FIG. 17 is a diagram for explanation of an operation for displaying unchecked event information items on a lateral display unit in response to touch input received through a quick window in a mobile terminal according to a third embodiment of the present invention.

FIG. 18 is a diagram for explanation of an operation for listing a home screen on a lateral display unit in response to touch input received through a quick window in a mobile terminal according to a third embodiment of the present invention.

FIG. 19 is a diagram for explanation of an operation for providing additional information associated with a main image on a lateral display unit according to an operation for opening and closing a protective cover.

FIG. 20 is a diagram for explanation of an operation of a mobile terminal for providing additional information associated with a main image to a lateral display unit according to an operation for partially opening and closing a protective cover.

FIGS. 21 to 27 are diagrams for explanation of an operation of a mobile terminal according to a fourth embodiment of the present invention.

BEST MODE

Hereinafter, the present invention will be described in detail by explaining exemplary embodiments of the invention with reference to the attached drawings. The same reference numerals in the drawings denote like elements, and a repeated explanation thereof will not be given. In addition, the suffixes "module" and "unit" of elements herein are used for convenience of description and thus can be used interchangeably and do not have any distinguishable meanings or functions. In the description of the present invention, certain detailed explanations of related art are omitted when it is deemed that they may unnecessarily obscure the essence of the invention. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

A mobile terminal used in the specification may include a cellular phone, a smart phone, a laptop computer, a digital broadcast terminal, a personal digital assistant (PDA), a portable multimedia player (PMP), a navigation device, a slate PC, a tablet PC, an ultrabook, a wearable device (e.g., a smart watch, a smart glass, a head mounted display (HMD)), and so on.

However, it would be easily understood by one of ordinary skill in the art that the features of embodiments of the present invention are also applied to a stationary terminal such as a digital television (TV), a desk top computer, and a digital signage, except for the case in which the features of embodiments of the present invention are applied only a mobile terminal.

Referring FIGS. 1A to 1C, FIG. 1A is a block diagram for explanation of a mobile terminal 100 associated with embodiments of the present invention, and FIGS. 1B and 1C are diagrams for explanation of a concept of a mobile terminal viewed from different directions, associated with embodiments of the present invention.

The mobile terminal 100 may include a wireless communication unit 110, an input unit 120, a detector 140, an output unit 150, an interface unit 160, a memory 170, the controller 180, and a power supply 190. Component illustrated in FIG. 1A are not necessary to embody a mobile terminal, and thus the mobile terminal described in the specification may include greater or fewer component than the aforementioned components.

In detail, the wireless communication unit 110 of the aforementioned components may include at least one module that permits wireless communication between the mobile terminal 100 and a wireless communication system, wireless communication between the mobile terminal 100 and another mobile terminal 100, or wireless communication between the mobile terminal 100 and an external server. In addition, the wireless communication unit 110 may include at least one module for connection of the mobile terminal 100 with one network or more.

The wireless communication unit 110 may include at least one of a broadcast receiving module 111, a mobile communication module 112, a wireless Internet module 113, a short range communication module 114, and a position information module 115.

The input unit 120 may include a camera 121 or an image input unit for input of an image signal, a microphone 122 or an audio input unit for input of an audio signal, and a user input unit 123 (e.g., a touch key, a mechanical key, etc.) for receiving information from a user. Voice data or image data collected by the input unit 120 may be analyzed and processed according to a control command of a user.

The detector 140 may include one or more sensors for sensing at least one of information in a mobile terminal, surrounding environment information of the mobile terminal, and user information. For example, the detector 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., a camera (refer to 121)), a microphone (refer to 122), a battery gauge, an environment sensor (e.g., a barometer, a hydrometer, a thermometer, a radioactivity sensor, a thermal sensor, a gas sensor, etc.), and a chemical sensor (e.g., an electronic nose, a healthcare sensor, a biometric sensor, etc.). The mobile terminal described in the specification may combine and use information items sensed by at least two sensors of these sensors.

The output unit 150 may generate output associated with sight, hearing, or touch and include at least one of a display unit 151, a audio output unit 152, a haptic module 153, and an optical output unit 154. The display unit 151 may constitute an interlayer structure with a touch sensor or may be integrally formed with the touch sensor so as to embody a touch screen. The touch screen may function as the user input unit 123 that provides an input interface between the mobile terminal 100 and a user and simultaneously provide an output interface between the mobile terminal 100 and the user.

The interface unit 160 functions as a path with various types of external devices connected to the mobile terminal 100. The interface unit 160 may include at least one of a wired/wireless port, an external charging port, a wired/wireless data port, a memory card port, a port for connection of a device with an identification module, an audio input/output (I/O) port, a video I/O port, and an earphone port. In response to connection of the interface unit 160 with an external device, the mobile terminal 100 may perform appropriate control associated with the connected external device.

In addition, the memory 170 stores data for supporting various functions of the mobile terminal 100. The memory 170 may store a plurality of application programs or applications driven by the mobile terminal 100, data items for an operation of the mobile terminal 100, and commands. At least some of the application programs may be downloaded from an external server through wireless communication. In addition, at least some of the application programs may be present in the mobile terminal 100 from the release of the product for a basic function (e.g., call receiving and transmitting functions, message receiving and transmitting functions, etc.) of the mobile terminal 100. The application programs may be stored in the memory 170, installed in the mobile terminal 100, and driven to perform an operation (or a function) of the mobile terminal by the controller 180.

In general, the controller 180 controls an overall operation of the mobile terminal 100 as well as an operation associated with the application programs. The controller 180 may process signals, data, information, and so on that are input or output through the aforementioned components or drive the application programs stored in the memory 170 so as to provide or process appropriate information or functions to the user.

In addition, the controller 180 may control some of the components described with reference to FIG. 1A in order to drive the application programs stored in the memory 170. Furthermore, the controller 180 may combine and operate at least two of components included in the mobile terminal 100 in order to drive the application programs.

The power supply 190 receives external power and internal power and supplies power each of the components included in the mobile terminal 100 under control of the controller 180. The power supply 190 may include a battery and the battery may be an embedded battery or a replaceable battery.

At least some of the aforementioned components may cooperatively operate in order to embody an operation, control, and a control method of a mobile terminal according to various embodiments of the present invention that will be described later. In addition, the operation, control, and the control method of the mobile terminal may be embodied in the mobile terminal by driving at least one application program s stored in the memory 170.

Hereinafter, prior to description of various embodiments of the present invention of the aforementioned mobile terminal 100, the above listed components will be described in more detail with reference to FIG. 1A.

First, the wireless communication unit 110 will be described. The broadcast receiving module 111 of the wireless communication unit 110 receives a broadcast signal and/or information associated with broadcast from an external broadcast management server through a broadcast channel. The broadcast channel may include a satellite channel and a terrestrial channel. Two or more broadcast receiving modules may be provided to the mobile terminal 100 for simultaneous broadcast receiving or broadcast channel switching for at least two broadcast channels.

The mobile communication module 112 transmits and receives a radio signal to and from at least one of a base station, an external terminal, and a server in a mobile communication network established according to technical standards or communication methods for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), etc.).

The radio signal may include various types of data items according to transmission and reception of a voice call signal, a video telephony call signal, or a text/multimedia message.

The wireless Internet module 113 may be used to wireless Internet access and installed in or outside the mobile terminal 100. The wireless Internet module 113 may be configured to transmit and receive a radio signal in a communication network according to wireless Internet technology.

Examples of wireless Internet technology may include wireless LAN (WLAN), wireless-fidelity (Wi-Fi), wireless fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), etc. The wireless Internet module 113 transmits and receives data according to at least one wireless Internet technology including Internet technologies that are not listed above.

In that wireless Internet access via WiBro, HSDPA, HSUPA, GSM, CDMA, WCDMA, LTE, LTE-A, etc. is achieved through a mobile communication network, the wireless Internet module 113 that performs wireless Internet access through the mobile communication network may be understood as a type of the mobile communication module 112.

The short range communication module 114 may be used for short range communication and may support short range communication using at least one of Bluetooth™, radio frequency identification (RFID), infrared data association (IrDA), ultra wideband (UWB), ZigBee, near field communication (NFC), wireless-fidelity (Wi-Fi), Wi-Fi Direct, and wireless universal serial bus (wireless USB). The short range communication module 114 may support wireless communication between the mobile terminal 100 and a wireless communication system, wireless communication between the mobile terminal 100 and another mobile terminal 100, and wireless communication between the mobile terminal 100 and a network with another mobile terminal 100 (or an external server) positioned therein through a short range wireless area network. The short range wireless communication network may be a short range wireless personal area network.

Here, another mobile terminal 100 may be a wearable device (e.g., a smart watch, a smart glass, a head mounted display (HMD)), that is capable of exchanging (or interworking) with the mobile terminal 100 according to embodiments of the present invention. The short range communication module 114 may detect (or recognize) a wearable device that is capable of communicating with the mobile terminal 100, around the mobile terminal 100. In addition, when the detected wearable device is authenticated to communicate with the mobile terminal 100 according to embodiments of the present invention, the controller 180 may transmit at least a portion of data processed by the mobile terminal 100 to the wearable device through the short range communication module 114. Accordingly, a user of the wearable device may use the data processed by the mobile terminal 100 through the wearable device. For example, accordingly, when the mobile terminal 100 receives a call, the user may perform a phone call through the wearable device, or when the mobile terminal 100 receives a message, the user may check the received message through the wearable device.

The position information module 115 is for acquisition of a position (or a current position) of a mobile terminal, and a representative example of the position information module 115 may include a global positioning system (GPS) module or a wireless fidelity (WiFi) module. For example, when the mobile terminal uses a GPS module, the mobile terminal may acquire a position thereof using a signal transmitted from a GPS satellite. As another example, when the mobile terminal uses a Wi-Fi module, the mobile terminal may acquire the position thereof based on information of a wireless access point (AP) that transmits or receives to and from radio signal to and from a Wi-Fi module. As necessary, the position information module 115 may perform some functions of another module of the wireless communication unit 110 in order to interchangeably or additionally acquire data about the position of the mobile terminal. The position information module 115 is used to acquire a position (a current position) of the mobile terminal and is not limited to a module that directly calculates or acquires the position of the mobile terminal.

The input unit 120 may be used to input image information (or signal), audio information (or signal), data, or information input from a user, and the mobile terminal 100 may include one or more cameras 121 in order to input image information. The camera 121 processes an image frame of a still image or a video image that is acquired by an image sensor in a video telephony mode or a photography mode. The processed image frame may be displayed on the display unit 151 or stored in the memory 170. The plurality of cameras 121 included in the mobile terminal 100 may be arranged in a matrix configuration, and a plurality of image information items having various angles or focal points may be input to the mobile terminal 100 through the cameras 121 arranged in the matrix configuration. In addition, the plurality of cameras 121 may be arranged in a stereo configuration in order to acquire left and right images for realization of a stereoscopic image.

The microphone 122 processes an external audio signal to electric voice data. The processed voice data may be used in various ways according to a function (or an executed application program) performed by the mobile terminal 100. Various noise removal algorithms for removal of noise generated while an external audio signal is input may be embodied in the microphone 122.

The user input unit 123 may be used to receive information from the user. Upon receiving information through the user input unit 123, the controller 180 may control an operation of the mobile terminal 100 so as to correspond to the input information. The user input unit 123 may include a mechanical input unit (or a mechanical key, for example, a button, a dome switch, a jog wheel, a jog switch, and so on that are positioned on a front/rear surface or lateral surface of the mobile terminal 100) and a touch type input unit. For example, the touch type input unit may include a virtual key, a soft key, or a visual key, which is displayed via software processing, or include a touch key disposed outside the touch screen. The virtual key or the visual key may be displayed in various forms on the touch screen, and for example, may include graphic, text, icon, video, or a combination thereof.

The detector 140 senses at least one of information in a mobile terminal, surrounding environment information of the mobile terminal, and user information and generates a sensing signal corresponding to the sensed information. The controller 180 may control driving or operation of the mobile terminal 100, process data associated with the application program installed in the mobile terminal 100, and perform a function or an operation, based on the sensing signal. Representative sensors of the various sensors included in the detector 140 will be described in more detail.

The proximity sensor 141 detects presence of an object that approaches a predetermined detection surface or an object present around the detection surface using force of electromagnetic field or infrared rays without mechanical contact. The proximity sensor 141 may be disposed in an inner region of the mobile terminal surrounded by the aforementioned touch screen or in the vicinity of the mobile terminal.

Example of the proximity sensor 141 may include a transmission-type photoelectric sensor, a direct reflection-type photoelectric sensor, a mirror reflection-type photoelectric sensor, a high-frequency vibration-type proximity sensor, a capacitive proximity sensor, a magnetic proximity sensor, an infrared proximity sensor, and so on. When the touch screen is a capacitive touch screen, the proximity sensor 141 may be configured to detect approaching of an object having conductivity from change in electric field according to approaching of the object having conductivity. In this case, the touch screen (or a touch sensor) may be classified as a proximity sensor.

For convenience of description, activity for allowing an object to approach a touch screen without contact with the touch screen to recognize presence of the object on the touch screen will be referred to as "proximity touch" and activity that allows the object to actually contact the touch screen will be referred to as "contact touch". A position of the touch screen, corresponding to proximity touch of the object, refers to a position that vertically corresponds to the touch screen from the object during the proximity touch of the object. The proximity sensor 141 may detect proximity touch and proximity touch pattern (e.g., a proximity touch distance, a proximity touch direction, proximity touch speed, proximity touch time, a proximity touch position, a proximity touch movement state, etc.). As described above, the controller 180 may process data (or information) corresponding to the proximity touch operation and proximity touch pattern that are detected by the proximity sensor 141 and output visual information corresponding to the processed data on the touch screen. Furthermore, the controller 180 may control the mobile terminal 100 to process different operations or data items (or information items) according to whether touch on the same point of the touch screen is proximity touch or contact touch.

The touch sensor detects touch (or touch input) applied to the touch screen (or the display unit 151) using at least one of various touch methods including a resistive-type method, an electrostatic capacity method, an infrared method, an ultrasonic method, a magnetic field method.

For example, the touch sensor may be configured to convert change in pressure applied to a specific portion of a touch screen or electrostatic capacity generated from a specific portion into an electrical input signal. The touch sensor may be configured to detect a position and a point of the touch sensor, which is touched by a touch target object that touches the touch screen, a touch pressure, and electrostatic capacity during touch. Here, the touch target object is an object that applies touch to the touch sensor and for example, may include a finger, a touch pen, a stylus pen, or a pointer.

Likewise, when there is touch input to the touch sensor, signal(s) corresponding to the touch input are transmitted to a touch controller. The touch controller processes the signal(s) and then transmits corresponding data to the controller 180. Thus, the controller 180 may know a region of the display unit 151, which is touched. Here, the touch controller may be a separate component from the controller 180 or may be the controller 180.

The controller 180 may perform different controls or the same control according to a type of a touch target object that touches a touch screen (or a touch key other than a touch screen). Whether the controller 180 performs different controls or the same control according to a type of the touch target object may be determined according to a current operation state of the mobile terminal 100 or an executed application program.

The aforementioned touch sensor and proximity sensor may independently or synthetically sense various types of touches such as short (or tap) touch, long touch, multi touch, drag touch, flick touch, pinch-in touch, pinch-out touch, swipe touch, hovering touch, and so on with respect to the touch screen.

The ultrasonic sensor may recognize positional information of a detection target using an ultrasonic wave. The controller 180 may calculate a position of a wave generation source through information detected from an optical sensor and a plurality of ultrasonic sensors. The position of the wave generation source may be calculated based on characteristics whereby light is much faster than ultrasonic wave, that is, characteristics whereby time when light reaches an optical sensor is very shorter than time when ultrasonic wave reaches the optical sensor. In more detail, the position of the wave generation source may be calculated using a time difference with time when ultrasonic wave reaches the optical sensor based on light as a reference signal.

The camera 121 described in terms of the configuration of the input unit 120 includes a camera sensor (e.g., a CCD, a CMOS, etc.), a photo sensor (or an image sensor), and a laser sensor.

The camera 121 and a laser sensor may be combined and may detect touch of a detection target with respect to a 3D stereoscopic image. The photo sensor may be stacked on a display device and is configured to scan movement of a detection target that approaches a touch screen. In more detail, the photo sensor is configured by installing photo diodes and transistors (TRs) in rows and columns and scans an object put thereon using an electrical signal that is changed according to the amount of light applied to the photo diode. That is, the photo sensor may calculate coordinates of a detection target according to change in light to acquire positional information of the detection target.

The display unit 151 displays (outputs) information processed by the mobile terminal 100. For example, the display unit 151 may display execution image information of an application program driven by the mobile terminal 100 or information of a user interface (UI) and graphic user interface (GUI) according to the execution image information.

In addition, the display unit 151 may be configured as a stereoscopic display unit for displaying a stereoscopic image.

The stereoscopic display unit may apply a 3D display method such as a stereoscopic method (a glass method), an auto stereoscopic method (a non-glass method), a projection method (a holographic method), and so on.

The audio output unit 152 may output audio data received from the wireless communication unit 110 or stored in the memory 170 in a call signal receiving mode, a call mode, a recording mode, a voice recognition mode, a broadcast receiving mode, or the like. The audio output unit 152 may output an audio signal associated with a function (e.g., a call signal receiving sound, a message receiving sound, etc.) performed by the mobile terminal 100. The audio output unit 152 may include a receiver, a speaker, a buzzer, and so on.

The haptic module 153 generates various tactile effects experienced by a user. A representative example of the tactile effect generated by the haptic module 153 may be vibration. Intensity and pattern of the vibration generated by the haptic module 153 may be controlled according to user selection or setting of a controller. For example, the haptic module 153 may synthesize and output different vibrations or may sequentially output the vibrations.

The haptic module 153 may generate various tactile effects such as pin arrangement that vertically moves with respect to a contact skin surface, injection power or suction power of air through a nozzle or an inlet, graze on a skin surface, contact of an electrode, an effect by stimuli such as electrostatic force, and an effect by cold/warm reproduction using a heat absorbing or generating device.

The haptic module 153 may deliver tactile effects through direct contact, and a user may feel tactile effect through muscle sense such as fingers or hands. Two or more haptic modules may be provided according to a configuration aspect of the mobile terminal 100.

The optical output unit 154 outputs a signal indicating an event occurrence using light of a light source of the mobile terminal 100. An example of an event occurring in the mobile terminal 100 may include message reception, call signal reception, an unanswered call, alarming, schedule notification, e-mail reception, information reception through an application, etc.

The signal output from the optical output unit 154 is configured by emitting single or multiple colors toward a front surface or a rear surface. The signal output may be terminated by detecting of event check of a user by the mobile terminal 100.

The interface unit 160 serves as a path through which all external devices are connected to the mobile terminal 100. The interface unit 160 receives data from an external device or power, and then delivers it to each component in the mobile terminal 100 or transmits data in the mobile terminal 100 to an external device after power is received. For example, the interface unit 160 may include a wired/wireless headset port, an external charging port, a wired/wireless data port, a memory card port, a port connecting a device equipped with an identification module, an audio input/output (I/O) port, a video input/output (I/O) port, and an earphone port.

The identification module is a chip storing various information items for authenticating permission of the mobile terminal 100 and may include a user identify module (UIM), a subscriber identity module (SIM), and a universal subscriber identity module (USIM). A device equipped with an identification module (hereinafter, referred to as an 'identification device') may be manufactured with a smart card type. Accordingly, the identification device may be connected to the mobile terminal 100 through the interface unit 160.

When the mobile terminal 100 is connected to an external cradle, the interface unit 160 may be a path through which power is supplied from the cradle to the mobile terminal 100 or various command signals inputted from the cradle are delivered to the mobile terminal 100. Various command signals or power inputted from the cradle may operate as a signal for recognizing that the mobile terminal 100 is accurately mounted on the cradle.

The memory 170 may store a program for an operation of the controller 180, and may temporarily store input/output data (for example, a phonebook, a message, a still image, and a moving image). The memory 170 may store data associated with various patterns of vibrations and sounds, which are outputted during touch input on the touch screen.

The memory 170 may include at least one type of storage medium of a flash memory type, a hard disk type, a multimedia card micro type, card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The mobile terminal 100 may operate in relation to a web storage performing the storage function of the memory 170 on the Internet.

As described above, the controller 180 controls an operation associated with an application program and an overall operation of the mobile terminal 100, in general. For example, the controller 180 may execute or release a locking state for restriction of input of a user control command for applications when a state of the mobile terminal 100 satisfies a set condition.

In addition, the controller 180 may perform control and processing associated with a voice call, a data call, a video telephony call, etc. or may perform a pattern recognition processing to recognize writing input and drawing input on the touch screen as text and images, respectively. In addition, the controller 180 may combine and control one or more of the aforementioned components in order to implement various embodiments of the present invention that will be described below.

The power supply 190 receives external power and internal power and supplies power necessary for operations of each component under control of the controller 180. The power supply 190 may include a battery. The battery may be an embedded chargeable battery or may be detachably coupled to a terminal body for charging, etc.

The power supply 190 may include a connection port. The connection port may be configured as an example of the interface unit 160 to which an external charger for supplying power is electrically connected for battery charging.

As another example, the power supply 190 may be configured to wirelessly charge a battery without the connection port. In this case, the power supply 190 may receive power from an external wireless power transmitter using one or more of an inductive coupling method based on magnetoelasticity or a magnetic resonance coupling method based on electromagnetic resonance.

The following various embodiments of the present invention may be embodied in a recording medium readable by a computer or a similar device using, for example, software, hardware, or a combination thereof.

Referring to FIGS. 1B and 1C, the mobile terminal 100 may include a bar-type terminal body. However, embodiments of the present invention are not limited thereto and may be applied to various structures such as a watch type, a clip type, a glass type, a folder type configured to couple two or more bodies to be relatively movable, a flip type, a slide type, a swing type, a swivel type, and so on. Even if the specification is related to a specific type of mobile terminal, the description of the specific type of mobile terminal may be other types of mobile terminals, in general.

Here, the terminal body may be understood to indicate the mobile terminal 100 by considering the mobile terminal 100 as at least one assembly.

The mobile terminal 100 includes a case (e.g., a frame, a housing, a cover, etc.) constituting an outer appearance. As illustrated, the mobile terminal 100 may include a front case 101 and a rear case 102. Various electronic components are disposed in an inner space formed by coupling the front case 101 and the rear case 102. At least one middle case may be further disposed between the front case 101 and the rear case 102.

The display unit 151 may be disposed on a front surface of the terminal body and may output information. As illustrated, a window 151a of the display unit 151 may be installed at the front case 101 and may form a front surface of the terminal body of the front case 101.

As necessary, an electronic component may also be installed at the rear case 102. The electronic component installable at the rear case 102 may include a detachable battery, an identification module, a memory card, and so on. In this case, a rear cover 103 for covering the electronic component installed at the rear case 102 may be detachably coupled to the rear case 102. Accordingly, when the rear cover 103 is detached from the rear case 102, the electronic component installed at the rear case 102 is externally exposed.

As illustrated, when the rear cover 103 is coupled to the rear case 102, a portion of a lateral surface of the rear case 102 may be exposed. As necessary, during the coupling, the rear case 102 may be completely hidden by the rear cover 103. An opening for externally exposing a camera 121b or an audio output unit 152b may be included in the rear cover 103.

The cases 101, 102, and 103 may be formed by injecting a synthetic resin or formed of metal, for example, stainless steel (STS), aluminum (Al), titanium (Ti), etc.

Unlike in the above example in which a plurality of cases constitutes an inner space for accommodation of various components, the mobile terminal 100 may be configured in such a way that, one case constitutes the inner space. In this case, the mobile terminal 100 may be configured with a unibody structure formed of synthetic resin or metal to connect a lateral surface to a rear surface.

The mobile terminal 100 may include a waterproof unit (not shown) for preventing water from penetrating into the terminal body. For example, the waterproof unit may be disposed between the window 151a and the front case 101, between the front case 101 and the rear case 102, or between the rear case 102 and the rear cover 103 and may include a sealing member for sealing an inner space formed by couple them.

The mobile terminal 100 may include the display unit 151, first and second audio output units 152a and 152b, the proximity sensor 141, the illumination sensor 142, the optical output unit 154, first and second cameras 121a and 121b, first and second manipulating portions 123a and 123b, the microphone 122, and the interface unit 160.

Hereinafter, as illustrated in FIGS. 1B and 1C, the mobile terminal 100 configured in such a way the display unit 151, the first audio output unit 152a, the proximity sensor 141, the illumination sensor 142, the optical output unit 154, the first camera 121a, and the first manipulating portion 123a are disposed at the front surface of the terminal body, the second manipulating portion 123b, the microphone 122, and the interface unit 160 are disposed at the lateral surface of the terminal body, and the second audio output unit 152b and the second camera 121b are disposed at the rear surface of the terminal body will be exemplified.

However, these components are not limited to this arrangement. The components may be omitted or replaced or may be disposed on a different surface as necessary. For example, the first manipulating portion 123a may not be disposed at the front surface of the terminal body and the second audio output unit 152b may be disposed at the lateral surface of the terminal body instead of the rear surface of the terminal body.

The display unit 151 displays (outputs) information processed by the mobile terminal 100. For example, the display unit 151 may display execution image information of an application program driven by the mobile terminal 100 or information of a user interface (UI) or graphic user interface (GUI) based on the execution image information.

The display unit 151 may include at least one of a liquid crystal display (LCD), a thin film transistor-liquid crystal display (TFT LCD), an organic light-emitting diode (OLED), a flexible display, a 3D display, and an e-ink display.

In addition, two or more display units 151 may be configured according to a configuration aspect of the mobile terminal 100. In this case, a plurality of display units may be spaced apart from each other or integrally arranged on one surface of the mobile terminal 100 or may be arranged on different surfaces, respectively.

The display unit 151 may include a touch sensor for detection of touch on the display unit 151 in order to receive a control command for a touch method. When the display unit 151 is touched using the touch method, the touch sensor may detect the touch, and the controller 180 may generate a control command corresponding to the touch based on the touch. Content input via the touch method may be a character, a number, or a menu item that is capable of being indicated or determined in various modes.

The touch sensor may be configured in the form of a film with a touch pattern, and may be disposed between the window 151a and a display (not shown) of a rear surface of the window 151a or may be a metal wire that is patterned directly on the rear surface of the window 151a. In addition, the touch sensor may be integrally formed with the display. The touch sensor may be disposed on a substrate of the display or included in the display.

Likewise, the display unit 151 may constitute a touch screen together with the touch sensor, and in this case, the touch screen may function as the user input unit 123 (refer to FIG. 1A). As necessary, the touch screen may serve at least some functions of the first manipulating unit 123a instead.

The first audio output unit 152a may be embodied as a receiver for transmitting a telephone voice to a user's ear, and the second audio output unit 152b may be embodied as a loud speaker for outputting various alarm sounds or playback sound of multimedia.

An audio hole for discharging sound generated from the first audio output unit 152a may be formed in the window 151a of the display unit 151. However, embodiments of the present invention are not limited thereto, and the sound may be discharged along an assembly gap (e.g., a gap between the window 151a and the front case 101) between structures. In this case, the hole that is independently formed for output of sound may not be seen or hidden by appearances so as to more simplify an outer appearance of the mobile terminal 100.

The optical output unit 154 may be configured to output light for indicating an event occurrence during event occurrence. An example of the event may include message reception, call signal reception, an unanswered call, alarming, schedule notification, e-mail reception, information reception through an application, etc. Upon detecting event check of a user, the controller 180 may control the optical output unit 154 to terminal output of light.

The first camera 121a processes an image frame of a still image or a video image that is acquired by an image sensor in a photography mode or a video telephony call mode. The image frame may be displayed on the display unit 151 and stored in the memory 170.

The first and second manipulating portions 123a and 123b are examples of the user input unit 123 for receiving a command for control of an operation of the mobile terminal 100 and may also be collectively referred to as a manipulating portion. The first and second manipulating portions 123a and 123b may employ any tactile manner in which a user experiences tactile sense while manipulation, such as touch, push, scroll, etc. In addition, the first and second manipulating portions 123a and 123b may also employ a manipulating method without tactile sense of the user through proximity touch, hovering touch, etc.

The diagram illustrates that the first manipulating portion 123a is a touch key, but embodiments of the present invention are not limited thereto. For example, the first manipulating portion 123a may be configured as a mechanical key or configured as a combination of a touch key and a push key.

Content input by the first and second manipulating portions 123a and 123b may be set in various ways. For example, the first manipulating portion 123a may receive a command such as a menu, a home key, cancel, search, etc., and the second manipulating portion 123b may receive a command for volume control of sound output from the first or second audio output unit 152a or 152b and conversion into a touch recognition mode of the display unit 151.

A rear input unit (not shown) as another example of the user input unit 123 may be disposed at the rear surface of the terminal body. The rear input unit may be manipulated to receive a command for control of an operation of the mobile terminal 100 and input content may be set in various ways. For example, the rear input unit may receive a command such as power on/off, start, end, and scroll, a command for volume control of sound output from the first and second audio output units 152a and 152b, and a command for conversion into a touch recognition mode of the display unit 151. The rear input unit may be configured to receive touch input, push input, or a combination thereof.

The rear input unit may be disposed to overlap with the display unit 151 of a front surface in a thickness direction of the terminal body. For example, the rear input unit may be disposed on an upper end portion of the rear surface of the terminal body such that the user easily manipulates the rear input using an index finger while gripping the terminal body with one hand. However, embodiments of the present invention are not limited thereto, and a position of the rear input unit may be changed.

Likewise, when the rear input unit is disposed at the rear surface of the terminal body, a new type of user interface using the rear input unit may be embodied. In addition, when the first manipulating portion 123a is not disposed at the front surface of the terminal body by replacing at least some functions of the first manipulating portion 123a disposed at the front surface of the terminal body by the aforementioned touch screen or rear input unit, the display unit 151 may be configured with a larger screen.

The mobile terminal 100 may include a finger recognition sensor for recognition of user fingerprint, and the controller 180 may use fingerprint information detected by a finger recognition sensor as an authentication element. The fingerprint recognition sensor may be installed in the display unit 151 or the user input unit 123.

The microphone 122 may be configured to receive user voice, other sounds, etc. The microphone 122 may be included in a plurality of places to receive stereoscopic sound.

The interface unit 160 serves as a path through which all external devices are connected to the mobile terminal 100. For example, the interface unit 160 may be at least one of a connection terminal for connection with other devices (e.g., an earphone, and an external speaker), a port for short range communication (e.g., an IrDA port, a Bluetooth port, a wireless LAN port, etc.), and a power supply terminal for supply of power to the mobile terminal 100. The interface unit 160 may be embodied in the form of a socket for accommodation of a subscriber identification module (SIM), or a user identity module (UIM), or an external type card such as a memory card for storing information.

The second camera 121b may be disposed at the rear surface of the terminal body. In this case, the second camera 121b may have a substantially opposite photography direction to the first camera 121a.

The second camera 121b may include a plurality of lenses arranged along at least one line. The plurality of lenses may be arranged in the form of a matrix. This camera may be referred to as an 'array camera'. When the second camera 121b is configured as an array camera, the second camera 121b may capture an image in various ways using the plurality of lenses so as to acquire an image with better image quality.

A flash 124 may be disposed adjacent to the second camera 121b. The flash 124 emits light toward a target object when the second camera 121b photographs the target object.

The second audio output unit 152b may be further included in the terminal body. The second audio output unit 152b may perform a stereo function together with the first audio output unit 152a and used to embody a speaker phone mode during a call.

At least one antenna for wireless communication may be included in the terminal body. The antenna may be embedded in the terminal body or formed in a case. For example, the antenna constituting a portion of the broadcast receiving module 111 (refer to FIG. 1A) may be configured to be extended out of the terminal body. In addition, the antenna may be formed in a film type and attached to an internal surface of the rear cover 103, and a case including a conductive material may be configured to function as an antenna.

The power supply 190 (refer to FIG. 1A) for supply of power to the mobile terminal 100 may be included in the terminal body. The power supply 190 may include a battery 191 that is embedded in the terminal body or is detachably configured outside the terminal body.

The battery 191 may be configured to supply power through a power cable connected to the interface unit 160. In addition, the battery 191 may be configured to be wirelessly charged through a wireless charger. The wireless charging may be achieved via an electromagnetic induction method or a resonance method (a magnetic resonance method).

The diagram illustrates that the rear cover 103 is coupled to the rear case 102 so as to cover the battery 191, to restrict deviation of the battery 191, and to protect the battery 191 from external shock and impurities. When the battery 191 is detachably coupled to the terminal body, the rear cover 103 may be detachably coupled to the rear case 102.

The mobile terminal 100 may further include an accessory for protecting an outer appearance or aiding or extending a function of the mobile terminal 100. An example of the accessory may include a cover or pouch that covers or accommodates at least one surface of the mobile terminal 100. The cover or the pouch may be configured to extend the function of the mobile terminal 100 in conjunction with the display unit 151. Another example of the accessory may include a touch pen for aiding or extending touch input on a touch screen.

According to an embodiment of the present invention, information processed in a mobile terminal may be displayed using a flexible display, which will be described in more detail with reference to the attached drawings.

FIG. 2A is a diagram for explanation of a concept of another example of a mobile terminal 200 that is modifiable according to an embodiment of the present invention.

Referring to FIG. 2A, a display unit 202 may be configured to be deformed by external force. The deformation may be at least one of warping, bending, folding, twisting, and rolling of the display unit 202. The deformable display unit 202 may be referred to as a 'flexible display unit'. Here, the flexible display unit 202 may include all of a general flexible display, e-paper, and a combination thereof. In general, the mobile terminal 200 may have the characteristics of the mobile terminal 100 of FIGS. 1A to 1C or similar characteristics thereto.

The general flexible display is prepared on a thin and flexible substrate that is capable of being warped, bent, folded, twisted, or rolled like paper while maintaining the characteristics of a typical flat display, and thus is light and is not easily broken.

The e-paper belongs to display technology obtained by applying the characteristic of general ink and may be different from a typical flat display in that reflected light is used. The e-paper may change information using a twist ball or electrophoresis using a capsule.

In a state in which the flexible display unit 202 is not deformed (for example, a state in which the flexible display unit 202 has an infinite radius of curvature, which will be referred to as a first state.), a display region of the flexible display unit 202 is a flat surface. In a state in which the flexible display unit 202 is deformed by external force in the first state (for example, in a state in which the flexible display unit 202 has a finite radius of curvature, which will be referred to as a second state), the display region may be a curved surface. As shown in the drawing, information displayed in the second state may be visual information output on a curved surface. The visual information may be embodied by independently controlling light emitting of sub-pixels that are arranged in a matrix form. A sub-pixel refers to a smallest unit for realizing one color.

The flexible display unit 202 may be bent (for example, bent in a vertical or horizontal direction) rather than being flat in the first state. In this case, when external force is applied to the flexible display unit 202, the flexible display unit 202 may be deformed to be flat (or to be less bent) or to be more bent.

The flexible display unit 202 may be combined with a touch sensor to embody a flexible touch screen. When the flexible touch screen is touched, the controller 180 (refer to FIG. 1A) may perform control corresponding to this touch input. The flexible touch screen may be configured to detect touch input in the second state as well as in the first state.

The mobile terminal 200 according to the modified example may include a deformation detector for detection of deformation of the flexible display unit 202. The deformation detector may include the sensor 140 (refer to FIG. 1A).

The deformation detector may be included in the flexible display unit 202 or a case 201 so as to detect information associated with deformation of the flexible display unit 202. Here, the information associated with deformation may include a direction in which the flexible display unit 202 is deformed, a deformation degree, a deformed location, deformed time, and an acceleration in which the deformed flexible display unit 202 is restored, and may also be various information items that are capable of being detected by bending the flexible display unit 202.

The controller 180 may change information displayed on the flexible display unit 202 or generate a control signal for control of a function of the mobile terminal 200 based on information associated with the deformation of the flexible display unit 202, detected by the deformation detector.

The mobile terminal 200 according to the modified example may include the case 201 for accommodation of the flexible display unit 202. The case 201 may be configured to be deformed together with the flexible display unit 202 by external force in consideration of the characteristics of the flexible display unit 202.

In addition, a battery (not shown) included in the mobile terminal 200 may also be configured to be deformed together with the flexible display unit 202 by external force in consideration of the characteristic of the flexible display unit 202. In order to embody the battery, a stack and folding method for stacking battery cells on each other may be applied.

Embodiments of the present invention are not limited to the case in which a state of the flexible display unit 202 is deformed by external force. For example, when the flexible display unit 202 is in the first state, the flexible display unit 202 may be changed to the second state according to a command of a user or application.

FIGS. 2B and 2C are diagrams illustrating the concept of another example of a mobile terminal 250 that is modifiable according to an embodiment of the present invention. That is, FIG. 2B is a diagram illustrating a mobile terminal with a rectangular sectional view of a terminal body. FIG. 2C is a diagram illustrating a mobile terminal with a trapezoidal sectional view of the terminal body.

Referring to FIGS. 2B and 2C, a display unit according to an embodiment of the present invention may extend to left/right lateral surfaces of the terminal body as well as a front surface of the terminal body. Hereinafter, for convenience of description, a display unit 251 disposed on the front surface of the terminal body is referred to as a 'front display unit (or a main display unit)', a display unit 252b disposed on a left lateral surface of the terminal body is referred to as a 'first lateral display unit', a 'left lateral display unit' or a 'first sub display unit, and a display unit 252a disposed on a right lateral surface of the terminal body is referred to as a 'second lateral display unit', a 'right lateral display unit' or a 'second sub display unit'.

The front display unit 251 and a lateral display unit 252 may be independently arranged on the front surface and lateral surface of the terminal body, respectively, or may be integrally formed through a flexible display. For example, when the front display unit 251 and the lateral display unit 252 are integrally embodied through the flexible display, the front display unit 251 and the lateral display unit 252 may be continuously formed without a physical or spatial boundary therebetween.

The front display unit 251 and the lateral display unit 252 may include a touch sensor for detection of touch on the front and lateral display units 251 and 252 so as to receive a control command via a touch method. Accordingly, when the front display unit 251 and the lateral display unit 252 are touched, the touch sensor may detect the touch and the controller 180 may be configured to generate a control command corresponding to the touch based on the touch. Content input via a touch method may be a character, a number, or a menu item that is capable of being indicated or determined in various modes. According to another embodiment of the present invention, only the front display unit 251 may be configured to include a touch sensor and the lateral display unit 252 may be configured not to include a touch sensor.

The front display unit 251 and the lateral display unit 252 may independently display information processed by the mobile terminal 250. For example, the front display unit 251 may display execution image information of a first application program driven by the mobile terminal 250 or UI and GUI information according to the execution image information. In addition, the lateral display unit 252 may display execution image information of a second application program driven by the mobile terminal 250 or UI and GUI information according to the execution image information. According to another embodiment of the present invention, the front display unit 251 and the lateral display unit 252 may integrally display information processed by the mobile terminal 250.

According to another embodiment of the present invention, a display unit (not shown) may be additionally disposed on at least one of upper/lower lateral surfaces of the terminal body as well as on left/right lateral surfaces of the terminal body. Similarly, in this case, the display unit disposed on at least one of the upper/lower lateral surfaces of the terminal body may receive a control command via a touch method and include a touch sensor for detection of touch on the display unit. In addition, the display unit may display information that is independently processed by the mobile terminal 250 from the first and second display units 251 and 252.

FIG. 2D is a diagram for explanation of an example of the mobile terminal 250 including a protective cover installed thereon. That is, (a) of FIG. 2D is a diagram illustrating a mobile terminal in a state in which the protective cover is opened, and (b) of FIG. 2D is a diagram illustrating a mobile terminal in a state in which the protective cover is closed.

Referring to FIG. 2D, a protective cover 300 includes a quick cover 310 for protection of the mobile terminal 250 from external shock and so on, and a quick window 320 formed in such a way that one region of the front display unit 251 and one region of the lateral display unit 252 are seen through the quick window 320.

The quick cover 310 may be formed of a material such as leather, metal, plastic, or synthetic fiber and the quick window 320 may be formed of a transparent material or configured in an open form.

The mobile terminal 250 detects at least one magnet installed in the quick cover to detect whether the protective cover 300 is opened or closed. As the detection result, when the protective cover 300 is closed, the mobile terminal 250 may enable only a display region corresponding to the quick window 320 according to a user command.

Thus far, the configuration of the mobile terminal according to embodiments of the present invention has been described. Hereinafter, according to an embodiment of the present invention, a mobile terminal and a method for controlling the same, for selecting a lateral display unit in which an image is to be enabled based on touch input through a front display unit and controlling an operation image displayed on the enabled lateral display unit will be described in detail.

FIG. 3 is a flowchart for explanation of an operation of a mobile terminal according to a first embodiment of the present invention. Hereinafter, the first embodiment of the present invention will be described in terms of the mobile terminal 250 illustrated in FIG. 2C.

Referring to FIG. 3, the controller 180 displays an operation image corresponding to a menu, an operation, etc., which are selected according to a user command, on the front display unit 251 or all the display units 251 and 252. In this case, an example of the displayed operation image may include a home screen, an app image, a message image, a call image, a picture or video photography image, an image or video viewer image, a broadcast image, a map image, a web page image, various application execution images, and so on.

While the operation image is displayed, if an external key for entrance into a sleep mode is selected or predetermined time elapses without any user input, the controller 180 converts an operation mode of the mobile terminal 250 to a sleep mode from an active mode for energy conservation, etc. (S310).

Hereinafter, for convenience of description, while power is supplied to the mobile terminal 250, when an input signal such as a separate touch input or key input is not received for predetermined time, a mode in which supply of power to all the display units 251 and 252 is interrupted is referred to as a 'sleep mode' and a mode in which power is supplied to at least one of the front display unit 251 and the lateral display unit 252 is referred to as an 'active mode'. In this case, the sleep mode is assumed to be a state in which an output function (i.e., a display function) is disabled by interrupting supply of power to a backlight of the front display unit 251 but a touch sensor with an input function is enabled.

In the sleep mode, upon receiving touch input of tapping a first region (i.e., a left region) of the front display unit 251 a predetermined number of times (S315), the controller 180 may enable only the first lateral display unit 252b disposed on the left region of the terminal body (S320). Here, a number of times of tapping the front display unit 251 may be about two, and hereinafter, for convenience of description, the touch input will be referred to as a 'double-touch input'.

In the sleep mode, upon receiving double-touch input through a second region (i.e., a right region) of the front display unit 251 (S325), the controller 180 may enable only the second lateral display unit 252a disposed on a right region of the terminal body (S330).

In addition, in the sleep mode, upon receiving double-touch input through a third region (i.e., a central region) of the front display unit 251 (S335), the controller 180 may enable all the display units 251, 252a, and 252b included in the terminal body (S340). According to another embodiment of the present invention, the central region of the front display unit 251 is divided into two regions, and the controller 180 may enable all the display units 251 and 252 or enable only the front display unit 251 according to a location of the divided regions, in which the double-touch input is received.

As described above, upon receiving double-touch input of tapping the first or second region, the controller 180 displays a preset operation image on the enabled first or second lateral display unit 252 (S345). In this case, the operation image displayed on the lateral display unit 252 may be, but is not limited to, an image corresponding to one region of the operation image that is lastly executed prior to entrance into a sleep mode, an image listing event information items that are not checked by a user, or an image listing an app icon and/or widget preset by the user.

While the operation image is displayed on the lateral display unit 252, upon receiving a preset touch input through the first or second region of the front display unit 251 (S350), the controller 180 may perform an operation associated with the operation image displayed on the lateral display unit 252 based on the location of the received touch input (S355). In this case, the preset touch input may be, but is not limited to, a short touch input, a long touch input, double-touch input (tap), a touch and drag input, or the like.

That is, the controller 180 may select or execute one item of the operation image positioned on the same horizontal line as the point through which the touch input is received. Thus, when a lateral display region is narrow and thus it is difficult to touch the corresponding region or a touch sensor is not installed in the lateral display region and thus the corresponding region is not capable of being touched, the operation image displayed on the lateral display region may be easily controlled using the front display region.

While the operation according to operation 355 is performed, the controller 180 may display information associated with the operation image displayed on the lateral display unit 252 on the front display unit 251.

In operation 335, upon receiving double-touch input through the third region, the controller 180 displays a lock screen on the enabled front and lateral display units 251 and 252 (S360). When a locking function is not set, the controller 180 may display a home screen on the enabled front and lateral display units 251 and 252.

While the lock screen is displayed on the front and lateral display units 251 and 252, upon receiving a preset touch input through the first or second region of the front display unit 251 (S365), the controller 180 performs an operation associated with the lock screen displayed on the front display unit 251 based on the location of the received touch input (S370). For example, the controller 180 may display information associated with an object of a point through which the touch input is received on the lateral display unit 252 and perform an edit function and so on.

As described above, the mobile terminal according to the first embodiment of the present invention may select a lateral display unit in which an image is to be enabled, based on a location of the touch input of tapping the front display unit, and may display a preset operation image on the enabled lateral display unit.

FIG. 4 is a flowchart for explanation of an operation of a mobile terminal according to a second embodiment of the present invention. Hereinafter, the second embodiment of the present invention will be described in terms of the mobile terminal 250 illustrated in FIG. 2C.

Referring to FIG. 4, the controller 180 displays an operation image corresponding to a menu, an operation, etc., which are selected according to a user command, on the front display unit 251 or all the display units 251 and 252.

While the operation image is displayed, if an external key for entrance into a sleep mode is selected or predetermined time elapses without any user input, the controller 180 switches an operation mode of the mobile terminal 250 from an active mode to a sleep mode for energy conservation, etc. (S410).

In the sleep mode, upon receiving a plurality of preset touch inputs through a first region (i.e., a left region) of the front display unit 251 (S415), the controller 180 may enable only the first lateral display unit 252b disposed on the left region of the terminal body (S420). Here, the plurality of preset touch inputs refer to a combination of a plurality of touch inputs that are sequentially input according to a predetermined order by a user to a plurality of points positioned in the corresponding region of the front display unit 251.

In the sleep mode, upon receiving the plurality of preset touch inputs through a second region (i.e., a right region) of the front display unit 251 (S425), the controller 180 may enable only the second lateral display unit 252a disposed on a right region of the terminal body (S430).

In addition, in the sleep mode, upon receiving the plurality of preset touch inputs through a third region (i.e., a central region) of the front display unit 251 (S435), the controller 180 may enable the front display unit 251 and the lateral display units 252a and 252b which are included in the terminal body (S440). According to another embodiment of the present invention, the third region of the front display unit 251 is divided into two regions, and the controller 180 may enable all the display units 251 and 252 or enable only the front display unit 251 according to a location of the divided regions, in which the plurality of touch inputs is received.

As described above, upon receiving the plurality of preset touch inputs through the first or second region, the controller 180 displays a preset operation image on the enabled first or second lateral display unit 252a or 252b (S445). In this case, the operation image displayed on the first or second lateral display unit 252 may be, but is not limited to, an image corresponding to one region of the operation image that is lastly executed prior to entrance into a sleep mode, an image listing event information items that are not checked by a user, or an image listing an app icon and/or widget preset by the user.

While the operation image is displayed on the lateral display unit 252, upon receiving a preset touch input through the first or second region of the front display unit 251 (S450), the controller 180 may perform an operation associated with the operation image displayed on the lateral display unit 252 based on the location of the received touch input (S455). In this case, the preset touch input may be, but is not limited to, a short touch input, a long touch input, double-touch input (tap), a touch and drag input, or the like.

In addition, the controller 180 may display information associated with the operation image displayed on the lateral display unit 252 on the front display unit 251. Thus, when a lateral display region is narrow and thus it is difficult to touch the corresponding region or a touch sensor is not installed in the lateral display region and thus the corresponding region is not capable of being touched, the operation image displayed on the lateral display region may be easily controlled using the front display region.

In operation 435, upon receiving the plurality of preset touch inputs through the third region, the controller 180 releases a screen locking function and simultaneously displays a home screen on the enabled front and lateral display units 251 and 252 (S460).

While the home screen is displayed on the front and lateral display units 251 and 252, upon receiving a preset touch input through the first and/or second regions of the front display unit 251 (S465), the controller 180 performs an operation of the home screen based on a location of the received touch input (S470). For example, the controller 180 may perform an edit function of the home screen using both lateral display regions.

As described above, the mobile terminal according to the second embodiment of the present invention may select a lateral display unit in which an image is to be enabled, based on a combination of a plurality of touch inputs that are sequentially input through one region of a front display unit, and may display a preset operation image on the enabled lateral display unit.

FIG. 5 is a diagram for explanation of an operation for displaying a last execution image on a lateral display unit in response to touch input received through a front display unit in a mobile terminal according to a first embodiment of the present invention.

Referring to FIG. 5, when an external key for entrance into a sleep mode is selected or predetermined time elapses without any user input, the mobile terminal 250 may convert an operation mode to a sleep mode from an active mode for energy conservation, etc.

In the sleep mode, upon receiving double-touch input 520 of tapping a right region 510 of the front display unit 251, the mobile terminal 250 enables only the lateral display unit 252a disposed on the right region of the terminal body. In addition, the mobile terminal 250 may display a predetermined execution image on the enabled lateral display unit 252a. Here, the execution image displayed on the lateral display unit 252a may be an image corresponding to one region of an operation image that is lastly executed prior to entrance into a sleep mode by the mobile terminal 250.

For example, as illustrated in FIG. 5(b), the mobile terminal 250 may display a web page image 530 corresponding to a left region of a web page image that is lastly executed prior to a sleep mode on the right lateral display unit 252a.

While the web page image 530 is displayed on the lateral display unit 252a, upon receiving double-touch input 540 of tapping the right region 510 of the front display unit 251, the mobile terminal 250 may select one item 531 of the web page image 530 positioned on the same horizontal line as the point through which the double-touch input 540 is received.

Upon selecting the corresponding item 531, the mobile terminal 250 may enable the front display unit 251. In addition, in order to provide information corresponding to the selected item 531 in the form of a preview, the mobile terminal 250 may display a pop-up window (not shown) or a preview window 550 shaped like a speech bubble, which includes the corresponding information, on one region of the front display unit 251.

While the preview window 550 shaped like a speech bubble is displayed on the front display unit 251, upon receiving touch input (not shown) of tapping a boundary of the preview window 550, the mobile terminal 250 may close the corresponding preview window 550 and then disable the front display unit 251.

As shown in FIG. 5(c), upon receiving touch input 560 of tapping an inner portion of the preview window 550, the mobile terminal 250 may enable the remaining lateral display unit 252b and then display a web page image 570 including information corresponding to the selected item 531 on all the display units 251 and 252.

According to another embodiment of the present invention, the mobile terminal 250 may display the web page image 570 including information corresponding to the selected item 531 only on the front display unit 251. In this case, the mobile terminal 250 may disable the enabled lateral display unit 252a.

FIG. 6 is a diagram for explanation of an operation for displaying unchecked event information items on a lateral display unit in response to touch input received through a front display unit in a mobile terminal according to a first embodiment of the present invention.

Referring to FIG. 6A, in a sleep mode, upon receiving double-touch input 620 of tapping a right region 610 of the front display unit 251, the mobile terminal 250 may enable only the lateral display unit 252a disposed in a right region of the terminal body. In addition, the mobile terminal 250 may display a predetermined operation image on the enabled lateral display unit 252a. Here, the operation image displayed on the lateral display unit 252a may be an image for listing event information items that are unchecked by a user.

For example, as shown in (b) of FIG. 6A, the mobile terminal 250 may display an operation image 630 including a first icon 631 corresponding to an unanswered call, a second icon 633 corresponding to an unchecked message, and a third icon 635 corresponding to an unchecked schedule on the right lateral display unit 252a.

While the operation image 630 is displayed on the lateral display unit 252a, upon receiving double-touch input 640 of tapping the right region 610 of the front display unit 251, the mobile terminal 250 may select the second icon 633 of the operation image 630 positioned on the same horizontal line as the point through which the double-touch input 640 is received.

When the corresponding icon 633 is selected, the mobile terminal 250 enables the front display unit 251. In addition, in order to provide message information corresponding to the selected icon 633 in the form of a preview, the mobile terminal 250 may display a preview window 650 shaped like a pop-up window or a speech bubble (not shown), which includes the corresponding message information, on one region of the front display unit 251

While the preview window 650 shaped like a pop-up window is displayed on the front display unit 251, upon receiving double-touch input (not shown) of tapping a left/right boundary of the preview window 650, the mobile terminal 250 may close the preview window 650 and then disable the front display unit 251.

As shown in (c) and (d) of FIG. 6A, upon receiving double-touch input 660 of tapping upper/lower boundaries of the preview window 650, the mobile terminal 250 may execute a quick action of a message checked through the preview window 650. That is, the mobile terminal 250 may display a message input window 670 and a keypad window 675, for replying to the received message, on the front display unit 251.

According to another embodiment of the present invention, when event information checked through a preview window is unanswered call information, the mobile terminal 250 may display a call execution window for sending a call to the other party of the unanswered call on the front display unit 251. In addition, according to another embodiment of the present invention, when event information checked thorough a preview window is predetermined information, the mobile terminal 250 may edit the corresponding schedule or display an execution window for transmitting the corresponding schedule to other people.

Although not shown, upon receiving double-touch input (not shown) of tapping an inner part of the preview window 650, the mobile terminal 250 may enable the remaining lateral display unit 252b and then display a message reception image including entire content of an unchecked message on the front and lateral display units 251 and 252. According to another embodiment of the present invention, the mobile terminal 250 may display a message reception image including entire content of an unchecked message only on the front display unit 251. In this case, the mobile terminal 250 may disable the enabled lateral display unit 252a.

Referring to FIG. 6B, while the pop-up windows 670 and 675 for quick action are displayed on the front display unit 251, upon receiving double-touch input 680 of tapping a left region 611 of the front display unit 251, the mobile terminal 250 may display clipboard information 690 attached to an answer message on the left lateral display unit 252b.

While the clipboard information 690 is displayed, upon receiving touch input 695 of tapping the left region 611 of the front display unit 251, the mobile terminal 250 may select a clipboard item 691 positioned on the same horizontal line as a point through which the touch input 695 is received.

When the corresponding clipboard item 691 is selected, the mobile terminal 250 may insert a thumbnail image 693 corresponding to the selected clipboard item into the pop-up window 670 displayed on the front display unit 251.

FIG. 7 is a diagram for explanation of an operation for displaying preset app icons and/or widgets on a lateral display unit in response to touch input received through a front display unit in a mobile terminal according to a first embodiment of the present invention.

Referring to FIG. 7, in a sleep mode, upon receiving double-touch input 720 of tapping a right region 710 of the front display unit 251, the mobile terminal 250 may enable only the lateral display unit 252a included in a right region of the terminal body. In addition, the mobile terminal 250 may display a predetermined operation image on the enabled lateral display unit 252a. Here, the operation image displayed on the lateral display unit 252a may be an image including an app icon and/or widget preset by a user.

For example, as shown in FIG. 7(b), the mobile terminal 250 may display an operation image 730 including a camera icon 731, a map icon 733, a call icon 735, a message icon 737, and a weather widget 739 on the right lateral display unit 252a.

While the operation image 730 is displayed on the lateral display unit 252a, upon receiving double-touch input 740 of tapping the right region 710 of the front display unit 251, the mobile terminal 250 may select the weather widget 739 of the operation image 730, positioned on the same horizontal line as a point through which the double-touch input 740 is received.

Upon selecting the weather widget 739, the mobile terminal 250 enables the front display unit 251. In addition, in order to provide information corresponding to the weather widget 739 in the form of a preview, the mobile terminal 250 may display a preview window 750 shaped like a pop-up window or a speech bubble (not shown), which includes weather information, on one region of the front display unit 251.

While the preview window 750 shaped like a pop-up window is displayed on the front display unit 251, upon receiving double-touch input (not shown) of tapping left/right boundaries of the preview window 750, the mobile terminal 250 may close the corresponding preview window 750 and then disable the front display unit 251.

Upon receiving the double-touch input (not shown) of tapping the left/right boundaries of the preview window 750, the mobile terminal 250 may execute a preset quick action in response to information checked through the preview window 750.

As shown in FIG. 7(c), upon receiving double-touch input 760 of tapping an inner portion of the preview window 750, the mobile terminal 250 may enable the remaining lateral display unit 252b and then display an execution image 770 of the corresponding widget 739 on all the display units 251 and 252.

FIGS. 8 and 9 are diagrams for explanation of an operation for performing a function associated with a lock screen in response to touch input received through a front display unit in a mobile terminal according to a first embodiment of the present invention.

Referring to FIG. 8, in a sleep mode, upon receiving double-touch input 820 of tapping a central region 810 of the front display unit 251, the mobile terminal 250 may enable the front display unit 251 and the lateral display unit 252 which are included in the terminal body. In addition, the mobile terminal 250 may display a predetermined operation image on the enabled front and lateral display units 251 and 252. In this case, an operation image 830 displayed on all the display units 251 and 252 may be a lock screen including current time, weather information, or the like.

While the lock screen 830 is displayed on all the display units 251 and 252, upon receiving double-touch input 840 of tapping a right region 811 of the front display unit 251, the mobile terminal 250 may display an image 850 including information associated with a time information object 845 of the touch point on the right lateral display unit 252a.

While the image 850 of the object information is displayed on the lateral display unit 252a, upon receiving double-touch input of tapping the right region 811 of the front display unit 251, the mobile terminal 250 may perform an operation for controlling the image 850 of the object information displayed on the lateral display unit 252a based on a location of the received touch input.

As shown in FIGS. 8(d) and 8(e), upon receiving double-touch input 860 of tapping a left region 812 of the front display unit 251, the mobile terminal 250 may display an image 870 including information associated with an alarm information object 865 of the touched point on the left lateral display unit 252b.

While the image 870 of the object information is displayed on the lateral display unit 252b, upon receiving double-touch input 880 of tapping the left region 812 of the front display unit 251, the mobile terminal 250 may perform an operation for controlling the image 870 of the object information displayed on the lateral display unit 252b based on a location of the received touch input.

According to another embodiment of the present invention, referring to FIG. 9, in a sleep mode, upon receiving double-touch input 920 of tapping a central region 910 of the front display unit 251, the mobile terminal 250 may enable the front display unit 251 and the lateral display unit 252 which are included in the terminal body. In addition, the mobile terminal 250 may display a lock screen 930 on the enabled front and lateral display units 251 and 252.

While the lock screen 930 is displayed on all the display units 251 and 252, upon receiving a preset touch input through a right region 911 of the front display unit 251, the mobile terminal 250 displays information associated with a complex object 945 of the touched point on the lateral display unit 252a included in a right region of the terminal body.

For example, as shown in FIGS. 9(b) and 9(c), upon receiving double-touch input 940 of tapping the right region 911 of the front display unit 251, the mobile terminal 250 may divide and display an image 950 associated with a time information object and weather information object of the touched point on the right lateral display unit 252a.

FIG. 10 is a diagram for explanation of an operation for displaying a last execution image on a lateral display unit in response to touch input received through a front display unit in a mobile terminal according to a second embodiment of the present invention.

Referring to FIG. 10, in a sleep mode, upon receiving a plurality of touch inputs 1020 of sequentially tapping four points positioned in a right region 1011 of the front display unit 251 according to a predetermined order, the mobile terminal 250 enables only the lateral display unit 252a included in a right region included in the terminal body. In addition, the mobile terminal 250 may release a screen locking function and simultaneously display a predetermined operation image on the enabled lateral display unit 252a. Here, the operation image displayed on the lateral display unit 252a may be an image corresponding to one image that is lastly executed before the mobile terminal 250 enters a sleep mode.

For example, as shown in FIG. 10(b), the mobile terminal 250 may display a web page image 1030 corresponding to a left region of a web page image that is lastly executed prior to entrance into a sleep mode, on the right lateral display unit 252a.

While the web page image 1030 displays the lateral display unit 252a, upon receiving touch input 1040 of tapping the right region 1011 of the front display unit 251, the mobile terminal 250 may select one item 1031 of the web page image 1030 positioned on the same horizontal line as the point through which the touch input 1040 is received.

When the corresponding item 1031 is selected, the mobile terminal 250 enables the front display unit 251. In addition, in order to provide information corresponding to the selected item 1031 in the form of a preview, the mobile terminal 250 may display a preview window 1050 shaped like a speech bubble, which includes the corresponding information, on one region of the front display unit 251.

While the preview window 1050 shaped like a speech bubble is displayed on the front display unit 251, upon receiving touch input (not shown) of tapping a boundary of the preview window 1050, the mobile terminal 250 may close the corresponding preview window 1050 and then disable the front display unit 251.

As shown in FIG. 10(c), upon receiving touch input 1060 of tapping an inner portion of the preview window 1050, the mobile terminal 250 may enable the remaining lateral display unit 252b and then display a web page image 1070 including information corresponding to the selected item 1031 on all the display units 251 and 252.

According to an embodiment of the present invention, a lastly executed image is exemplified as an example of an operation image displayed on the enabled lateral display unit 252a while a plurality of preset touch inputs are received, but embodiments of the present invention are not limited thereto. Accordingly, as shown in the above FIGS. 6 and 7, the operation image displayed on the enabled lateral display unit may be an image including event information items that are unchecked by a user or an image including an app icon and/or widget preset by a user.

FIGS. 11 and 12 are diagrams for explanation of an operation for performing a function associated with a home screen in response to touch input received through a front display unit in a mobile terminal according to a second embodiment of the present invention.

Referring to FIG. 11, in a sleep mode, upon receiving a plurality of touch inputs 1120 of tapping four points positioned in a right region 1110 of the front display unit 251 according to a predetermined order, the mobile terminal 250 enables the front display unit 251 and the lateral display unit 252 which are included in the terminal body. In addition, the mobile terminal 250 may display a home screen 1130 on the enabled front and lateral display units 251 and 252. In this case, it is assumed that the home screen 1130 displayed on all the display units 251 and 252 is a fourth of seven home screens.

While the fourth home screen 1130 is displayed on all the display units 251 and 252, upon receiving multi-touch inputs 1140 of tapping a left region 1112 and a right region 1111 of the front display unit 251, the mobile terminal 250 enters a home screen edit mode. In this case, as shown in FIG. 11(c), the mobile terminal 250 may display the fourth home screen 1130 on the front display unit 251, display one region 1150 of a third home screen present on the left of the current home screen on the left lateral display unit 252b, and display one region 1160 of a fifth home screen present on the right of the current home screen on the right lateral display unit 252a.

According to another embodiment of the present invention, the mobile terminal 250 may display regions of a plurality of home screens present on the left of the current home screen on the left lateral display unit 252b and display regions of a plurality of home screens positioned on the right of the current home screen on the right lateral display unit 252a.

In the home screen edit mode, upon receiving double-touch input 1170 of tapping the right region 1111 of the front display unit 251, the mobile terminal 250 may display first to third preview windows 1181, 1183, and 1185 formed by downsizing fifth to seventh home screens positioned on the right of the current home screen, respectively, on the front display unit 251.

After one icon 1190 of a plurality of icons included in the fourth home screen 1130 is touched, upon receiving a user input 1195 of dragging the second preview window 1183, the mobile terminal 250 may move the dragged icon 1190 to a specific position of the sixth home screen. In this case, when the dragged icon 1190 is moved close to the second preview window 1183, the mobile terminal 250 may enlarge and display a size of the second preview window so as to easily insert the corresponding icon.

According to an embodiment of the present invention, a procedure of entrance into a home screen edit mode in response to multi-touch inputs through left/right regions of a front display unit may be omitted. Accordingly, while a home screen is displayed on all display units, upon receiving double-touch input of tapping a right region of a front display unit, the mobile terminal 250 may display a home screen edit image on the front display unit 251 and the lateral display unit 252, as shown in FIG. 11(d).

According to another embodiment of the present invention, referring to FIG. 12, in a sleep mode, upon receiving a plurality of preset touch inputs 1220 through a central region 1210 of the front display unit 251, the mobile terminal 250 enables the front display unit 251 and the lateral display unit 252 which are included in the terminal body. In addition, the mobile terminal 250 displays a fourth home screen 1230 on all the enabled display units 251 and 252.

While the fourth home screen 1230 is displayed on all the display units 251 and 252, upon receiving multi-touch inputs 1240 of tapping a left region 1212 and a right region 1211 of the front display unit 251, the mobile terminal 250 enters a home screen edit mode. As shown in FIG. 12(c), the mobile terminal 250 may display the fourth home screen 1230 on the front display unit 251, display one region 1250 of the third home screen positioned on the left of the current home screen on the left lateral display unit 252b, and display one region 1260 of the fifth home screen positioned on the right of the current home screen on the right lateral display unit 252a.

In addition, the mobile terminal 250 may display a preview window 1270 for grouping icons selected by a user on one region of the front display unit 251. While the preview window 1270 is displayed on the front display unit 251, it is possible to change an image between home screens through left/right flicking inputs.

When a user selects an icon 1280 to be grouped by the user, upon receiving a user input 1285 of dragging and dropping to the preview window 1270, the mobile terminal 250 moves the corresponding icon 1280 to the preview window 1270. Then, upon receiving touch input (not shown) of tapping a boundary of the preview window 1270, the mobile terminal 250 may close a preview window and then display a group folder 1290 including corresponding icons on the fourth home screen 1230.

FIG. 13 is a diagram for explanation of an operation of controlling another electronic apparatus 400 that is connected to the mobile terminal 250 by wire or wirelessly in response to touch input received through a front display unit in a mobile terminal according to an embodiment of the present invention.

Referring to FIG. 13, while connected to the electronic apparatus 400 by wire or wirelessly, the mobile terminal 250 displays an operation image 1310 on the front display unit 251 and the lateral display unit 252 according to a user command, etc.

While the operation image 1310 is displayed, upon receiving the double-touch inputs 1020 of tapping a right region 1311 of the front display unit 251 or a plurality of touch inputs (not shown) of sequentially tapping the right region 1311 according to a predetermined order, the mobile terminal 250 displays menu icons 1321, 1323, and 1325 associated with the electronic apparatus 400 that is connected to the mobile terminal 250 by wire or wirelessly, on the right lateral display unit 252a.

While the menu icons 1321, 1323, and 1325 are displayed on the lateral display unit 252a, upon receiving touch input 1330 of tapping the right region 1311 of the front display unit 251, the mobile terminal 250 may select a menu icon 1321 positioned on the same horizontal line as a point through which the touch input 1330 is received.

When the corresponding menu icon 1321 is selected, the mobile terminal 250 displays a pop-up window 1340 corresponding to the selected menu icon 1321 on one region of the front display unit 251. In addition, through touch input 1350 to the pop-up window 1340, the mobile terminal 250 may control an operation associated with the electronic apparatus 400 that is connected to the mobile terminal 250 by wire or wirelessly.

FIG. 14 is a flowchart for explanation of an operation of a mobile terminal according to a third embodiment of the present invention. Hereinafter, the third embodiment of the present invention will be described with reference to the mobile terminal 250 shown in FIG. 2D.

Referring to FIG. 14, the controller 180 displays an operation image corresponding to an operation, a menu, or the like selected according to a user command, etc. on the front display unit 251 or all the display units 251 and 252.

While the operation image is displayed, if an external key for entrance into a sleep mode is selected or predetermined time elapses without any user input, the controller 180 converts an operation mode of the mobile terminal 250 to a sleep mode from an active mode for energy conservation, etc. (S1410).

In the sleep mode, the controller 180 detects at least one magnet installed in a quick cover and detects whether the protective cover 300 is closed or opened (S1415). As the detection result, while the protective cover 300 is closed, the mobile terminal 250 may enable a display region corresponding to the quick window 320 according to a user command, etc.

That is, upon receiving double-touch input of tapping a first region (i.e., a left region) of the front display unit 251, exposed through the quick window 320 (S1420), the controller 180 may enable only the left lateral display unit 252b corresponding to the quick window 320 (S1425).

In the sleep mode, upon receiving double-touch input through a second region (i.e., a right region) of the front display unit 251, exposed through the quick window 320 (S1430), the controller 180 may enable only the right lateral display unit 252a corresponding to the quick window 320 (S1435).

In addition, in the sleep mode, upon receiving double-touch input through a third region (i.e., a central region) of the front display unit 251, exposed through the quick window 320 (S1440), the controller 180 may enable all the display units 251, 252a, and 252b corresponding to a quick window (S1445). According to another embodiment of the present invention, upon receiving a plurality of touch inputs of sequentially tapping a plurality of points within a corresponding region according to a predetermined order instead of double-touch input of tapping first to third regions, the controller 180 may enable a display unit corresponding to the quick window and may simultaneously release screen lock.

As described above, upon receiving double-touch input of tapping the first or second region of the front display unit 251, the controller 180 displays a preset operation image on the enabled first or second lateral display unit 252 (S1450). In this case, the operation image displayed on the lateral display unit 252 may be, but is not limited to, an image for listing event information items that are not checked by a user, an image for listing an app icon and/or widget preset by the user, an image for listing a plurality of home screens, or an image for listing currently multitasked operation images.

While the operation image is displayed on the first or second lateral display units 252, upon receiving a preset touch input through a first or second region of the quick window (S1455), the controller 180 performs an operation associated with an operation image displayed on the lateral display unit 252 based on a received touch input (S1460). In this case, the preset touch input may be, but is not limited to, a short touch input, a long touch input, double-touch input (tap), a touch and drag input, or the like.

That is, the controller 180 may select or execute one item of an operation image positioned on the same horizontal line as a point through which the touch input is received. Thus, when a lateral display region is narrow and thus it is difficult to touch the corresponding region or a touch sensor is not installed in the lateral display region and thus the corresponding region is not capable of being touched, the operation image displayed on the lateral display region may be easily controlled using the front display region.

In operation 1440, upon receiving double-touch input through the third region of the front display unit 251, exposed through the quick window 320, the controller 180 may display a lock screen on the front and lateral display units 251 and 252 corresponding to the quick window 320 (S1465). When a locking function is not set, the controller 180 may display a home screen on the front and lateral display units 251 and 252.

While the lock screen is displayed on the front and lateral display units 251 and 252, upon receiving a preset touch input through the first or second region of the quick window (S1470), the controller 180 performs an operation associated with the lock screen displayed on the front display unit 251 based on a position of the received touch input (S1475).

According to another embodiment of the present invention, upon receiving double-touch input or a plurality of preset touch inputs through a front display region without dividing a front display region exposed through the quick window into three regions, the mobile terminal 100 may display a lock screen on the front display unit corresponding to the quick window and display a preset operation image on left/right lateral display units corresponding to the quick window.

As described above, according to the third embodiment of the present invention, the mobile terminal may select a lateral display unit with an image to be enabled based on a position of touch input of tapping a front display unit exposed through a quick window and display a preset operation image on the enabled lateral display unit.

FIG. 15 is a diagram for explanation of an operation of displaying preset app icon and/or widgets on a lateral display unit in response to touch input received through a quick window in a mobile terminal according to a third embodiment of the present invention.

Referring to FIG. 15, in a sleep mode and a state in which a protective cover is closed, upon receiving double-touch input 1520 of tapping a right region 1511 of the front display unit 251, the mobile terminal 250 enables only the right lateral display unit 252a corresponding to the quick window. In addition, the mobile terminal 250 may display a predetermined operation image on the enabled lateral display unit 252a. Here, the operation image displayed on the lateral display unit 252a may be an image including an app icon and/or widget preset by a user. For example, as shown in FIG. 15(*b*), an operation image 1530 displayed on the lateral display unit 252a may include a clock icon 1531, a weather icon 1533, a music icon 1535, and a schedule icon 1537.

As shown in FIG. 15(*c*), upon receiving an input 1540 of touching and dragging the right region 1511 of the front display unit 251, the mobile terminal 250 may select the clock icon 1531 of the operation image 1530, positioned on the same horizontal line as a point through which the touch and drag input 1540 is received.

When the clock icon 1531 is selected, the mobile terminal 250 enables the front display unit 251 corresponding to the quick window. In addition, the mobile terminal 250 may display an execution image 1545 corresponding to the clock icon 1531 on the enabled front display unit 251.

As shown in FIG. 15(*d*), upon receiving an input 1550 of touching and dragging the right region 1511 of the front display unit 251, the mobile terminal 250 may select the weather icon 1533 of the operation image 1530, positioned on the same horizontal line as a point through which the touch and drag input 1550 is received.

When the weather icon 1533 is selected, the mobile terminal 250 enables the front display unit 251 corresponding to the quick window. In addition, the mobile terminal 250 may display an execution image 1555 corresponding to the weather icon 1533 on the enabled front display unit 251.

As shown in FIG. 15(*e*), upon receiving an input 1560 of touching and dragging the right region 1511 of the front display unit 251, the mobile terminal 250 may select the schedule icon 1537 of the operation image 1530, positioned on the same horizontal line as a point through which the touch and drag input 1560 is received.

When the schedule icon 1537 is selected, the mobile terminal 250 enables the front display unit 251 corresponding to the quick window. In addition, the mobile terminal 250 may display an execution image 1565 corresponding to the schedule icon 1537, on the enabled front display unit 251.

FIG. 16 is a diagram for explanation of an operation for displaying a list of currently multitasked images on a lateral display unit in response to touch input received through a quick window in a mobile according to a third embodiment of the present invention.

Referring to FIG. 16, in a sleep mode and a state in which a protective cover is closed, upon receiving double-touch input 1620 of tapping a left region 1612 of the front display unit 251, the mobile terminal 250 enables only the left lateral display unit 252b corresponding to a quick window. In addition, the mobile terminal 250 may display a predetermined operation image on the enabled lateral display unit 252b. Here, the operation image displayed on the lateral display unit 252b may be a list of currently multitasked images. For example, as shown in FIG. 16(*b*), an operation image 1630 displayed on the lateral display unit 252a may include first to third thumbnail images 1631, 1633, and 1635 corresponding to currently multitasked operation images.

As shown in FIG. 16(*c*), upon receiving double-touch input 1640 of tapping the left region 1612 of the front display unit 251, the mobile terminal 250 may select the third thumbnail image 1635 positioned on the same horizontal line as a point through which the double-touch input 1640 is received.

When the third thumbnail image 1635 is selected, the mobile terminal 250 enables the front display unit 251 corresponding to the quick window. In addition, the mobile terminal 250 may display a map image 1645 corresponding to the third thumbnail image 1635 on the enabled front display unit 251.

As shown in FIG. 16(*d*), upon receiving double-touch input 1650 of tapping the left region 1612 of the front display unit 251, the mobile terminal 250 may select the second thumbnail image 1633 positioned on the same horizontal line as a point through which the double-touch input 1650 is received.

When the second thumbnail image 1633 is selected, the mobile terminal 250 enables the front display unit 251 corresponding to a quick window. In addition, the mobile terminal 250 may display a gallery image 1655 corresponding to the second thumbnail image 1633 on the enabled front display unit 251.

As shown in FIG. 16(*e*), upon receiving double-touch input 1660 of tapping the left region 1612 of the front display unit 251, the mobile terminal 250 may select the first thumbnail image 1631 positioned on the same horizontal line as a point through which the double-touch input 1660 is received.

When the first thumbnail image 1631 is selected, the mobile terminal 250 enables the front display unit 251 corresponding to a quick window. In addition, the mobile terminal 250 may display a messenger image 1665 corresponding to the first thumbnail image 1631 on the enabled front display unit 251.

FIG. 17 is a diagram for explanation of an operation for displaying unchecked event information items on a lateral display unit in response to touch input received through a quick window in a mobile terminal according to a third embodiment of the present invention.

Referring to FIG. 17, in a sleep mode and a state in which a protective cover is closed, upon receiving double-touch input 1720 of tapping a right region 1711 of the front display unit 251, the mobile terminal 250 enables only the right lateral display unit 252a corresponding to the quick window. In addition, the mobile terminal 250 may display a predetermined operation image on the enabled lateral display unit 252a. Here, the operation image displayed on the lateral display unit 252a may correspond to event information items that are not checked by a user. For example, as shown in FIG. 17(b), an operation image 1730 displayed on the lateral display unit 252a may include first to fourth alarm icons 1731, 1733, 1735, and 1737 corresponding to unchecked event information items.

As shown in FIG. 17(c), upon receiving double-touch input 1740 of tapping the right region 1711 of the front display unit 251, the mobile terminal 250 may select an unanswered call icon 1731 positioned on the same horizontal line as a point through which the double-touch input 1740 is received.

When the unanswered call icon 1731 is selected, the mobile terminal 250 enables the front display unit 251 corresponding to the quick window. In addition, the mobile terminal 250 may display a calling list image 1745 corresponding to the unanswered call icon 1731 on the enabled front display unit 251.

As shown in FIG. 17(d), upon receiving double-touch input 1750 of tapping the right region 1711 of the front display unit 251, the mobile terminal 250 may select an unchecked messenger icon 1733 positioned on the same horizontal line as a point through which the double-touch input 1750 is received.

When the unchecked messenger icon 1733 is selected, the mobile terminal 250 enables the front display unit 251 corresponding to the quick window. In addition, the mobile terminal 250 may display an operation image 1755 corresponding to the unchecked messenger icon 1733 on the enabled front display unit 251.

In addition, as shown in FIG. 17(e), upon receiving double-touch input 1760 of tapping the right region 1711 of the front display unit 251, the mobile terminal 250 may select an unchecked SNS icon 1737 positioned on the same horizontal line as a point through which the double-touch input 1760 is received.

When the corresponding SNS icon 1737 is selected, the mobile terminal 250 enables the front display unit 251 corresponding to the quick window. In addition, the mobile terminal 250 may display an operation image 1765 corresponding to the SNS icon 1737 on the enabled front display unit 251.

FIG. 18 is a diagram for explanation of an operation for listing a home screen on a lateral display unit in response to touch input received through a quick window in a mobile terminal according to a third embodiment of the present invention.

Referring to FIG. 18, in a sleep mode and a state in which a protective cover is closed, upon receiving double-touch input 1820 of tapping a right region 1811 of the front display unit 251, the mobile terminal 250 enables only the right lateral display unit 252a corresponding to a quick window. In addition, the mobile terminal 250 may display a predetermined operation image on the enabled lateral display unit 252a. Here, the operation image displayed on the lateral display unit 252a may be an image for listing a plurality of home screens. For example, as shown in FIGS. 18(b) and 18(d), an operation image 1830 displayed on the lateral display unit 252a may include first to fourth thumbnail images 1831, 1833, 1835, and 1837 corresponding to first to fourth home screens.

As shown in FIGS. 18(b) and 18(c), when the first thumbnail image 1831 is touched while opening a quick cover or the quick cover is opened while the first thumbnail image 1831 is touched, the mobile terminal 250 may display a first home screen 1840 corresponding to the first thumbnail image 1831 on the front display unit 251 and the lateral display unit 252.

According to another embodiment of the present invention, as shown in FIGS. 18(d) and 18(e), upon receiving double-touch input 1850 of tapping the right region 1811 of the front display unit 251, the mobile terminal 250 may select the first thumbnail image 1831 positioned on the same horizontal line as a point through which the double-touch input 1850 is received.

When the first thumbnail image 1831 is selected, the mobile terminal 250 enables the front display unit 251 corresponding to the quick window. In addition, the mobile terminal 250 may display a first home screen 1860 corresponding to the first thumbnail image 1831 on the enabled front display unit 251. In this state, when the quick cover is opened, the mobile terminal 250 may enlarge the first home screen 1860 and display the enlarged first home screen 1860 on the front display unit 251 and the lateral display unit 252.

FIG. 19 is a diagram for explanation of an operation for providing additional information associated with a main image on a lateral display unit according to an operation for opening and closing a protective cover.

Referring to FIG. 19, the mobile terminal 250 displays an operation image 1910 corresponding to a menu, an operation, etc., which are selected according to a user command, on the front display unit 251. In this case, it is assumed that a main image 1710 displayed on the front display unit 251 is an e-book execution image.

While the e-book execution image 1910 is displayed, if the protective cover 300 is quickly closed and then opened, the mobile terminal 250 may display additional information associated with the e-book execution image 1910 on the right/left lateral display units 252a and 252b. For example, as shown in FIG. 19(c), the mobile terminal 250 may display content information 1920 on the lateral display unit 252b and display bookmark information 1930 on the right lateral display unit 252a.

When predetermined time elapses after the additional information is displayed, the mobile terminal 250 may disable the right/left lateral display units 252a and 252b, as shown in FIG. 19(d).

FIG. 20 is a diagram for explanation of an operation of a mobile terminal for providing additional information associated with a main image to a lateral display unit according to an operation for partially opening and closing a protective cover.

Referring to FIGS. 20(a) and 20(b), while the protective cover 300 is closed, the mobile terminal 250 displays an execution image 2010 corresponding to a weather widget on the front display unit 251 and displays a preset app icon and/or widget 2020 on the right lateral display unit 252a.

In this state, when a quick cover 2030 for covering the right lateral display unit 252a is opened, the mobile terminal

250 may display additional information 2040 associated with the execution image 2010 on the right lateral display unit 252*a*.

Referring to FIGS. 20(*c*) and 20(*d*), while the protective cover 300 is closed, the mobile terminal 250 displays an execution image 2050 corresponding to a music icon on the front display unit 251 and displays a preset app icon and/or widget 2020 on the right lateral display unit 252*a*.

In this case, when the quick cover 2030 for covering the right lateral display unit 252*a* is opened, the mobile terminal 250 may display additional information 2060 associated with the execution image 2050 on the right lateral display unit 252*a*.

FIGS. 21 to 27 are diagrams for explanation of an operation of a mobile terminal according to a fourth embodiment of the present invention.

FIG. 21 is a diagram for explanation of an operation of a mobile terminal for providing notification information corresponding to a received event when the event is received during use of a front display unit.

Referring to FIG. 21, in a horizontal mode, the mobile terminal 250 displays an operation image 2110 corresponding to an operation, a menu, or the like selected according to a user command, etc. on the front display unit 251.

While the operation image 2110 is displayed on the front display unit 251, upon receiving an event such as a call, a message, an e-mail, etc., the mobile terminal 250 displays notification information corresponding to the event on the lateral display unit 252.

For example, as shown in FIG. 21(*b*), during reception of a message, the mobile terminal 250 may display a message icon 2120 and some content 2125 of the corresponding message. Then, upon further receiving another message, the mobile terminal 250 may display message icons 2120 and 2130 and some contents 2125 and 2135 of the corresponding messages on the first lateral display unit 252*b* in the form of a list, as shown in FIG. 21(*c*).

According to another embodiment of the present invention, as shown in FIG. 21(*d*), upon receiving a message, the mobile terminal 250 displays a message icon 2140 on the first lateral display unit 252*b*. Then, upon further receiving another message, the mobile terminal 250 may display an indicator 2145 indicating the number of received messages on the message icon 2140, as shown in FIG. 21(*e*).

Although not shown, while the operation image 2110 is displayed on all the display units 251 and 252, upon receiving an event, the mobile terminal 250 may display notification information corresponding to the event on the lateral display unit 252 in the form of on screen display (OSD).

FIG. 22 is a diagram for explanation of an operation of a mobile terminal for checking notification information displayed on a lateral display unit during use of a front display unit.

Referring to FIG. 22, the mobile terminal 250 displays an operation image 2210 corresponding to a menu, an operation, or the like selected according to a user command, etc. on the front display unit 251.

While the operation image 2210 is displayed on the front display unit 251, upon receiving an event such as a call, a message, an e-mail, etc., the mobile terminal 250 displays notification icons corresponding to the icons on the lateral display unit 252. For example, as shown in FIG. 22(*a*), the mobile terminal 250 displays a message icon 2210, a web icon 2220, and a messenger icon 2230 on the right lateral display unit 252*a*.

Upon receiving a user input 2240 of tapping the web icon 2220 or touching and dragging along a boundary, the mobile terminal 250 may display notification information 2250 corresponding to the web icon 2220 on the left lateral display unit 252*b*.

Then, continuously, upon receiving a user input 2260 of tapping the messenger icon 2230 or touching and dragging along a boundary, the mobile terminal 250 may display notification information 2270 corresponding to the messenger icon 2230 on the left lateral display unit 252*b*, as shown in FIG. 22(*c*). According to another embodiment of the present invention, as shown in FIG. 22(*d*), the mobile terminal 250 may simultaneously display first notification information 2280 corresponding to the web icon 2220 and second notification information 2290 corresponding to the messenger icon 2230 on the left lateral display unit 252*b*.

FIG. 23 is a diagram for explanation of an operation of a mobile terminal for controlling notification information displayed on a lateral display unit during use of a front display unit.

Referring to FIG. 23, in a horizontal mode, the mobile terminal 250 displays an operation image 2310 corresponding to an operation, a menu, or the like selected according to a user command, etc. on the front display unit 251.

While the operation image 2310 is displayed on the front display unit 251, upon receiving an event such as a call, a message, an e-mail, etc., the mobile terminal 250 displays notification information 2320 corresponding to the event on the lateral display unit 252.

As shown in FIG. 23(*a*), after the lateral display unit 252 is touched, upon receiving a user input 2330 of dragging in a direction toward the front display unit 251, the mobile terminal 250 may display an operation image 2340 associated with a notification event on the lateral display unit 252.

As shown in FIG. 23(*b*), after the lateral display unit 252 is touched, upon receiving a user input 2350 of dragging in a left direction, the mobile terminal 250 may perform an operation of deleting the notification information 2320 displayed on the lateral display unit 252.

As shown in FIG. 23(*c*), after the lateral display unit 252 is touched, upon receiving a user input 2360 of dragging in a right direction, the mobile terminal 250 may display an option menu 2370 associated with a notification event on one region of the front display unit 251.

FIG. 24 is a diagram for explanation of an operation of a mobile terminal for moving an operation image displayed on a lateral display unit to a lateral display unit.

Referring to FIG. 24, the mobile terminal 250 displays an operation image 2410 corresponding to a menu, an operation, etc., which are selected according to a user command, on the front display unit 251.

After the front display unit 251 is touched, upon receiving a user input 2420 of dragging in a right direction, the mobile terminal 250 may display an app icon 2430 corresponding to the operation image 2410 on the right lateral display unit 252*a*. In this case, the mobile terminal 250 may disable the front display unit 251.

After the front display unit 251 is touched, upon receiving a user input 2440 of dragging in a left direction, the mobile terminal 250 may display an image 2450 corresponding to one region of the operation image 2410 on the left lateral display unit 252*b*.

That is, according to a direction of a touch and drag input received through the front display unit 251, an application that is currently executed on the front display unit 251 may be displayed on the lateral display unit 252 in the form of an icon or an image.

FIG. 25 is a diagram for explanation of an operation of a mobile terminal for switching an operation image displayed on a front display unit and an operation image displayed on a lateral display unit.

Referring to FIG. 25, in a horizontal mode, the mobile terminal 250 displays a first operation image 2510 corresponding to an operation, a menu, or the like selected according to a user command, etc. on the front display unit 251. In addition, the mobile terminal 250 displays a second operation image 2520 including notification information corresponding to a received event on the lateral display unit 252.

After the lateral display unit 252 is touched, upon a user input 2530 of dragging toward the front display unit 251, the mobile terminal 250 may exchange displayed positions of the first operation image 2510 and the second operation image 2520, as shown in FIG. 25(b). According to another embodiment, the mobile terminal 250 may divide the front display unit 251 into two regions, display the second operation image 2520 in a left region, and display the first operation image 2510 in a right region, as shown in FIG. 25(c).

FIG. 26 is a diagram for explanation of an operation of a mobile terminal for controlling notification information displayed on a lateral display unit when both lateral surfaces of a terminal body are gripped.

Referring to FIG. 26, the mobile terminal 250 displays an operation image 2610 corresponding to an operation, a menu, or the like selected according to a user command, etc. on the front display unit 251. In addition, the mobile terminal 250 displays a notification icon 2620 corresponding to a received event on the lateral display unit 252.

Upon receiving a user input 2630 of gripping both lateral surfaces of a terminal body, the mobile terminal 250 may display notification information 2640 corresponding to the notification icon 2620 on one region of the front display unit 251 in the form of a speech bubble or pop-up window, as shown in FIG. 26(b).

Then, upon receiving a user input 2650 of re-gripping both lateral surfaces of a terminal body, the mobile terminal 250 may delete the notification information 2640 displayed on a front display unit and the notification icon 2620 displayed on a lateral display unit.

FIG. 27 is a diagram for explanation of an operation of a mobile terminal of displaying notification information provided to a lateral display unit using different methods according to a display mode of a display unit.

Referring to FIG. 27, in a vertical mode, the mobile terminal 250 displays an operation image 2710 corresponding to an operation, a menu, or the like selected according to a user command, etc. on the front display unit 251. In addition, the mobile terminal 250 displays a notification icon 2720 corresponding to a received event on the lateral display unit 252. That is, in a vertical mode, notification information provided to the lateral display unit 252 may be displayed in the form of an icon.

When a display mode of a display unit is changed to a horizontal mode from a vertical mode according to rotation of a terminal body, the mobile terminal 250 may display notification information 2730 corresponding to a received event on the lateral display unit 252 in the form of a list or text, as shown in FIG. 27(b). Then, upon being rotated to a vertical mode, the mobile terminal 250 may convert the notification information to the icon form from the list form.

According to the aforementioned embodiments of the present invention, when a specific event is received during use of a front display unit, information associated with the corresponding event is provided to a lateral display unit, but it would be obvious to one of ordinary skill in the art that various information items other than the event may be provided to a lateral display unit.

The invention can also be embodied as computer readable codes on a computer readable recording medium. The computer readable recording medium is any data storage device that can store programs or data which can be thereafter read by a computer system. Examples of the computer readable recording medium include a hard disk drive (HDD), a solid state disk (SSD), a silicon disk drive (SDD), read-only memory (ROM), random-access memory (RAM), CD-ROMs, magnetic tapes, floppy disks, optical data storage devices, and carrier wave such as transmission via the Internet, etc. In addition, the computer may include the controller 180 of a terminal. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A mobile terminal comprising:
a front display unit disposed on a front surface and lateral display units disposed on lateral surfaces of a terminal body; and
a controller configured to:
in response to receiving a first preset touch input through a first display region of the front display unit disposed on the front surface of the terminal body in a sleep mode, enable a predetermined second display region on one of the lateral display units that is located adjacent to a position of the received first preset touch input and switch from the sleep mode to an active mode,
control the display unit to display a preset operation image on the enabled second display region, and
in response to receiving a second preset touch input applied at an item displayed on the enabled second display region, display a preview window corresponding to the item,
wherein the front display unit comprises a left region, a central region, and a right region, and
wherein the first display region is one of the left region, the central region, and the right region of the front display unit.

2. The mobile terminal according to claim 1, wherein the display units are flexible display units.

3. The mobile terminal according to claim 1, wherein, when the first preset touch input is received through the right region of the front display unit, the controller is configured to enable only the lateral display unit disposed on the right of the terminal body.

4. The mobile terminal according to claim 1, wherein the first preset touch input is a double-touch input of tapping the first display region or a plurality of touch inputs of sequentially tapping a plurality of points within the first display region according to a predetermined order.

5. The mobile terminal according to claim 1, wherein the controller is further configured to, in response to receiving a touch input applied to a boundary of the preview window, close the preview window and disable the front display unit.

6. The mobile terminal according to claim 1, wherein the controller is further configured to, in response to receiving a touch input applied to an inner portion of the preview window, display information corresponding to the item on all display units.

7. The mobile terminal according to claim 1, wherein, when the first preset touch input is received through the left region of the front display unit, the controller is configured to enable only the lateral display unit disposed on the left of the terminal body.

8. The mobile terminal according to claim 7, wherein the preset operation image displayed on the enabled second display region comprises at least one of an image corresponding to one region of an operation image that is lastly executed prior to entrance into a sleep mode, an image listing event information items that are not checked by a user, or an image listing an app icon and/or widget preset by the user.

9. The mobile terminal according to claim 1, wherein, when the first preset touch input is received through the central region of the front display unit, the controller is configured to enable all the display units.

10. The mobile terminal according to claim 9, wherein the operation image displayed on all the enabled display units is a lock screen or a home screen.

11. A method for controlling a mobile terminal comprising a front display unit disposed on a front surface and display units disposed on lateral surfaces of a terminal body, the method comprising:
    entering a sleep mode;
    receiving a first preset touch input through a first display region of the front display unit;
    enabling a predetermined second display region on one of the lateral display units that is located adjacent to a position of the received first preset touch input and switching from the sleep mode to an active mode;
    displaying a preset operation image on the enabled second display region;
    receiving a second preset touch input at an item disposed at the enabled second display region; and
    displaying a preview window corresponding to the item,
    wherein the front display unit comprises a left region, a central region, and a right region, and
    wherein the first display region is one of the left region, the central region, and the right region of the front display unit.

12. The method according to claim 11, wherein the display units are flexible display units.

13. The method according to claim 11, wherein, when the first preset touch input is received through the right region of the front display unit, the enabling comprises enabling only the lateral display unit disposed on the right of the terminal body.

14. The method according to claim 11, wherein the first preset touch input is a double-touch input of tapping the first display region or a plurality of touch inputs of sequentially tapping a plurality of points within the first display region according to a predetermined order.

15. The method according to claim 11, further comprises in response to receiving a touch input applied to a boundary of the preview window, closing the preview window and disabling the front display unit.

16. The method according to claim 11, further comprises in response to receiving a touch input applied to an inner portion of the preview window, displaying information corresponding to the item on all display units.

17. The method according to claim 11, wherein, when the first preset touch input is received through the left region of the front display unit, the enabling comprises enabling only the lateral display unit disposed on the left of the terminal body.

18. The method according to claim 17, wherein the preset operation image displayed on the enabled lateral display unit comprises at least one of an image corresponding to one region of an operation image that is lastly executed prior to entrance into a sleep mode, an image listing event information items that are not checked by a user, and an image listing an app icon and/or widget preset by the user.

19. The method according to claim 11, wherein, when the first preset touch input is received through the central region of the front display unit, the enabling comprises enabling all display units disposed on the terminal body.

20. The method according to claim 19, wherein the preset operation image displayed on all the enabled display units is a lock screen or a home screen.

* * * * *